US006965459B2

(12) United States Patent
Sugawara et al.

(10) Patent No.: US 6,965,459 B2
(45) Date of Patent: Nov. 15, 2005

(54) COMMUNICATION SYSTEM BETWEEN COMPUTER AND FACSIMILE MACHINE

(75) Inventors: Kazuhiro Sugawara, Tokyo (JP); Toru Maeda, Mitaka (JP); Hitoshi Saito, Yokohama (JP); Akemi Sato, Kawasaki (JP); Akira Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 09/264,808

(22) Filed: Mar. 9, 1999

(65) Prior Publication Data

US 2003/0002085 A1 Jan. 2, 2003

Related U.S. Application Data

(62) Division of application No. 08/855,505, filed on May 13, 1997, now Pat. No. 5,907,409, which is a continuation of application No. 08/476,324, filed on Jun. 7, 1995, now abandoned, which is a division of application No. 08/143,137, filed on Oct. 29, 1993, now Pat. No. 5,477,339.

(30) Foreign Application Priority Data

Oct. 30, 1992 (JP) ............................................. 4-315883
Dec. 11, 1992 (JP) ............................................. 4-331958
Dec. 11, 1992 (JP) ............................................. 4-331959
Dec. 11, 1992 (JP) ............................................. 4-331960

(51) Int. Cl.[7] ................................................. H04N 1/00
(52) U.S. Cl. ....................... 358/407; 358/403; 358/442; 358/468
(58) Field of Search .................. 358/403, 404, 358/407, 406, 442, 468; 379/100.01, 100.15

(56) References Cited

U.S. PATENT DOCUMENTS

| | | | |
|---|---|---|---|
| 4,533,956 A | * 8/1985 | Fedde | .......................... 382/244 |
| 4,876,606 A | 10/1989 | Banno et al. | ................ 358/434 |
| 4,991,200 A | * 2/1991 | Lin | ............................. 379/100 |
| 5,048,078 A | * 9/1991 | Satomi et al. | .......... 379/102.02 |
| 5,175,762 A | * 12/1992 | Kochis et al. | .......... 379/100.01 |
| 5,196,944 A | 3/1993 | Satake | ......................... 358/468 |
| 5,295,182 A | 3/1994 | Fujii | ...................... 379/100.05 |
| 5,335,267 A | * 8/1994 | Evers et al. | ........... 379/100.13 |
| 5,737,395 A | * 4/1998 | Irribarren | ...................... 379/100 |
| 5,892,845 A | * 4/1999 | Yamanaka et al. | ........... 358/403 |

FOREIGN PATENT DOCUMENTS

| | | |
|---|---|---|
| JP | 59-22475 | 2/1984 |
| JP | 62-154842 | 7/1987 |
| JP | 63-290436 | 11/1988 |
| JP | 1-173224 | 7/1989 |
| JP | 1-202966 | 8/1989 |
| JP | 4-151962 | 5/1992 |

* cited by examiner

*Primary Examiner*—Mark Wallerson
(74) *Attorney, Agent, or Firm*—Fitzpatrick, Cella, Harper & Scinto

(57) ABSTRACT

Remote data entry is performed in such a manner that a plurality of entry items and a plurality of data items are caused to collectively enter within one communication and the check sum is calculated simultaneously with the data entry so that abnormality of the data is easily detected even if the contents of the entry data are changed due to the abnormality occurring in a facsimile apparatus. Data is collectively stored in a receiving buffer and a great quantity of data is caused to remote enter if the capacity of the buffer permits. After all remote data entries have been completed, the check sums of all entry memory regions are performed so that the memory capacity of the program code of the check sum is saved.

10 Claims, 95 Drawing Sheets

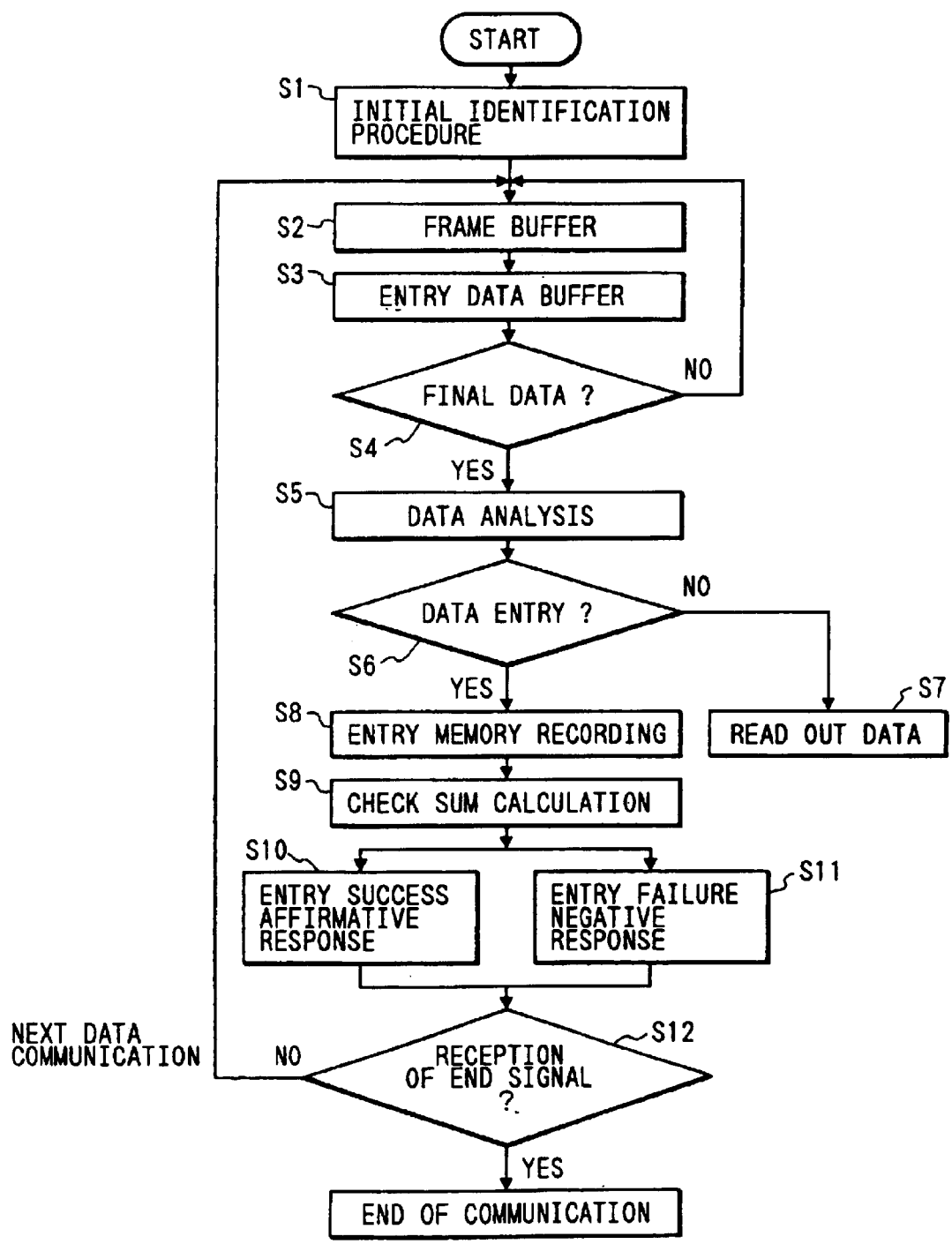

FIG. 3A

DATA ENTRY MENU

```
<< REMOTE DIAGNOSTIC SYSTEM >>

>>ONE-TOUCH/SHORTENED NUMBER

>>DESTINATION CODE          _____

>>DESTINATION ABBREVIATION  _____

>>TRANSMISSION RATE         [HIGH]

>>OVERSEAS TRANSMISSION     [0]
```

FIG. 3B

DATA TRANSMISSION MENU

```
<< REMOTE DIAGNOSTIC SYSTEM >>

[DATA TRANSMISSION]

>>DATA SELECTION

[ALL DATA]

>>CONNECTION NUMBER INPUT (20 FIGURES) _____

>>EXECUTION

OPERATION CONTENTS : [DIALING]
```

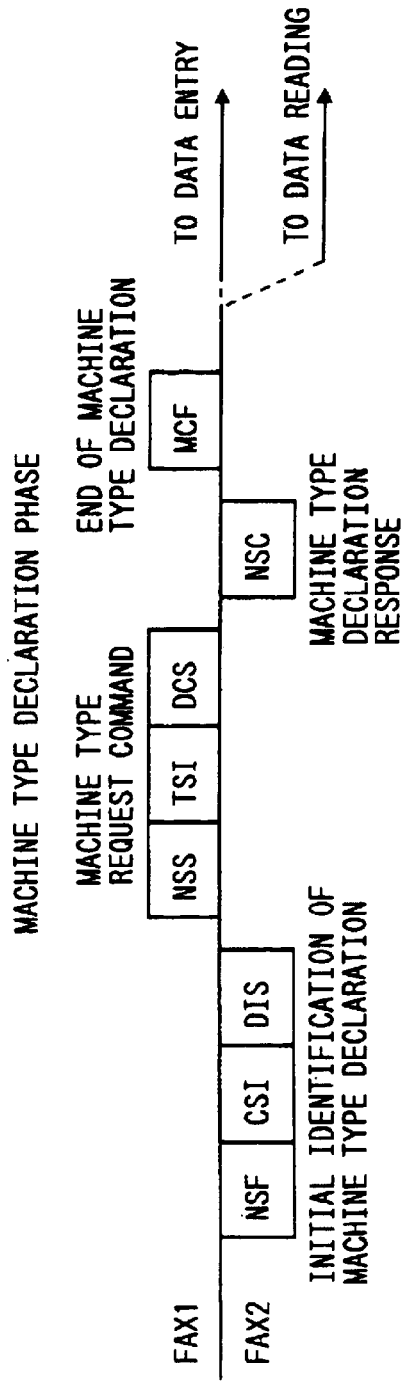

DATA ENTRY PHASE

DATA READING PHASE

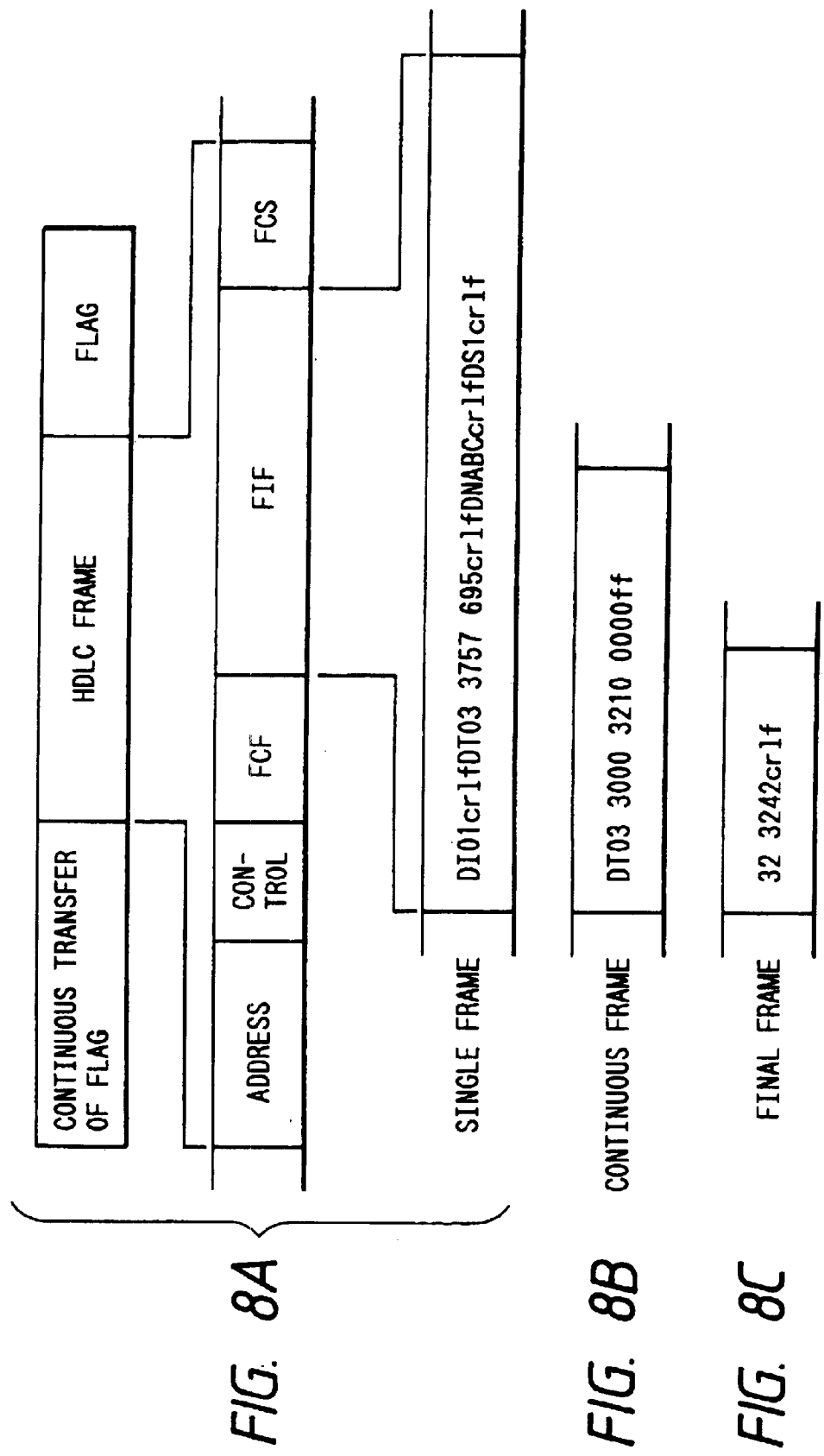

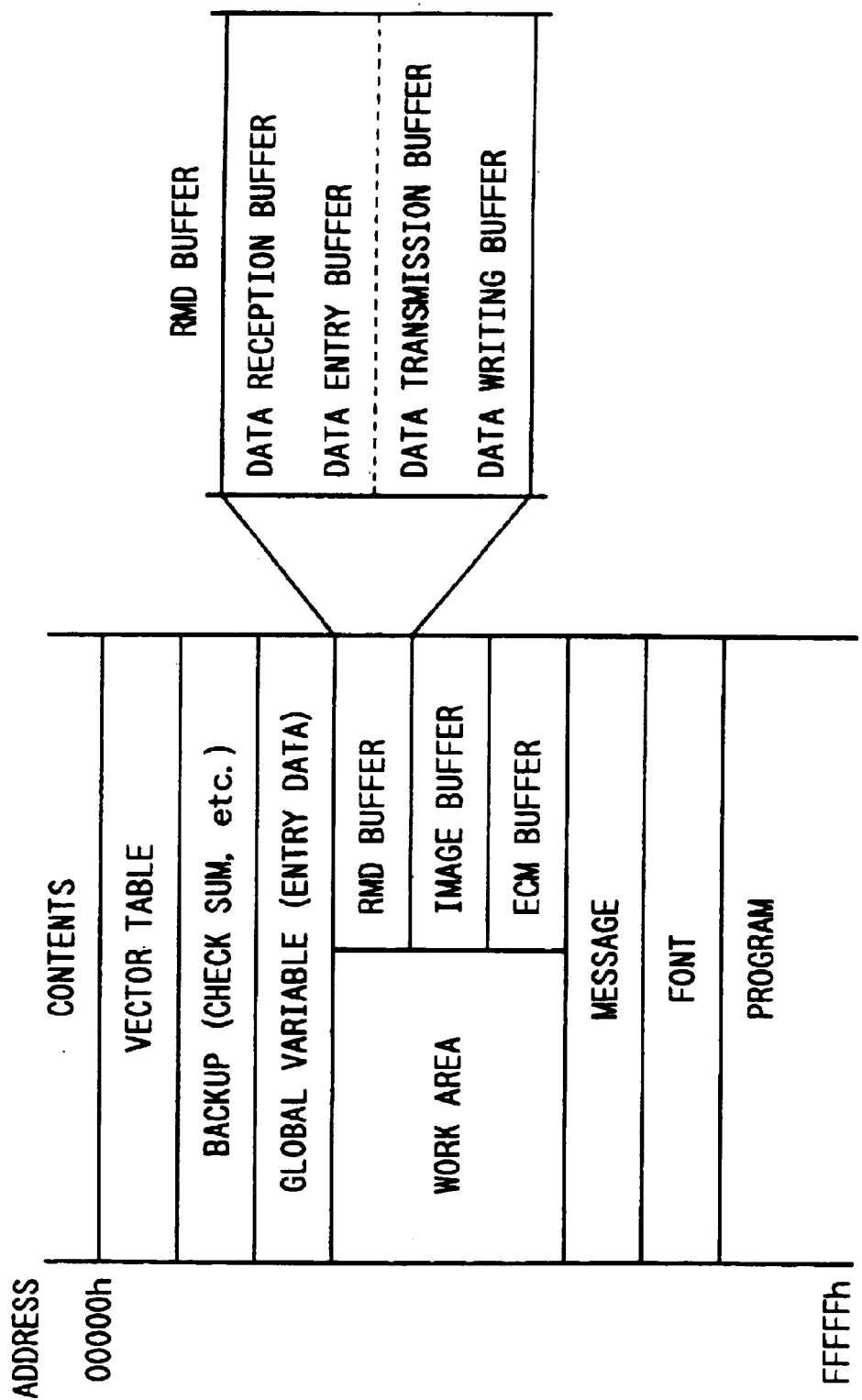

FIG. 10

| BACKUP AREA | CONTENTS OF MEMORY (HEXADECIMAL NOTATION) |
|---|---|
| . . . . . | . . . . . . . . .<br>. . . . . . . . .<br>. . . . . . . . . |
| CHECK SUM DATA | <u>A1 23</u> <u>32 13</u> <u>42 12</u> <u>32 12</u> <u>43 EF</u> <u>FF 3A</u> <u>DF EC</u> <u>CB FA</u><br>(a)    (b)    (c) · · · · · · · ·                  (z)<br>USER DATA, TEL DATA, SERVICE DATA · · · · · · · · |
| . . . . . | . . . . . . . . .<br>. . . . . . . . .<br>. . . . . . . . . |
| ENTRY DATA AREA | . . . . . . . . .<br>. . . . . . . . .<br>. . . . . . . . . |
| USER DATA AREA<br>SUM TOTAL DATA<br>→ CHECK SUM (a) | 00 FF 00 FF 33 30 33 37 35 37 20 36 39 35 34 00<br>FF FF FF FF 43 54 55 54 32 13 34 FF FF FF FF FF<br>· · · · · · · ·<br>FF FF FF FF 43 54 55 54 32 13 34 FF FF FF FF FF |
| TEL DATA AREA<br>SUM TOTAL DATA<br>→ CHECK SUM (b) | FF FF FF FF 43 54 55 54 32 13 34 FF FF FF FF FF<br>FF DD EC DE AB 43 23 14 54 35 45 23 43 56 00 00<br>· · · · · · · ·<br>· · · · · · · ·<br>FF FF FF FF 43 54 55 54 32 13 34 FF FF FF FF FF |
| SERVICE DATA AREA<br>SUM TOTAL DATA<br>→ CHECK SUM (c) | 00 FF 00 FF 33 30 33 37 35 37 20 36 39 35 34 00<br>FF FF FF FF 43 54 55 54 32 13 34 FF FF FF FF FF<br>· · · · · · · ·<br>FF FF FF FF 43 54 55 54 32 13 34 FF FF FF FF FF |
| . . . . . | . . . . . . . . .<br>. . . . . . . . .<br>. . . . . . . . . |

1) CHECK SUM CALCULATION IS EXECUTED IN ONE DATA AREA.
   EXAMPLE: ONLY (a) IS CALCULATED. SUM TOTAL IS SIMPLY CALCULATED
            REGARDLESS OF DIGIT OVERFLOW.

2) CHECK SUM CALCULATION IS EXECUTED IN ALL DATA AREAS.
   EXAMPLE: (a) TO (z) ARE CALCULATED. SUM TOTAL IS SIMPLY CALCULATED
            REGARDLESS OF DIGIT OVERFLOW.

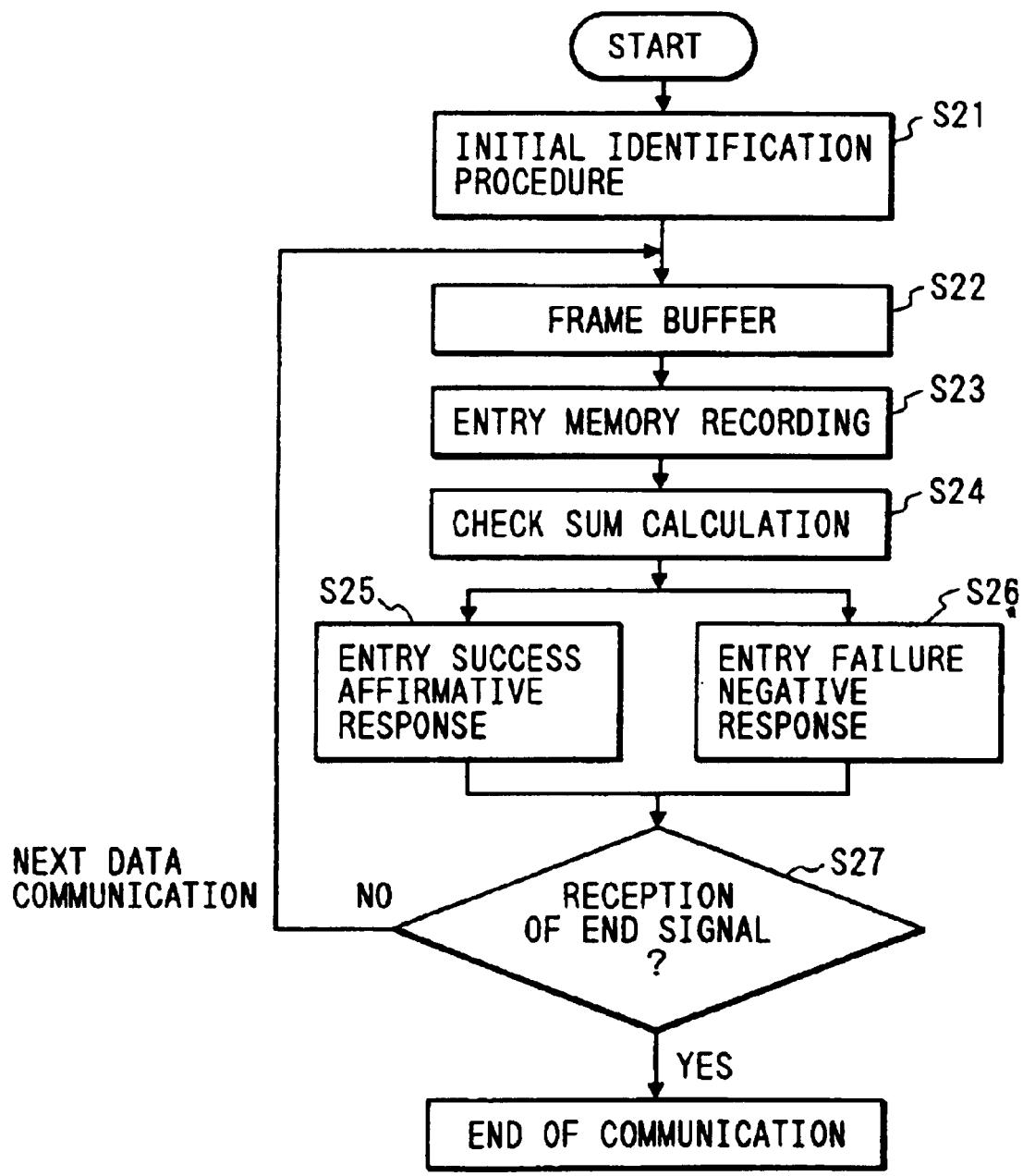

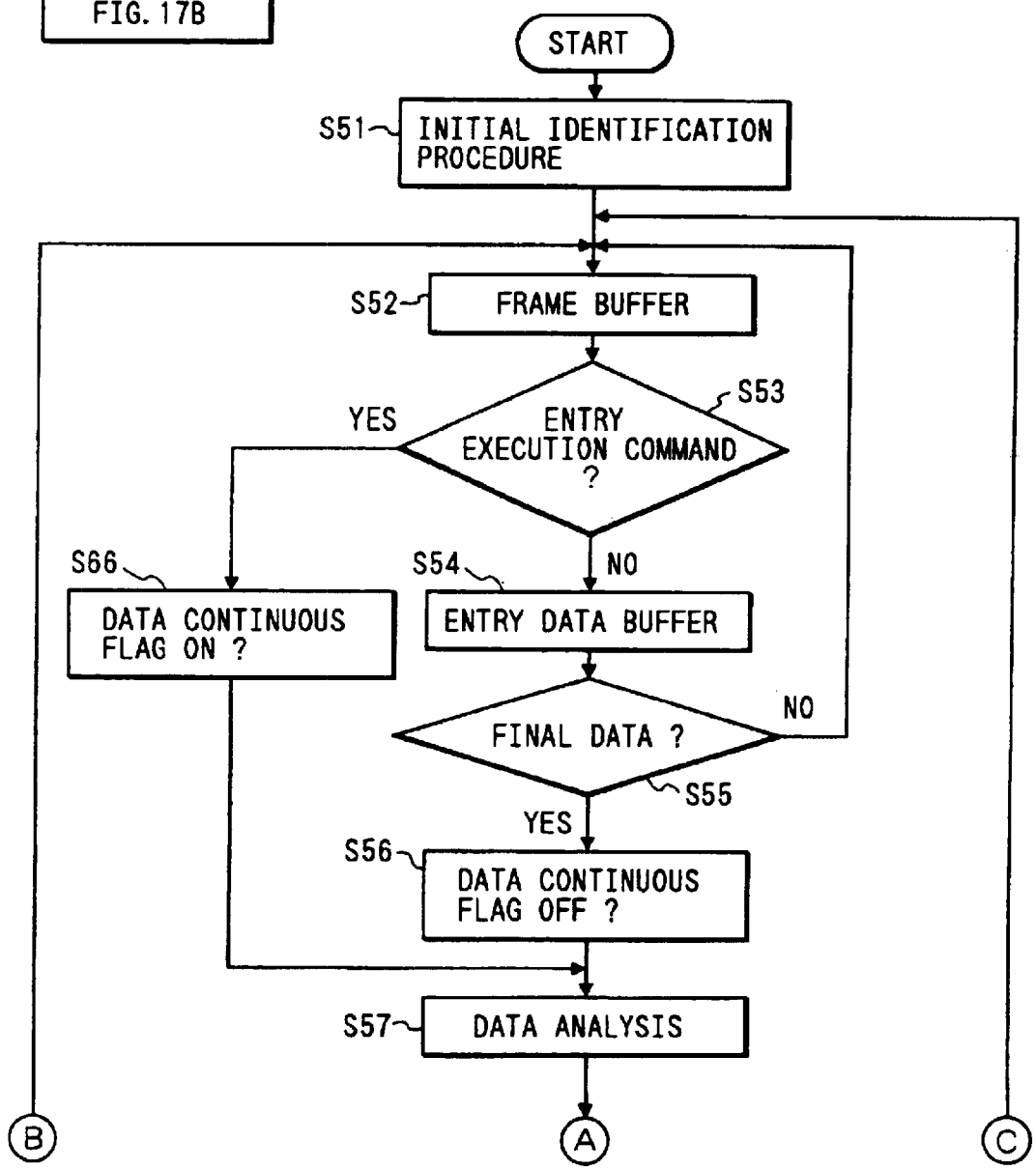

FIG. 19

| | | REMOTE COMMAND | READING DATA | EXAMPLE OF COMMAND |
|---|---|---|---|---|
| REMOTE READING | | DD | ONE-TOUCH/SHORTENED DIAL | DD |
| | | SD | SERVICE DATA | SD |
| | | TD | CALLING PERSON NAME | TD |
| | | UD | USER DATA | UD |
| REMOTE ENTRY | ONE-TOUCH/ SHORTENED DIAL | DI | ONE-TOUCH/SHORTENED DIAL NUMBER | DI01 |
| | | DT | DESTINATION CODE | DT03 3757 6954 |
| | | DN | DESTINATION ABBREVIATION | DNABC Inc. |
| | | DS | TRANSMISSION RATE | DS14400 |
| | | DO | INTERNATIONAL CIRCUIT | DO3 |
| | SERVICE DATA | SI | SERVICE INDEX | SI01 |
| | | SS | SERVICE DATA | SS0102006050... |
| | | ST | TYPE SET | STEUROPE |
| | CALLING PERSON NAME | TI | CALLING PERSON NAME NUMBER | TI01 |
| | | TN | CALLING PERSON NAME | TNSugawa |
| | USER DATA | UI | USER INDEX | UI01 |
| | | UT | USER TEL No. | UT03 3757 6955 |
| | | UN | USER ABBREVIATION | UNSugawa Kazu |

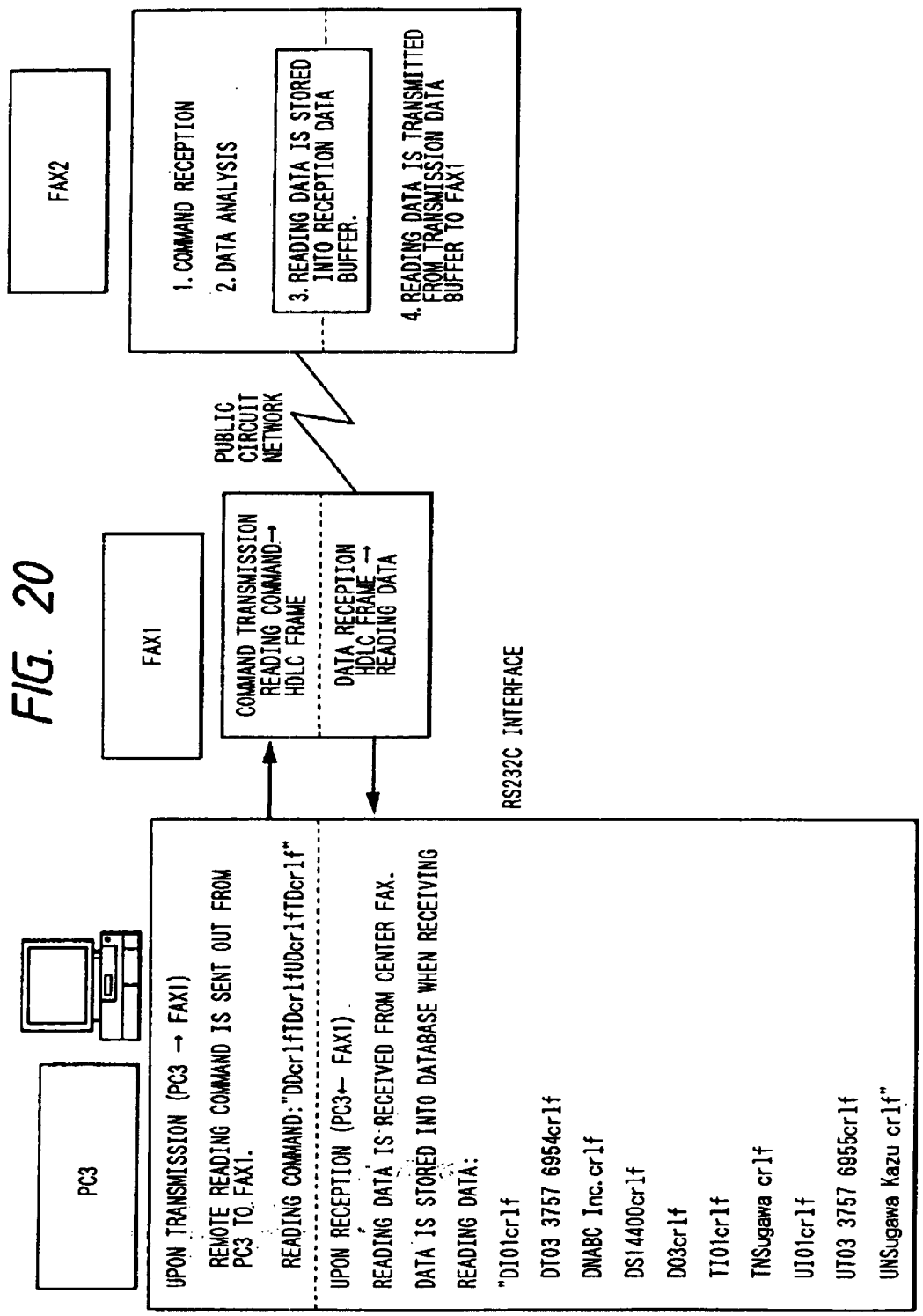

FIG. 26

<< REMOTE DIAGNOSTIC SYSTEM >>   [LEVEL 3]

[ONE-TOUCH/SHORTENED DIAL ENTRY]

>>ONE-TOUCH/SHORTENED NUMBER

>>DESTINATION CODE

>>DESTINATION ABBREVIATION

>>TRANSMISSION RATE          HIGH

>>OVERSEAS TRANSMISSION      0

>>TRANSMISSION METHOD        CONFIDENTIAL/NO RELAY

>>BOX/GROUP No.

>>ENTRY

F2:PREVIOUS ITEM   F3:NEXT ITEM   F5:DATA CLEAR   F6:RESTART

FIG. 27

```
<< REMOTE DIAGNOSTIC SYSTEM >>                                    [LEVEL 3]

[MEMORY CLEAR]

>>MACHINE TYPE SELECTION
    CF-770

>>NUMBER OF CLEAR ITEMS
    TEL

>>CONNECTION NUMBER INPUT (50 FIGURES)
    _____

>>EXECUTION

CLEAR ITEM
      TEL USER DATA SERVICE SW NCU SERVICE DAT REPORT ALL

OPERATION CONTENTS : DIALING

F2:PREVIOUS ITEM   F3:NEXT ITEM   F5:DATA DELETION   F6:RESTART
```

FIG. 28

```
<< REMOTE DIAGNOSTIC SYSTEM >>

[DATA TRANSMISSION]

USER TEL No.
   _____

USER ABBREVIATION
   _____

>>DATA SELECTION
       ALL DATA

>>CONNECTION NUMBER INPUT
   _____

>>EXECUTION

OPERATION CONTENTS : DIALING

F1:BREAK
```

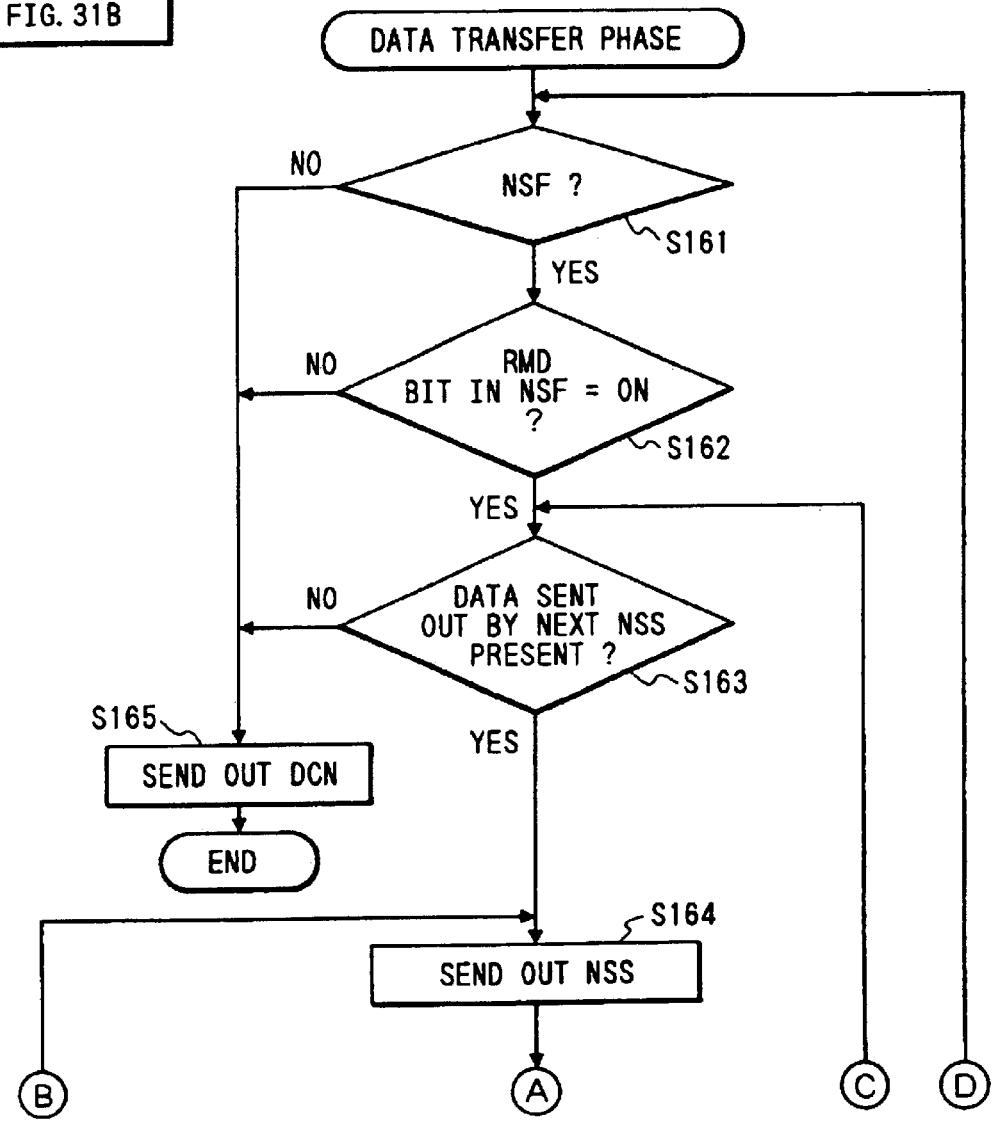

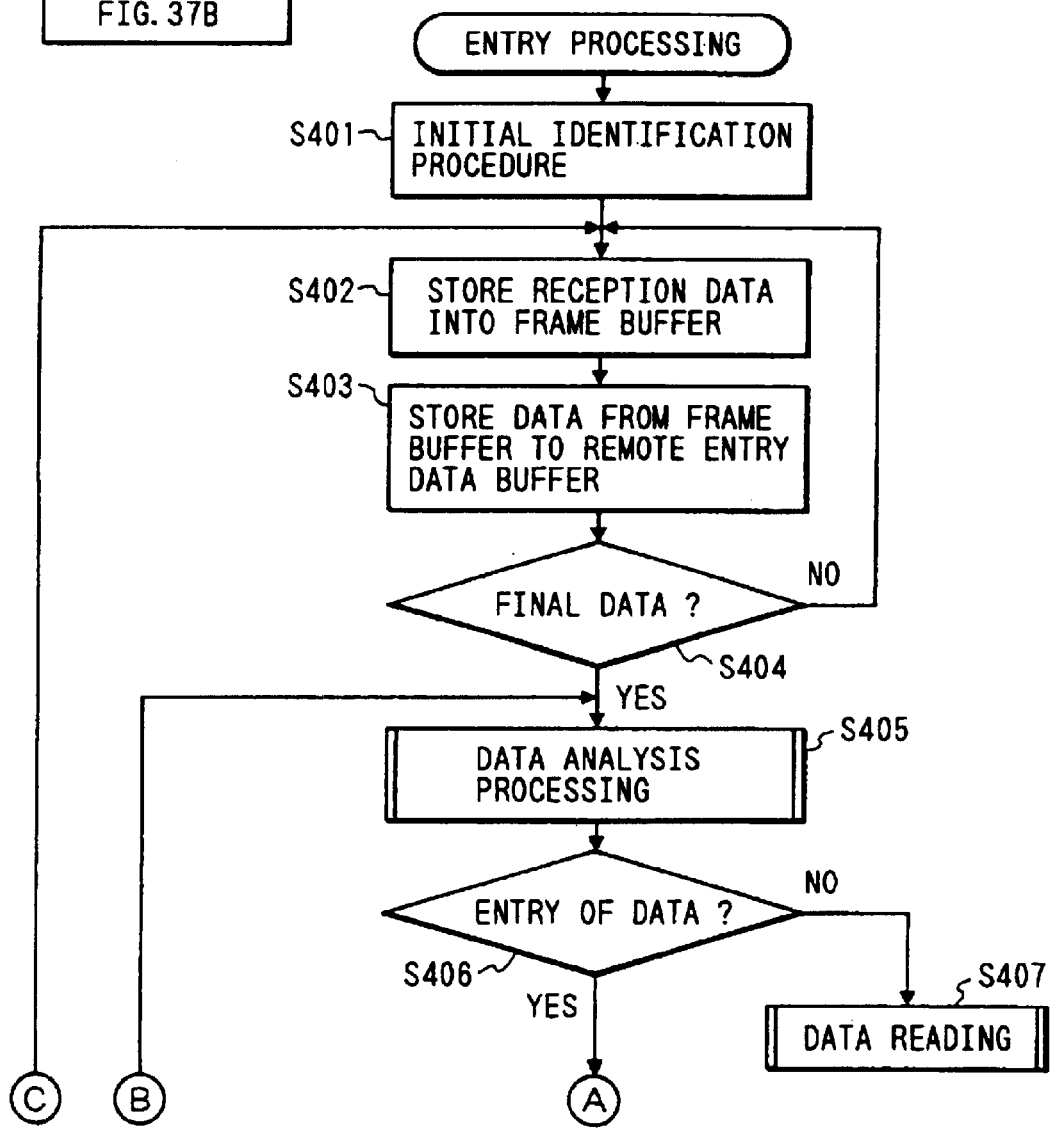

FIG. 38

| CLEAR COMMAND | REMOTE COMMAND | CLEAR DATA | EXAMPLE OF COMMAND |
|---|---|---|---|
| | MT | ENTRY CONTENTS OF TEL No. | MTcrlf |
| | MU | USER DATA, USER SOFT SWITCH | MUcrlf |
| | MS | SERVICE DATA | MScrlf |
| | MM | SYSTEM DUMP LIST | MMcrlf |
| | MR | COMMUNICATION MANAGEMENT REPORT | MRcrlf |
| | MA | ALL SETTING AND ENTRY DATA | MAcrlf |

| << REMOTE DIAGNOSTIC SYSTEM >> | |
|---|---|
| ≫ ONE-TOUCH/SHORTENED NUMBER | 3 |
| ≫ DESTINATION CODE | 03  4567  8901 |
| ≫ DESTINATION ABBREVIATION | ABC INC. |
| ≫ TRANSMISSION RATE | HIGH |
| ≫ OVERSEAS TRANSMISSION | 0 |

FIG. 42A
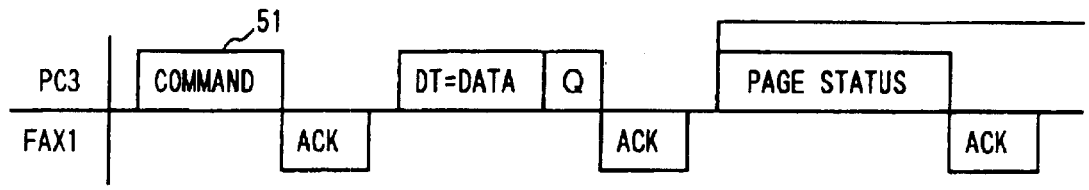
FIG. 42B
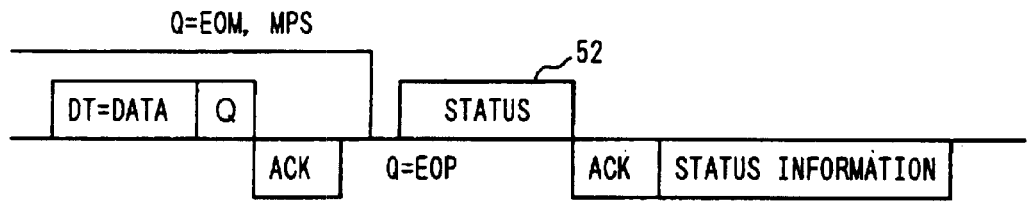
FIG. 42C
FILE WRITE COMMAND FORMAT
CC=010704/CD=00/IM=[00]/PW=[05]//
    CD: DATA CODE
    IM: LINE DENSITY
    PW: RECORDING WIDTH
FIG. 42D
STATUS COMMAND FORMAT
CC=020000/ST=03 [/FN=nn]//
    ST: FAX END STATUS
    FN: FILE No.

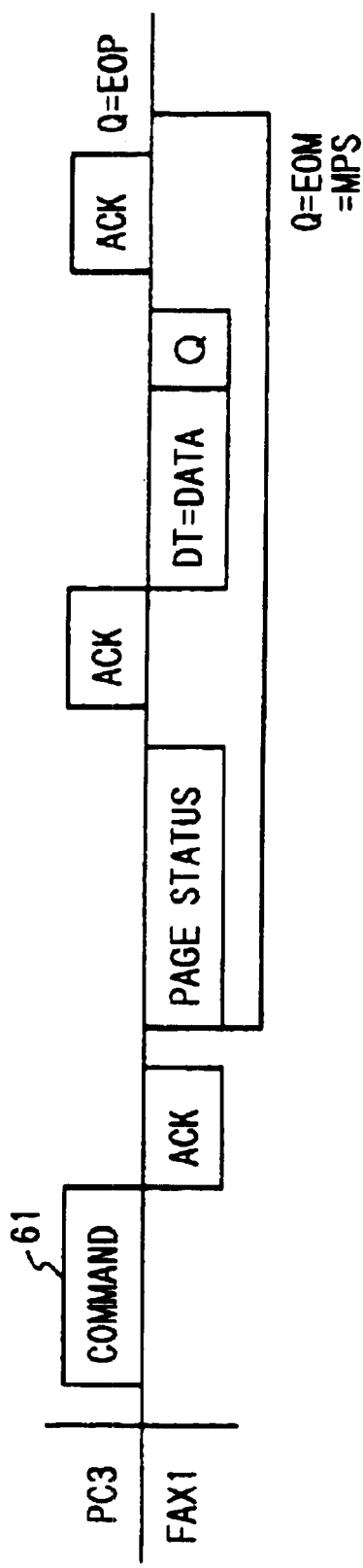

RX : MCF

TX : DT03 4567 8901

RX : MCF

TX : DNABC INC.

RX : MCF

TX : DS1

RX : MCF

LOG FILE 1

RX : UNABC FAX

TX : MCF

RX : NSF

TX : UT

RX : UT03 4567 0123

TX : MCF

RX : NSF

LOG FILE 2

STATUS COMMAND FORMAT

CC=020000/ST=03 [/FN=nn] //
    ST:FAX END STATUS
    FN:FILE No.

ES=010504****/FN=100//

- EXECUTION COMMAND
- COMMUNICATION STATUS
- FILE No.

FIG. 58A

COMMUNICATION ADAPTER
FILE No. 100 UPON COMMUNICATION

| PC3 | CC=020000/ST=03/FN=100// | | |
|---|---|---|---|
| FAX1 | | ACK | ES=010504*****/FN=100// |

FIG. 58B

COMMUNICATION ADAPTER
FILE No. 100 END OF COMMUNICATION

| PC3 | CC=020000/ST=03/FN=100// | | |
|---|---|---|---|
| FAX1 | | ACK | ES=01050400000/FN=100// |

FIG. 58C

COMMUNICATION ADAPTER
FILE No. 100 COMMUNICATION ERROR (ERROR No. 123)

| PC3 | CC=020000/ST=03/FN=100// | | |
|---|---|---|---|
| FAX1 | | ACK | ES=010504##123/FN=100// |

FIG. 62

```
<< REMOTE DIAGNOSTIC SYSTEM >>
[NSF/DIS READING]

⇗  CONNECTION NUMBER INPUT (20 FIGURES)
                                                    [DIS]
                                   00-01-02-03-04-05-06-07-08-09
                                   00 00 00 00 00 00 00 00 00 00
                                                    [NSF]
                                   00-01-02-03-04-05-06-07-08-09
                                   00 00 00 00 00 00 00 00 00 00
                                   00 00 00 00 00 00 00 00 00 00
                                   00 00 00 00 00 00 00 00 00 00
                                   00 00 00 00 00 00 00 00 00 00
                                   00 00 00 00 00 00 00 00 00 00
                                   00 00 00 00 00 00 00 00 00 00
                                   00 00 00 00 00 00 00 00 00 00
                                   00 00 00 00 00 00 00 00 00 00

≫ EXECUTION
 1. DESIGNATE OUTPUT SIDE
    [ PRINTER ]

2. REMOTE MAINTENANCE MENU

OPERATION CONTENTS :  [ TRANSMITTING ]

F1:BREAK    F8:PRINT
```

INITIAL IDENTIFICATION OF
MACHINE TYPE DECLARATION

FIG. 78

```
(1) MACHINE TYPE DB

·MENU SCREEN GENERATION INFORMATION (menu_tbl)
        DATA FOR GENERATING ENTRY MENU SCREEN FOR EACH INPUT LEVEL
        DATA ON SCREEN WHICH TRANSITS FROM ENTRY MENU SCREEN FOR EACH INPUT LEVEL
  ·ENTRY TABLE INFORMATION (tbl_dat)
        TABLE DATA IN USER DB TO WHICH DATA IS INPUT
  ·ENTRY SCREEN GENERATION INFORMATION (reg_dat)
        DATA FOR GENERATING DATA INPUT DISPLAY SCREEN FOR EACH INPUT LEVEL
        DATA INDICATIVE OF DATA INPUT POSITION FOR EACH INPUT LEVEL
        COLUMN NAME OF USER DB, INPUT FOR EACH INPUT LEVEL
  ·DATA INPUT METHOD (clm_dat)
        DATA INPUT METHOD TO EACH COLUMN OF USER DB, AND INPUT DATA SCOPE
  ·SELECTIVE DATA INFORMATION OF USER SOFT SW (ussw_dat)
        DATA REFERRING TO sel_dat TABLE INDICATIVE OF OUTPUT MESSAGE FOR USER SOFT SW INPUT
  ·ACCESS INFORMATION OF USER SOFT SW · SERVICE SOFT SW (sw_dat)
        DATA CORRESPONDING TO DATA INPUT SCREEN OF USER SOFT SW, SERVICE SOFT SW
  ·SELECTIVE MESSAGE AND DEFAULT MESSAGE INFORMATION UPON SELECTIVE INPUT (sel_dat)
        DATA FOR INPUTTING DATA REPRESENTING OUTPUT MESSAGE AND COLUMN WHEN INPUTTING DATA
        BY SELECTING MESSAGE
  ·FUNCTION KEY INFORMATION (fno_dat)
        DATA REPRESENTING MESSAGE OF FUNCTION KEY, DISPLAYED ON DATA INPUT SCREEN
  ·MESSAGE INFORMATION (msg)
        TABLE TO WHICH ACTUAL CONDITION OF MESSAGE IS STORED (ENTRY IN THREE TYPES OF
        JAPANESE, ENGLISH AND USER CAN BE READY.)
  ·READING INFORMATION
        DATA TABLE FOR DATA-PROCESSING TO USER DB TABLE WITH REFERENCE TO TABLE DATA
        UPON DATA RECEPTION, DATA TRANSMISSION, FILE DATA READING, FILE DATA RESERVATION,
        USER DB TABLE INITIALIZATION IN PC (DATA DELETION, 0 CLEAR)
  ·USER TERMINAL DATA READING COMMAND TABLE
        TABLE FOR STORING DATA FOR READING USER DB DATA OF USER TERMINAL
  ·INVERTED MESSAGE REPRESENTATION TABLE
        DATA REPRESENTING MESSAGE INVERTED
```

(2) USER DB

| | |
|---|---|
| TABLE 1 | DATA OF USER TEL No./ABBREVIATION AND POLING ID ARE HANDLED. |
| TABLE 2 | DATA OF CALLING PERSON NAME IS HANDLED. |
| TABLE 3 | ONE-TOUCH/SHORTENED DIAL DATA IS HANDLED. |
| TABLE 4 | GROUP DIAL DATA IS HANDLED. |
| TABLE 5 | F NETWORK DIAL DATA IS HANDLED. |
| TABLE 6 | MAIL POST DATA IS HANDLED. |
| TABLE 7 | RELAY GROUP DATA IS HANDLED. |
| TABLE 8 | CONFIDENTIAL BOX DATA IS HANDLED. |
| TABLE 9 | USER SOFT SW DATA IS HANDLED. |
| TABLE 10 | SERVICE SOFT SW DATA IS HANDLED. |

FIG. 80

MENU SCREEN (MENU REFERRING TO SCREEN DB)

MODE SELECTIVE SCREEN, LEVEL SELECTIVE SCREEN, COMMAND SELECTIVE SCREEN, NEW ENTRY SCREEN, DATA RECEPTION SCREEN, DATA TRANSMISSION SCREEN, FILE DATA READING SCREEN, DATA LIST OUTPUT SCREEN, REMOTE MAINTENANCE SCREEN

← EACH SCREEN IS COMPOSED OF A PLURALITY OF TABLE INFORMATION.

SCREEN DB  212

- TABLE FOR STORING DATA REPRESENTING FIXED MESSAGE
- TABLE FOR STORING DATA FOR DERIVING MACHINE TYPE NAME ID
- TABLE FOR STORING KEY SENSE DATA
- TABLE FOR STORING DATA REPRESENTING INVERTED MESSAGE FOR SELECTION
- TABLE FOR STORING DATA DESIGNATING WRITE START POSITIONS OF CONNECTION NUMBER AND FILE NAME
- TABLE FOR STORING DATA REPRESENTING MESSAGE FOR SELECTING SELECTIVE ITEM
- TABLE FOR STORING DATA REPRESENTING OPERATION CONTENTS
- TABLE FOR STORING DATA REPRESENTING TABLE DATA OF USER DB IN COLUMN UNIT
- TABLE TO WHICH ACTUAL CONDITION OF MESSAGE IS STORED (ENTRY IN THREE TYPES OF JAPANESE, ENGLISH AND ANY USER MESSAGE IS AVAILABLE.)

FIG. 82

```
    << REMOTE DIAGNOSTIC SYSTEM >>
                                       181
[MODE SELECTION]

PLEASE SELECT ITEM.

1. DATA ENTRY

2. REMOTE MAINTENANCE

3. END
```

INITIAL MENU SCREEN

FIG. 83

```
    << REMOTE DIAGNOSTIC SYSTEM >>

[LEVEL SELECTION]

PLEASE SELECT ITEM.

1. LEVEL 1 (GENERAL ENTRY)

2. LEVEL 2 (GENERAL ENTRY + ADDITIONAL ENTRY)

3. LEVEL 3 (GENERAL ENTRY + ADDITIONAL ENTRY
               + SERVICE DATA ENTRY)
```

ENTRY LEVEL SELECTIVE MENU SCREEN

FIG. 84

```
<< REMOTE DIAGNOSTIC SYSTEM >>
[COMMAND SELECTION]
PLEASE SELECT ITEM
    1. NEW ENTRY
    2. DATA RECEPTION
    3. DATA READING
```

COMMAND SELECTIVE SCREEN
(WHEN NOT SELECTING MACHINE TYPE NAME OF FACSIMILE TERMINAL)

FIG. 85

```
<< REMOTE DIAGNOSTIC SYSTEM >>
[COMMAND SELECTION]
PLEASE SELECT ITEM.
    1. NEW ENTRY
    2. DATA RECEPTION
    3. DATA READING
    4. CHANGE ENTRY
    5. DATA TRANSMISSION
    6. DATA RESERVATION
    7. DATA LIST OUTPUT
    8. TIME SET
```

COMMAND SELECTIVE SCREEN
(WHEN SELECTING MACHINE TYPE OF FACSIMILE TERMINAL)

FIG. 86

```
<< REMOTE DIAGNOSTIC SYSTEM >>
[ENTRY MENU]                              [LEVEL 1]
  PLEASE SELECT ITEM.
      1. USER TEL No./ABBREVIATION ENTRY
      2. CALLING PERSON NAME ENTRY
      3. ONE-TOUCH/SHORTENED DIAL ENTRY
```

ENTRY MENU SCREEN (ENTRY LEVEL 1)

FIG. 87

```
<< REMOTE DIAGNOSTIC SYSTEM >>
[ENTRY MENU]                              [LEVEL 2]
  PLEASE SELECT ITEM.
      1. USER TEL NO./ABBREVIATION ENTRY
      2. CALLING PERSON NAME ENTRY
      3. ONE-TOUCH/SHORTENED DIAL ENTRY
      4. GROUP DIAL ENTRY
      5. F NETWORK DIAL ENTRY
      6. MAIL POST ENTRY
      7. RELAY GROUP ENTRY
      8. CONFIDENTIAL BOX ENTRY
      9. USER SOFT SW ENTRY
      A. DATA LIST OUTPUT
```

ENTRY MENU SCREEN (ENTRY LEVEL 2)

FIG. 88

```
<< REMOTE DIAGNOSTIC SYSTEM >>
[ENTRY MENU]                              [LEVEL 3]
PLEASE SELECT ITEM.

1. USER TEL No./ABBREVIATION ENTRY
    2. CALLING PERSON NAME ENTRY
    3. ONE-TOUCH/SHORTENED DIAL ENTRY
    4. GROUP DIAL ENTRY
    5. F NETWORK DIAL ENTRY
    6. MAIL POST ENTRY
    7. RELAY GROUP ENTRY
    8. CONFIDENTIAL BOX ENTRY
    9. USER SOFT SW ENTRY
    A. SERVICE SOFT SW ENTRY
    B. DATA LIST OUTPUT
```

ENTRY MENU SCREEN (ENTRY LEVEL 3)

FIG. 89

```
<< REMOTE DIAGNOSTIC SYSTEM >>

[ONE-TOUCH/SHORTENED DIAL ENTRY]                        [LEVEL 1]
   >>ONE-TOUCH/SHORTENED NUMBER       __
   >>DESTINATION CODE                 _____
   >>DESTINATION ABBREVIATION         _____
   >>ENTRY

F2:PREVIOUS ITEM    F3:NEXT ITEM    F5:DATA DELETION   F6:RESTART
```
ONE-TOUCH/SHORTENED ENTRY SCREEN (ENTRY LEVEL 1)

FIG. 90

```
<< REMOTE DIAGNOSTIC SYSTEM >>

[ONE-TOUCH/SHORTENED DIAL ENTRY]                        [LEVEL 2]
   >>ONE-TOUCH/SHORTENED NUMBER       __
   >>DESTINATION CODE                 _____
   >>DESTINATION ABBREVIATION         _____
   >>TRANSMISSION RATE
   >>OVERSEAS TRANSMISSION
   >>TRANSMISSION METHOD
   >>BOX/GROUP No.
   >>ENTRY
F2:PREVIOUS ITEM    F3:NEXT ITEM    F5:DATA DELETION   F6:RESTART
```
ONE-TOUCH/SHORTENED ENTRY SCREEN (ENTRY LEVELS 2,3)

FIG. 91

| | | LEVEL | REMOTE COMMAND | READING DATA | EXAMPLE OF COMMAND |
|---|---|---|---|---|---|
| REMOTE ENTRY | ONE-TOUCH/ SHORTENED DIAL | 1 | DI | ONE-TOUCH/SHORTENED DIAL | DI01 |
| | | 1 | DT | DESTINATION CODE | DT03 3757 6954 |
| | | 1 | DN | DESTINATION ABBREVIATION | DNABC Inc. |
| | | 1 | DS | TRANSMISSION RATE | DS14400 |
| | | 1 | DO | INTERNATIONAL CIRCUIT | DO3 |
| | SERVICE DATA | 3 | SI | SERVICE INDEX | SI01 |
| | | 3 | SS | SERVICE DATA | SS0102006050.... |
| | | 3 | ST | TYPE SET | ST$_{EUROPE}$ |
| | CALLING PERSON NAME | 1 | TI | CALLING PERSON NAME NUMBER | TI01 |
| | | 1 | TN | CALLING PERSON NAME | TNSugawara |
| | USER DATA | 1 | UI | USER INDEX | UI01 |
| | | 1 | UT | USER TEL No. | UT03 3757 6955 |
| | | 1 | UN | USER ABBREVIATION | UNSugawara Kazuhiro |
| | GROUP DIAL | 2 | GI | GROUP DIAL INDEX | GI02 |
| | | 2 | GT | ONE-TOUCH/SHORTENED DIAL | GT01,02,*01,*02 |
| | | 2 | GN | GROUP ABBREVIATION | GIABC Group |

FIG. 92

```
<< REMOTE DIAGNOSTIC SYSTEM >>

[DATA RECEPTION]                                    [LEVEL 1]

>>MACHINE TYPE NAME SELECTION
  >>CONNECTION NUMBER INPUT (20 FIGURES)
  >>EXECUTION

OPERATION CONTENTS:
F1:BREAK
```

FIG. 94

```
<< REMOTE DIAGNOSTIC SYSTEM >>

[LEVEL SELECTION]

PLEASE SELECT ITEM.

1. LEVEL 1 (GENERAL ENTRY)                        PASS WORD ____
   2. LEVEL 2 (GENERAL ENTRY + ADDITIONAL ENTRY)     PASS WORD ____
   3. LEVEL 3 (GENERAL ENTRY + ADDITIONAL ENTRY
                 + SERVICE DATA ENTRY)                PASS WORD ____
```

ENTRY LEVEL SELECTIVE MENU SCREEN (PASS WORD SETTING)

FIG. 93

| | LEVEL | REMOTE COMMAND | READING DATA | EXAMPLE OF COMMAND |
|---|---|---|---|---|
| REMOTE READING | 2 | CD | CONFIDENTIAL BOX | CD |
| | 1 | DD | ONE-TOUCH/SHORTENED DIAL | DD |
| | 2 | FD | F NETWORK DIAL | FD |
| | 2 | GD | GROUP DIAL | GD |
| | 1 | KD | CIRCUIT DATA | KD |
| | 3 | SD | SERVICE SOFT SW DATA | SD |
| | 1 | TD | CALLING PERSON NAME | TD |
| | 2 | UD | USER SOFT SW DATA | UD |

FIG. 97

<< REMOTE DIAGNOSTIC SYSTEM >>
[ P.G.P. ]

>>CONNECTION NUMBER INPUT (20 FIGURES)    ---------
    >>EXECUTION OF P.G.P. DATA READING
    >>EXECUTION OF P.G.P. DATA INITIALIZATION

[ P.G.P. DATA DISPLAY ]
  ALL COMMUNICATION NUMBER    —
  ALL ERROR NUMBER    —
  TRANSMITTED SHEET SIZE    A4_    B4_
  RECEIVED SHEET SIZE    A4_    B4_

OPERATION CONTENTS : <u>DIALING</u>

F1:BREAK    F8:PRINT

FIG. 100

DATA NUMBER: CHARACTER CODE DATA (HEXADECIMAL NOTATION)

```
                                   DATA AFTER
                                   CONVERSION OF 05H
0000:00 01 02 03 04 08 06 05 - 07 09 0A 0B 0C 0D 0E 0F  ⎫
0010:30 31 32 33 34 35 36 37 - 38 39 3A 3B 3C 3D 3E 3F  ⎬ CHARACTER CODE CONVERSION TABLE
0020:40 41 42 43 44 45 46 47 - 48 49 4A 4B 4C 4D 4E     ⎭ TAB1
  :  : :  :  :  :  :  :  :  :  :  :  :  :  :  :  :
                       DATA PRIOR TO
                       CONVERSION OF 08H
0100:00 01 02 03 04 07 06 08 - 05 09 0A 0B 0C 0D 0E 0F  ⎫
0110: : :  :  :  :  :  :  :  :  :  :  :  :  :  :  :    ⎬ CHARACTER CODE INVERSION TABLE
0120: : :  :  :  :  :  :  :  :  :  :  :  :  :  :  :    ⎭ TAB2
0130:10 11 12 13 14 15 16 17 - 18 19 20 21 22 23 24 25
  :  : :  :  :  :  :  :  :  :  :  :  :  :  :  :  :

0200:00 01 02 03 04 07 06 08 - 05 09 0A 0B 0C 0D 0E 0F  ⎫
0210: : :  :  :  :  :  :  :  :  :  :  :  :  :  :  :    ⎬ CHARACTER CODE INVERSION TABLE
0220: : :  :  :  :  :  :  :  :  :  :  :  :  :  :  :    ⎭ FOR PRINTER TAB3
0230:10 11 12 13 14 15 16 17 - 18 19 20 21 22 23 24 25
  :  : :  :  :  :  :  :  :  :  :  :  :  :  :  :  :
```

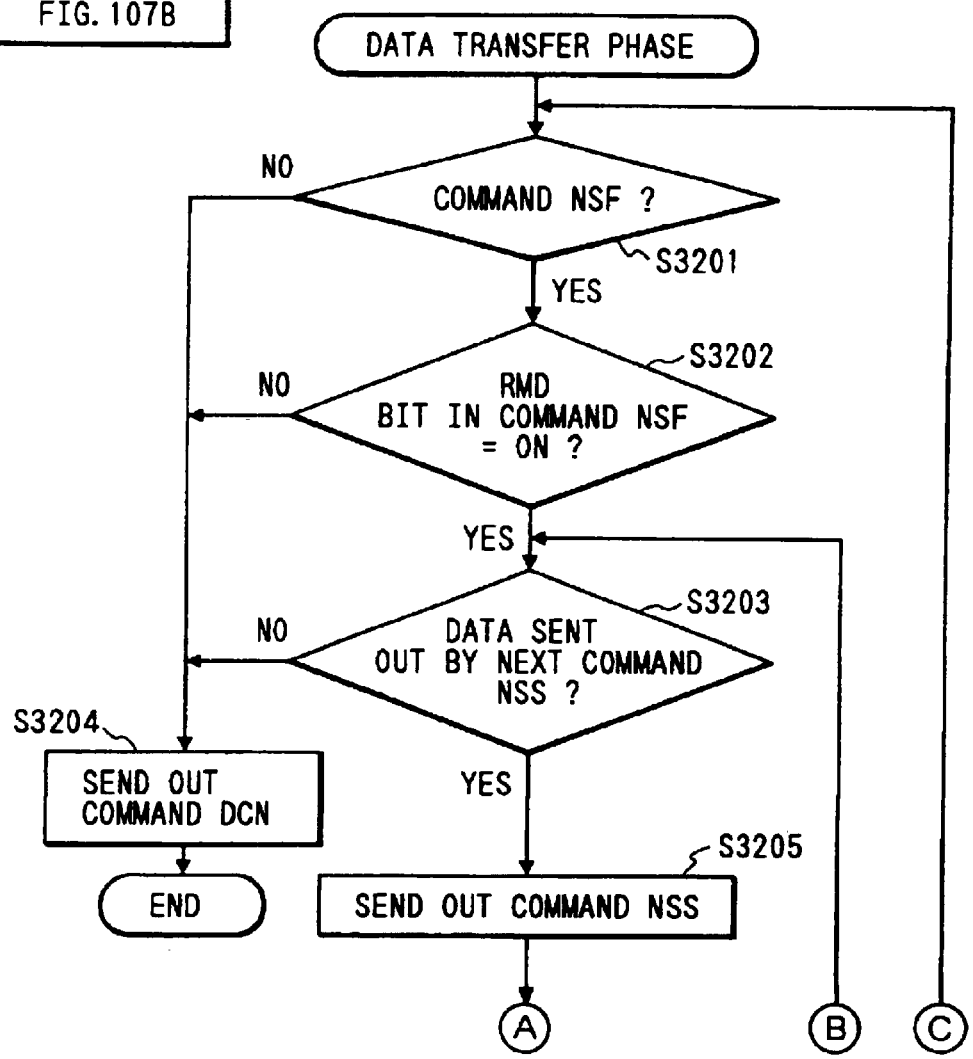

COMMUNICATION SYSTEM BETWEEN COMPUTER AND FACSIMILE MACHINE

This application is a division of application Ser. No. 08/855,505, filed on May 13, 1997, now U.S. Pat. No. 5,907,409, which is a continuation of application Ser. No. 08/476,324, filed on Jun. 7, 1995, now abandoned, which is a division of application Ser. No. 08/143,137, filed on Oct. 29, 1993, now U.S. Pat. No. 5,477,339.

BACKGROUND OF THE INVENTION

1. Field of the Invention

The present invention relates to a data communication system between computers and facsimile machines.

2. Related Background Art

Hitherto, a multiplicity of entry information items must be caused to enter a facsimile machine, for example, shortened dials, user's telephone numbers, abbreviated names and the like. The foregoing information has been manually caused to enter and read output by a service person or a user. Further, investigations and adjustments have been performed by the service man who has visited the place where the facsimile machine is place. The internal information in the facsimile machine has been read output and setting has been changed. Further, the check sum has been executed whenever one data item is received for each entry information category.

The initialization of the entry data has been performed by a method in which the entry item is initialized by using a data clear menu placed on a control panel or another method in which the data is initialized by using a clear key at the time of entering (registering) the data.

However, the foregoing conventional facsimile machine involves a fact that one communication process is insufficient to enter a multiplicity of data items at the time of the data entry operation. Another problem arises in that, if data is simply caused to enter at the time of the data entry process, abnormality of the entry data, if any, cannot be detected.

In the foregoing conventional process of initializing the entry data to be performed by using the control panel, data change at the time of the remote data entry can be realized by only over-writing of data. Therefore, each entry data is initialized by selecting the clear key at the time of entering the data. As a result, there arises a problem in that the data deletion operation is too complicated to be completed.

SUMMARY OF THE INVENTION

An object of the present invention is to provide a facsimile communication system in which both entry (registry) and reading of remote data are performed to generate entry confirmation data at the time of data entry or to initialize the entry data so that the maintenance and service of the apparatus is facilitated.

Another object of the present invention is to provide a facsimile communication system in which the center side facsimile apparatus is able to confirm remote entry data.

Another object of the present invention is to provide a communication apparatus directed to overcome the foregoing conventional problems and capable of leaving hysteresis of data entry by way of communication so that the functions of the destined apparatus and the state of the communication are enabled to be known from the host computer.

Another object of the present invention is to provide a remote data entry (registry) system and a facsimile apparatus directed to overcome the foregoing conventional problems and capable of causing remote facsimile apparatuses to prevent undesirable entry of data from the center.

Another object of the present invention is to provide a remote data entry system that allows a side for performing remote data entry to limit data which can be allowed to enter or which can be read out.

The present invention is directed to overcome the foregoing conventional problems and an object of the present invention is to provide a character data processing method for a facsimile apparatus which is arranged in such a manner that an entry character code from an external unit is converted by the external unit to correspond to an exclusive character code in a facsimile apparatus connected to the external unit and in a plurality of remote facsimile apparatuses to which an access can be made by the facsimile apparatus to be stored and managed so that characters having different character codes among the external unit, the facsimile apparatus and the plurality of remote facsimile apparatuses to which an access can be made by the facsimile apparatus are enabled to normally enter or remote-enter the facsimile apparatus or the plurality of remote facsimile apparatuses from the external unit, the character data processing method for a facsimile apparatus being able to reading entry character data entered the facsimile apparatus and the plurality of remote facsimile apparatuses to which an access can be made by the facsimile apparatus from a display means or a printing means of the external apparatus to normally display or print the entry character data.

Other and further objects, features and advantages of the invention will be appear more fully from the following description.

BRIEF DESCRIPTION OF THE DRAWINGS

FIG. 2 is a flow chart which illustrates the procedure of the operation of the facsimile communication system according to a first embodiment to be performed at the time of remote data entry;

FIGS. 3A and 3B are views which illustrate a data entry menu and a data transmission menu according to the first embodiment;

FIG. 4 is a view which illustrates a remote entry command according to the first embodiment;

FIG. 5 is a view which illustrate a remote entry communication procedure according to the first embodiment;

FIGS. 8A to 8C are views which illustrate an HDLC frame format according to the first embodiment;

FIG. 9 is a view which illustrates the internal memory structure of the facsimile apparatus according to the first embodiment;

FIG. 10 is a table which illustrates the relationship between the internal memory structure of the facsimile apparatus according to the first embodiment and the check sum;

FIG. 11 is an operation flow chart for a facsimile communication system according to a first modification of the first embodiment;

FIG. 19 is a view which illustrates remote reading commands and remote entry according to the second embodiment;

FIG. 20 is a view which illustrates the flow of data in a PC at the time of receiving remote reading data according to the second embodiment;

FIG. 26 is a view which illustrates an example of an entry menu of one touch/shortened dial according to a third embodiment of the present invention;

FIG. 27 is a view which illustrates a memory clear menu according to the third embodiment;

FIG. 28 is a data transmission menu according to the third embodiment;

FIG. 38 is a view which illustrates a remote clear command according to another embodiment;

FIGS. 42A to 42D are views which illustrate a transfer command format of a PC data file of the remote entry system by way of an interface RS-232C;

FIGS. 43A and 43B are views which illustrate a PC transfer command format of a data file of the remote entry system by way of the interface RS-232C;

FIG. 50 is a view which illustrates an example of a log file according to the fourth embodiment;

FIG. 51 is a view which illustrates an example of a log file according to the fifth embodiment;

FIGS. 58A to 58C are views which illustrate an example of a status command response by way of the interface RS-232C of the RMD system;

FIG. 62 is a view which illustrates an NSF/DIS reading menu on a PC image plane of the remote entry system;

FIG. 78 is a structure view which illustrates the machine type data base (the machine type DB);

FIG. 79 is a structure view which illustrates the machine type data base (the user DB);

FIG. 80 is a view which illustrates the structure of an image plane data base and a reference menu image plane of the image plane DB;

FIG. 82 is a view which illustrates a mode selection menu image plane;

FIG. 83 is a view which illustrates an entry level selection menu;

FIG. 84 is a view which illustrates a command selection menu image plane;

FIG. 85 is a view which illustrates the command selection menu image plane;

FIG. 86 is a view which illustrates an entry menu image plane (level 1);

FIG. 87 is a view which illustrates an entry menu image plane (level 2);

FIG. 88 is a view which illustrates an entry menu image plane (level 3);

FIG. 89 is a view which illustrates a one touch/shortened dial entry menu (level 1);

FIG. 90 is a view which illustrates a one touch/shortened dial entry menu (level 2);

FIG. 91 is a view which illustrates an example of a remote entry command;

FIG. 92 is a view which illustrates a remote reading menu image plane;

FIG. 93 is a view which illustrates an example of a remote reading command;

FIG. 94 is a view which illustrates an entry level selection menu image plane (pass word is set);

FIG. 97 is a view which illustrates a P.G.P. display image plane on the PC;

FIG. 100 is a view which illustrates an example of a conversion data file of each table shown in FIG. 99;

DESCRIPTION OF THE PREFERRED EMBODIMENTS

Preferred embodiments of the present invention will now be described with reference to the drawings.

First Embodiment

Figures 1A, 1B:
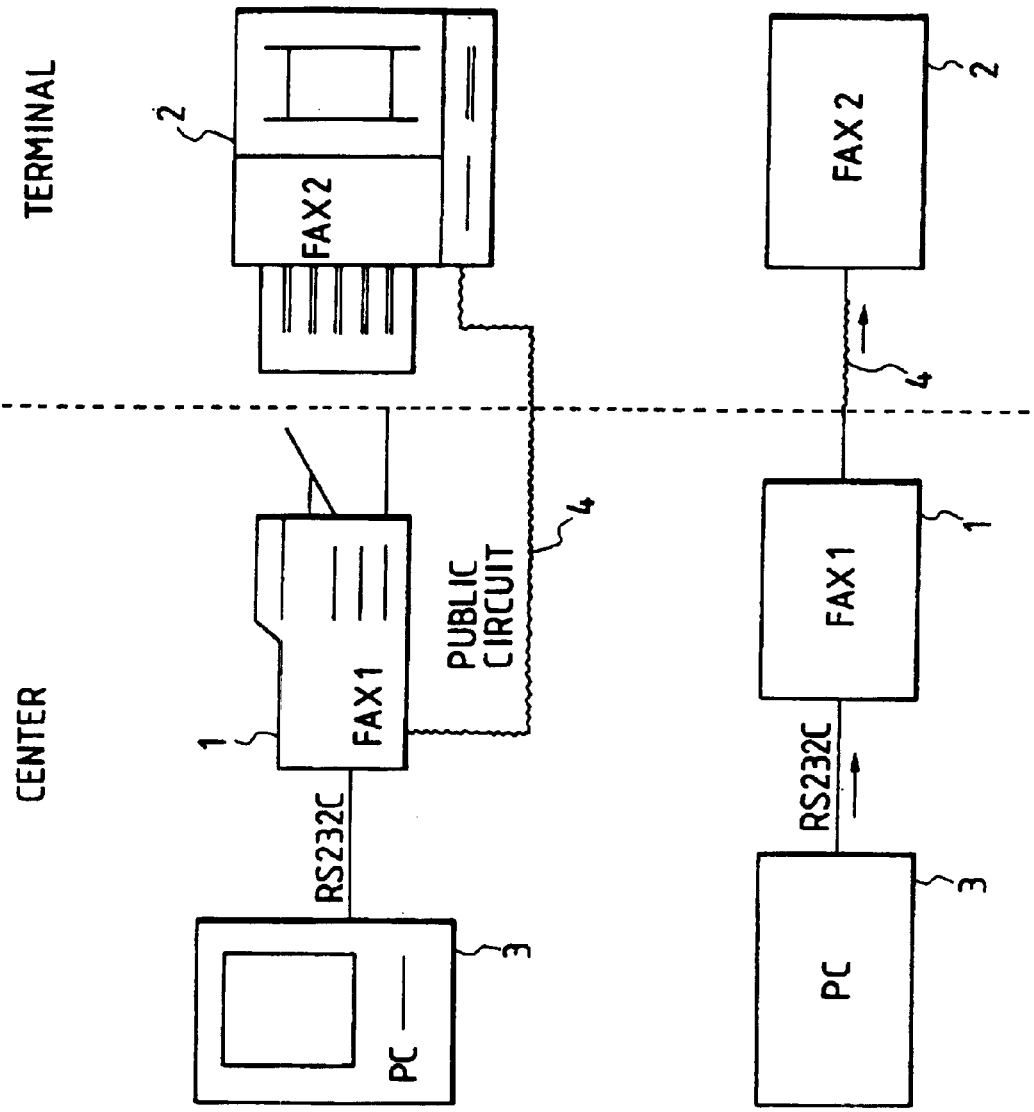
FIGS. 1A and 1B are views which illustrate a facsimile communication system according to the present invention.

FIG. 1A illustrates the unit arrangement for executing a remote reading/entering (registering) operation in a facsimile communication system according to a first embodiment of the present invention. FIG. 1B illustrates the flow of data taken place in the foregoing system. The facsimile communication system according to this embodiment, as shown in FIG. 1A, comprises a personal computer (PC) 3, a facsimile machine 1 including an RS232C interface serving as a facsimile adapter and another facsimile machine 2 capable of remote-reading the data.

The remote-reading operation is an operation to be performed by the PC 3 to read, via the facsimile machine 1, shortened dials caused to enter the facsimile machine 2 or communication errors or the like. The remote-entering operation is an operation to be performed by the PC 3 to cause data about the shortened dial and the like to be caused to enter the facsimile machine 2 via the facsimile machine 1. In order to remote-enter the data from the center side into the facsimile machine 2, the PC 3 at the center displays a data entry menu (see FIG. 3A) of a host program. An operator then inputs data in accordance with the entry menu. The operator inputs a connection number with respect to the facsimile machine 2 connected to a public circuit network 4 by using a data transmission menu (see FIG. 3B) and selects "execution" included in the menu.

As a result of the selection of "EXECUTION," the PC 3 transmits an entry command and data to the facsimile machine 1 serving as the communication adapter via the RS232C. The facsimile machine 1 serving as the communication adapter calls the facsimile machine 2 connected to the public circuit network 4. When the circuit is connected between the two facsimile machines 1 and 2, the facsimile machine 1 transmits the entry command in the form of an HDLC frame format (see FIGS. 8A to 8C) with a 300 bps procedure signal in accordance with a remote entry communication procedure shown in FIGS. 5 to 7.

It should be noted that symbols cr and lf are partition characters for the data entry command and the reading command and are expressed by carriage return (0DH) and line feed (0AH) in the ASCII characters. Symbols ff are partition characters denoting that data about the data entry command and that about reading command are continued to the next frame and are expressed by form field (0CH) in the ASCII characters.

The remote entry communication procedure is arranged in such a manner that a T.30 initial identification phase is, as shown in FIG. 5, defined as the entrance of the remote entry procedure. The remote facsimile machine 2 declares that it has a remote entry function in NSF (non-standard function). The facsimile machine 2 waits for NSS (non-standard function setting), which is the next machine type declaration to be supplied from the center side facsimile machine 1. The NSS contains a machine type reading command for the machine type declaration. When the facsimile machine 2 receives the foregoing command, the facsimile machine 2 makes a machine type declaration response by NSC (non-standard command). When the facsimile machine 1 receives the NSC, it transmits MCF (message confirmation).

Figure 6:
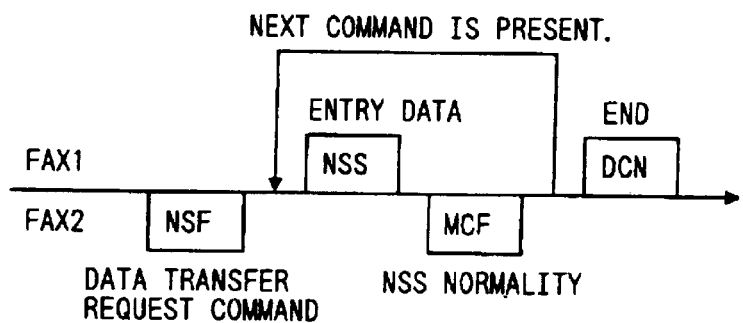
FIG. 6 is a view which illustrate a remote entry communication procedure according to the first embodiment.
Figure 7:
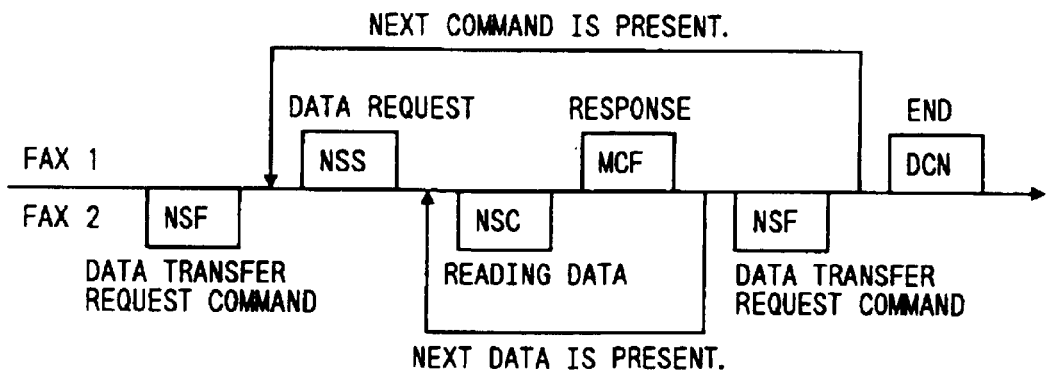
FIG. 7 is a view which illustrate a remote reading communication procedure according to the first embodiment.

When a response is made with the MCF by the center, the process is shifted to an entry phase or a reading phase as shown in FIGS. 6 and 7. In the foregoing entry phase, the facsimile machine 2 transmits the MCF of the data transmission request command and receives the NSS including entry data supplied from the facsimile machine 1. If the entry of the entry data has succeeded, it transmits an affirmative response by using a MCF. If the entry has been failed, it transmits a negative response by using an RTN (negative of re-training).

The data entry operation to be performed by the facsimile machine 2 will now be described.

FIG. 2 is a flow chart which illustrates the data entry procedure adapted to the facsimile machine 2. As shown in FIG. 2, the initial identification procedure shown in FIG. 5 is executed in step S1. Then, the entry phase is started. In the entry phase, frames transmitted from the center side facsimile machine 1 are, in step S2 and as shown in FIG. 8, stored in a frame buffer in the form of the HDLC format excluding flags, the center side facsimile machine 1 being a facsimile machine which performs the remote entry operation.

In next step S3, only frame entry data items are accumulated in a data receiving buffer (see FIG. 9). If a discrimination is made in step S4 that an identifier (see FIGS. 8A, 8B and 8C) of the frame final data is two-byte data (cr=0DH, lf=0HA) denoting the completion of the data, the flow proceeds to step S5. If a discrimination is made in step S4 that the identifier is one-byte data (ff=0CH) (see FIG. 8B) denoting that data continued to continuation frame is present, the flow returns to step S2 to receive the next data.

If the final frame has been received, the command in the buffer memory is analyzed in step S5. If the command is the data entry command (step S6), it is stored in a memory area for entry data corresponding to the entry item (step S8). In step S9, check sum (calculations for summing the data in the memory region for each entry item to confirm the entry) is performed, the contents of the check sum being also stored. The data about the check sum is used at the time of checking the memory when power is supplied to the facsimile machine 2.

If the data entry has succeeded., an affirmative response is transmitted in step S10. If the entry has been failed, a negative response is transmitted in step S11 and transmission of the next data is waited for. Finally, a completion signal is received from the center side facsimile machine 1 (if an affirmative discrimination is made in step S12), the remote entry communication is completed. It should be noted that step S7 is a data reading phase shown in FIG. 7. The check sum to be performed in step S9 may be performed in such a manner that (1) the calculations of summing the byte data in the respective addresses in only the memory region for the entry item are performed; or (2) the respective address data items in all entry memory regions are summed as well as the entry data area; or the like.

The results are, as the check sum, written on the check sum data.

The check sum for each storage area (a user data region and a TEL data region) for the entry data is calculated. Further, the sum of all binary data items in the foregoing regions is obtained. For example, first data 00H (H denotes hexadecimal notation) to FFH in the user data region are, for example, calculated as follows:

$$00H+FFH+00H+FFH+33H+ \ldots +34H+FFH+FFH+FFH+FFH+FFH=SUM(a) \tag{1}$$

Then, the results are stored in the user data (a) in the check sum data entry area. Although digit overflow takes place if the sum is obtained by 2-byte data because the check sum is caused to enter by an unsigned in type, the calculation is performed in this embodiment regardless of the overflow.

When power is supplied to the facsimile machine 2, similar check sum calculations are performed to be subjected to a comparison with the stored check sum data. Since breakage of the data is expected if the check sum data items are different from each other, the entry memory must be initialized so that the erroneous operation of the system is prevented.

As described above, the remote data entry according to this embodiment enables a plurality of entry items and a plurality of data items to be allowed to collectively enter by one communication. By performing the check sum calculations simultaneously with the data entry, data abnormality, if any, causing the contents of the entry data to be changed can easily be detected.

Since data items are collectively stored in the receiving buffer, a large quantity of data can be allowed to remote enter so far as the buffer capacity permits. By calculating the check sum of all entry memory regions after all remote data items have been caused to enter, the needed memory capacity of the check sum program code can be reduced. In addition, the fact that the check sum calculations are collectively executed finally, the data entry time can be shortened.

Since the response for transmitting the success and fail of the data entry is transmitted, the operation of the facsimile machine can also be monitored by the center side.

A modification of the foregoing embodiment will now be described.

FIG. 11 is a flow chart of the operation of a modification of the facsimile machine 2 according to the first embodiment. In this modification, the facsimile machine 1 transmits data in the form in which only one command is present in one frame. As shown in FIG. 11, the initial identification procedure is executed in step S21 similarly to the foregoing embodiment. In step S22, the procedure signal received via the circuit, is recorded into the buffer memory. In step S23, recording to the entry memory is performed, and calculations and storage of the check sum are performed in step S24. In ensuing steps S25 and S26, response about the fact that data entry could be executed (success of the entry) or the entry could not be performed (fail of the entry) is transmitted.

Finally, a completion signal is received from the center. If an affirmative discrimination has been made in step S27, the remote entry communication process is completed here.

Since this modification enables the remote data entry operation to be completed in one frame transmission, the data quantity can be reduced. Therefore, the system can be formed by limiting data to the entry items that can be caused to enter at one frame receipt.

Also this modification executes the remote entry of the facsimile data, the side (the center) for executing the remote entry selects the entry menu (see FIG. 3A) of the host program on the personal computer (PC) and inputs the data in accordance with the entry menu. Then, the data transmission menu (see FIG. 3B) is used to input the connection number with respect to the facsimile machine connected to the public circuit, and then "EXECUTION" in the menu is selected. As a result, the PC transmits the entry command and the data (see FIG. 4) to the facsimile machine 1.

The facsimile machine 1 transmits the connection number to the public circuit to enable the communication with the facsimile machine 2 to be performed. Further, the remote entry communication procedure shown in FIGS. 5 to 7 is used to transmit the entry command in response to the 300 bps procedure signal in the form of the HDLC frame format (see FIGS. 8A to 8C) in such a manner that limitation to one entry data for one frame is made.

As described above, according to this modification, the program memory can be reduced because the program data working region is not used though a large quantity of entry data cannot be processed within one entry operation. Further, the communication can be completed quickly because the time needed to analyze the data as is needed in step S5 shown in FIG. 5 can be shortened.

A second modification of the facsimile communication system according to the present invention will now be described. This modification is arranged in such a manner that all frames transmitted to a large-capacity image buffer within one communication are temporarily stored until all frames are received and then the data entry operation is commenced.

FIGS. 13 to 16 illustrate the remote entry communication procedure according to this modification. In this modification, the machine type declaration phase in the remote entry is defined to be the entry of the remote entry procedure. The center, in this phase, confirms the remote entry function and the machine type of the facsimile machine (see FIG. 13). The center then performs the training shown in FIG. 14 and transmits the VFR, and then the center side facsimile machine 1 transmits the entry command and the data (see FIG. 4) in the HDLC format in place of the image data. A data capacity of 64K bytes can be, in this case, transmitted in one transmission.

When the facsimile machine 2 has received the data, it checks the transmission error of each received frame by using the FCS (see FIGS. 8A to 8C) of the HDLC frame. If a transmission error has been committed, it transmits retransfer signal PPR to the center side facsimile machine 1 to receive again the frame. If all frames have been normally received, the facsimile machine 2 commences the entry operation. However, a fact that the entry process is being performed is, by transmitting the RNR, informed to the center side facsimile machine 1 because no response is made until the entry operation is completed. As a result, the center side facsimile machine 1 transmits the PR and waits for the completion of the entry.

After the entry process has been completed, the facsimile machine 2 transmits the MCF and waits for the next signal. If the next data is present, the center side facsimile machine 1 transmits the DCN and the communication is completed.

Figure 12:
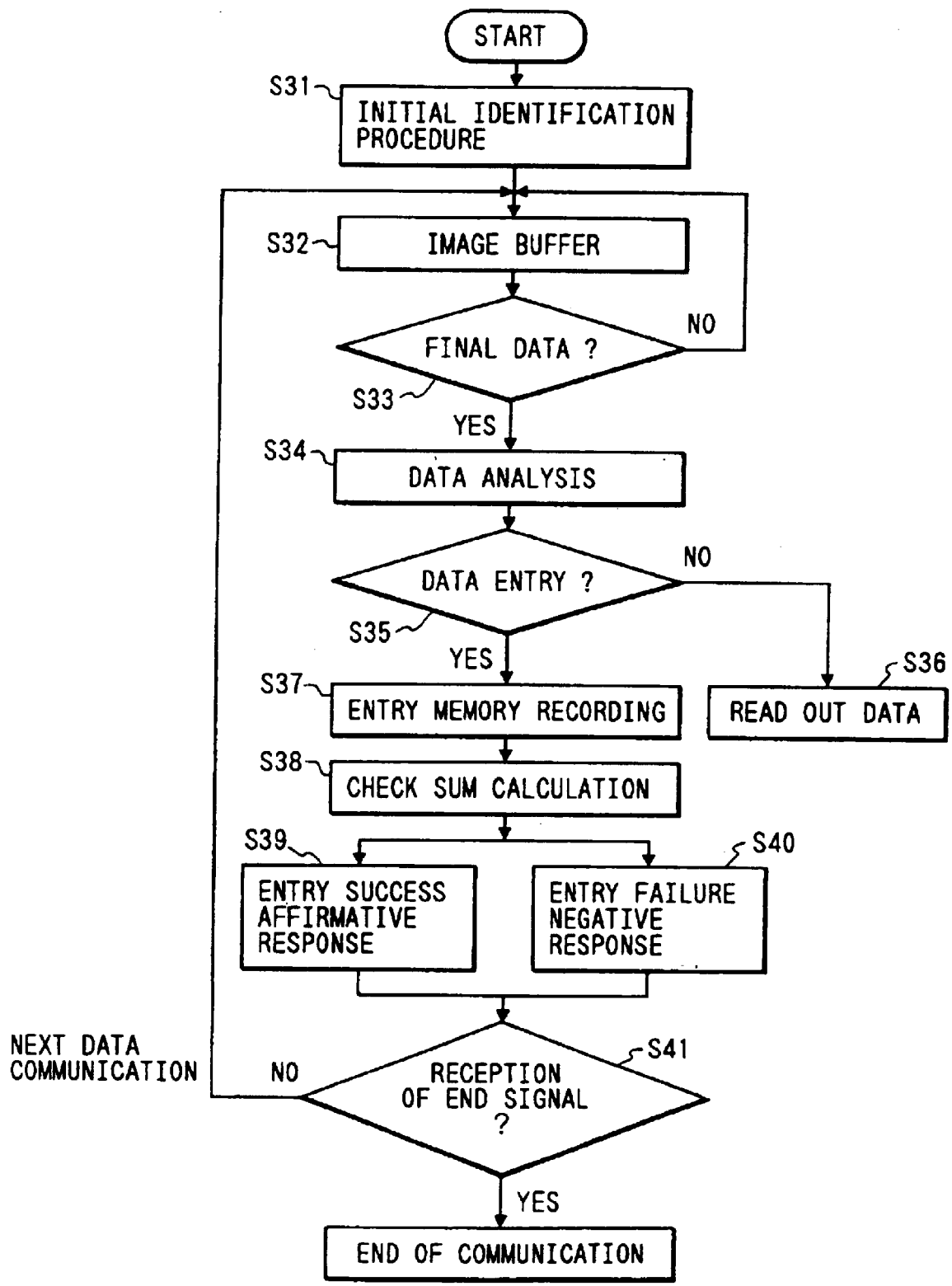
FIG. 12 is an operation flow chart for a facsimile communication system according to a second modification.

FIG. 12 is a flow chart which illustrates the operation of the facsimile machine 2 according to the second modification of the foregoing embodiment. As shown in FIG. 12, the initial identification procedure is performed in step S31, and the entry data received as 9600 bps image data is, in step S32, stored in the image buffer shown in FIG. 9. After the final frame has been received (an affirmative discrimination is made in step S33), the command in the image buffer is analyzed to record it in the entry data memory corresponding to the entry item (steps S34, S35 and S37). It should be noted that the RNR is transmitted to the center during the entry operation.

After the entry has been completed in step S37, the check sum calculation is performed in step S38 to also store the contents of the check sum into the memory. In next steps S39 and S40, an affirmative response is transmitted if the entry has succeeded. If the entry has failed, a negative response is transmitted. Then, the transmission of the next data is waited for.

Finally, the completion signal DCN is received from the center side facsimile machine 1 in step S41, the remote entry communication is completed.

As described above, this modification enables a plurality of entry items and a plurality of data items to be allowed to enter collectively within one communication. Further, the contents of the remote command can arbitrarily determined. Therefore, a complicated entry operation, that cannot be usually manually completed, can be completed.

Figure 17B:
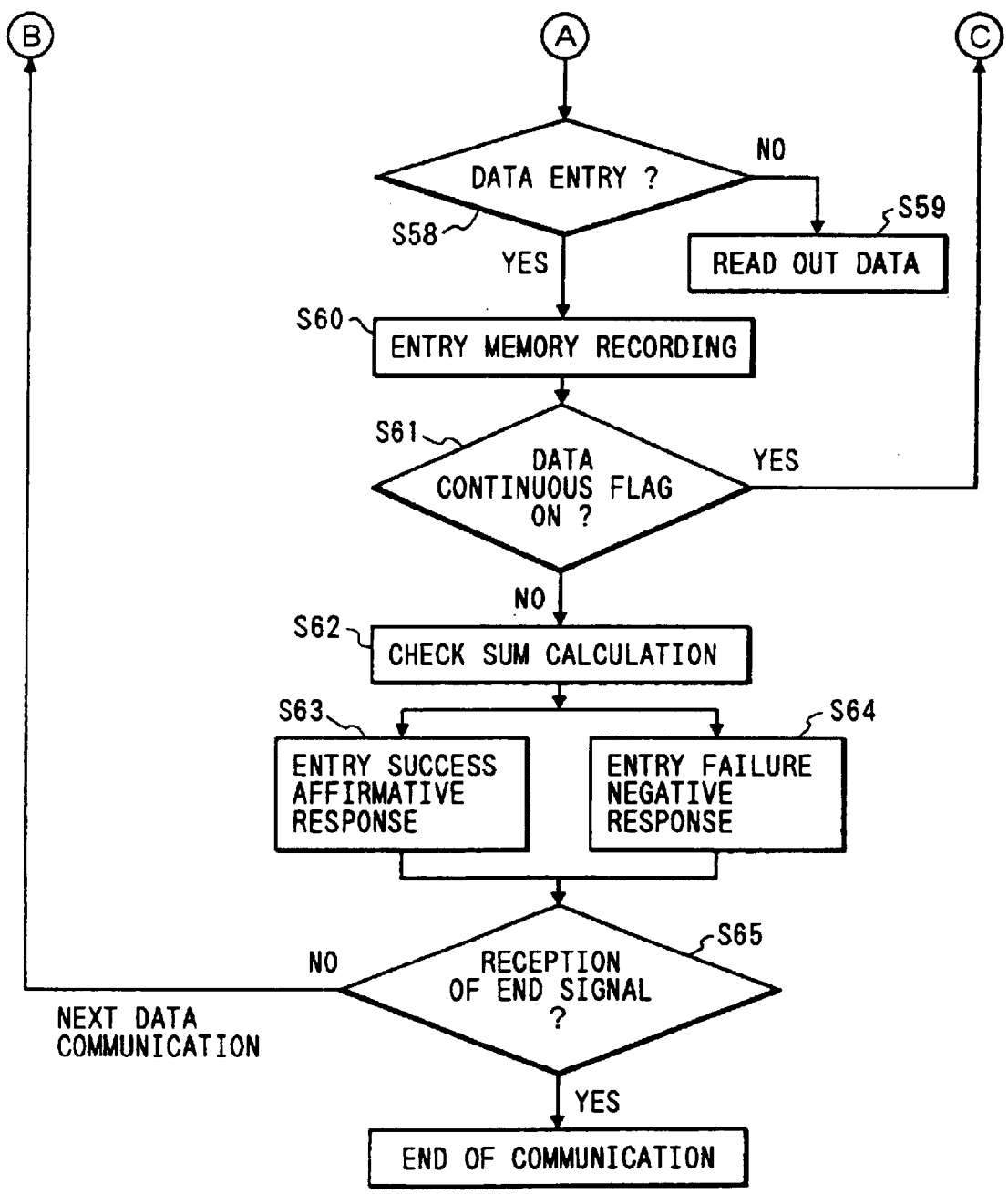
FIG. 17 is comprised of FIG. 17A and FIG. 17B showing operation flow charts of a facsimile communication system according to a third modification.

FIGS. 17A and 17B are flow charts which illustrate the operation of the facsimile machine 2 according to the third modification. As shown in FIGS. 17A and 17B, the initial identification procedure is executed in step S51. In step S52, the HDLC signal received by way of the circuit is stored into the frame buffer. If a discrimination has been made in step S53 that the entry execution command is present in the final data of the frame, the flow proceeds to step S66 in which a data continuation flag in the facsimile machine 2 is turned on before the flow proceeds to step S57. If a discrimination has been made in step S53 that no command is present, the flow proceeds to step S54 in which recording of the entry data to the receiving buffer is performed at the time remote entry process.

In step S55, a discrimination is made whether or not the final frame has been received. If an affirmative discrimination has been made, the data continuation flag in the facsimile machine 2 is turned off in step S56. In next steps S57 and S58, the analysis of the command in the buffer and recording to the entry memory are performed. In step S61, a discrimination is made whether or not the data continuation flag has been turned on. If the flag has been turned off, the check sum is calculated and stored (step S61).

In steps S63 and S64, a response is transmitted denoting whether or not the data entry has been completed successfully or failed. If the completion signal has been received in step S64, the foregoing process is completed.

The entry execution command is an identifier, for example, 00H which is a 1-byte data continuation identifier (ff=0CH). In the remote data entry, only character columns and digit columns are allowed to enter while omitting handling of the binary data to prevent erroneous identification between the identifier and the data.

The data continuation flag is used to judge at the time of interruption data receipt without a command at the time of the data entry. If the foregoing flag has been turned on, a fact is shown that additional data is present in the previously entry item.

As described above, this modification enables the limitation of the quantity of the entry data to be omitted if the capacity of the receiving buffer is too small. For example, remote entry to a facsimile machine, such as a personal facsimile machine, that has a small memory capacity.

Second Embodiment

A remote reading operation of a facsimile communication system according to this embodiment will now be described.

The remote reading operation according to this embodiment is arranged in such a manner that the data receiving menu (see FIGS. 3A and 3B) on the image screen of the PC 3 in the remote center is first used so that reading items, such as user data, one touch/shortened dials and service data, are selected, the connection No. is inputted to the remote facsimile machine and the execution menu is selected. Then, the PC 3 transmits the remote reading command to the facsimile machine 1.

The foregoing reading remote command is a command for instruction the contents of the data to be read from the remote facsimile machine 2, the reading remote command being arranged in this embodiment to define the data item to be read with the ASCII character array each composed of two characters as shown in FIG. 19. For example, the user data is defined to UD, the service data is defined to be SD, and the one touch/shortened dial entry data is defined to be DD.

FIG. 20 is a chart which illustrates the flow of data in the PC at the time of receiving remote reading data according to this embodiment. As shown in FIG. 20, the PC 3 transmits the reading command to the facsimile machine 1. When the remote reading communication has been completed, the PC 3 receives data in the same format as that of the remote entry command as shown in FIG. 19 from the remote facsimile mahine by way of the RS-232C interface.

The remote reading communication procedure according to this embodiment is shown in FIG. 7. Similarly to the remote entry communication procedure according to the foregoing first embodiment, the 300 bps procedure signal is used in this embodiment. The remote reading operation procedure according to this embodiment is performed in accordance with the foregoing communication procedure.

When the facsimile machine 1 has received the data transfer command (NSF) from the facsimile machine 2, it transmits the remote reading command shown in FIG. 19 by using the NSS. When the NSC has been used so that the reading data in accordance with the contents of the remote reading command has been transmitted from the facsimile machine 2 to the facsimile machine 1, the facsimile machine 1 responds the reading data and waits for the next reading data. When the final data has been received, the NSF of the data transfer command is transmitted from the facsimile machine 2. Therefore, a circuit disconnection command (DCN) is transmitted from the remote reading facsimile machine 1 to complete the communication process.

Figure 18:
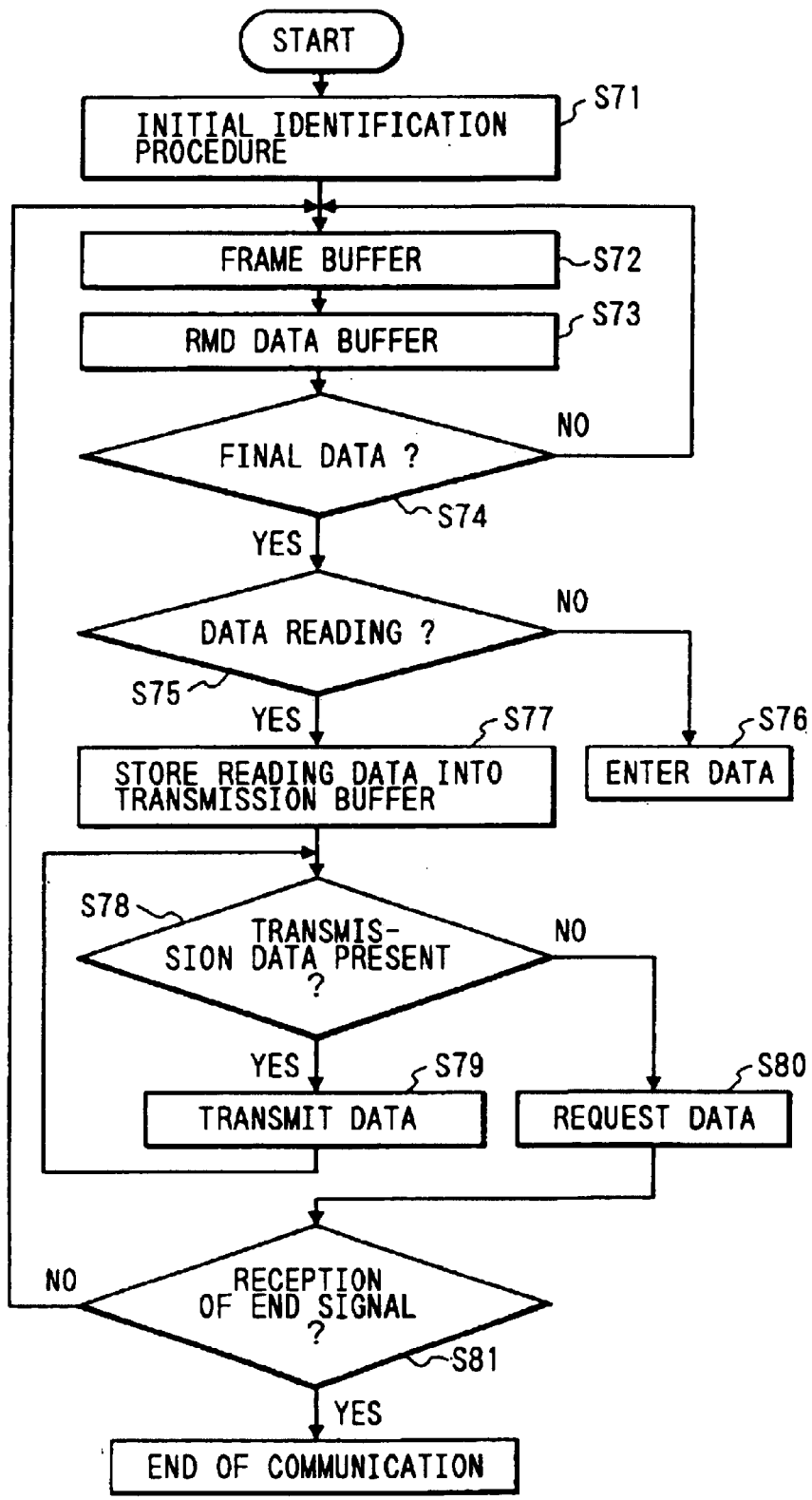
FIG. 18 is a flow chart of a remote reading operation procedure according to a second embodiment.

FIG. 18 is a flow chart which illustrates the procedure of the remote reading operation according to this embodiment. As shown in FIG. 18, the initial identification procedure is executed in step S71. In next step S72, the data received by the facsimile machine 2 is temporarily stored in the frame buffer in the form of the HDLC frame according to the first embodiment shown in FIGS. 8A to 8C.

In step S73, the reading command in the HDLC frame is accumulated in the data receiving buffer (RMD buffer) in the memory shown in FIG. 9. After the reading commands have been accumulated, the command of the data receiving buffer is analyzed in steps S74 and S75. In step S77, the reading data corresponding to the foregoing command is accumulated in the data transmitting buffer.

After all reading data items have been written on the data transmitting buffer, the transmission of the reading data is commenced. The data transmission is repeated until no data is present (steps S78 and S79). If the data accumulation is failed or no transmission data is present any more, the NSF (data request command) is transmitted to wait for the transmission of the next data.

When the completion signal (DCN) has been finally received from the facsimile machine 1, the remote reading operation is completed (step S81).

As described above, the embodiment enables a plurality of reading items and a plurality of data items to be collectively read in one communication. Further, the data items can collectively be accumulated in the transmitting buffer. Therefore, a large quantity of data can be remote-read so far as the capacity of the buffer permits.

The remote reading process and the remote entry process can be performed alternately to be completed in one communication.

Then, modifications of this embodiment will now be described.

Figure 21:
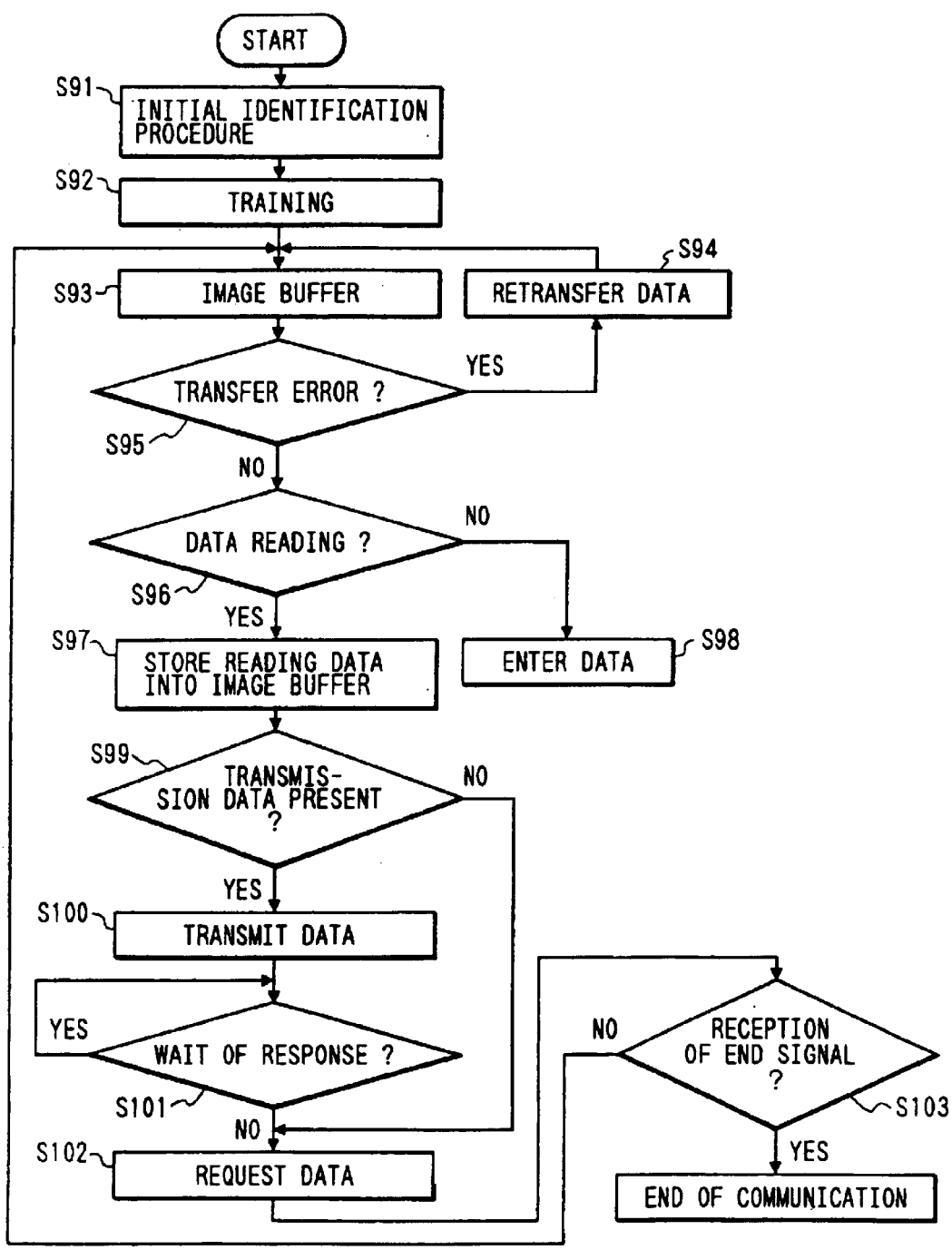
FIG. 21 is an operation flow chart of a facsimile communication system according to a first modification of the second embodiment.
Figure 22:
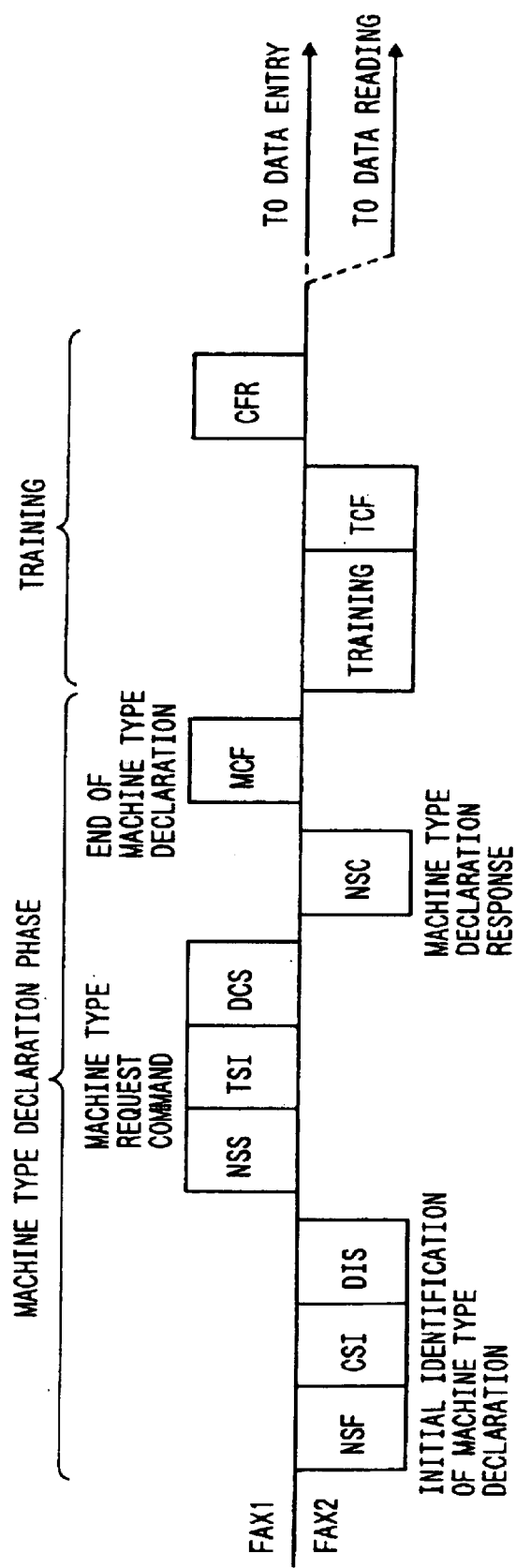
FIG. 22 is a view which illustrates a remote reading communication procedure according to the first modification.
Figure 23:
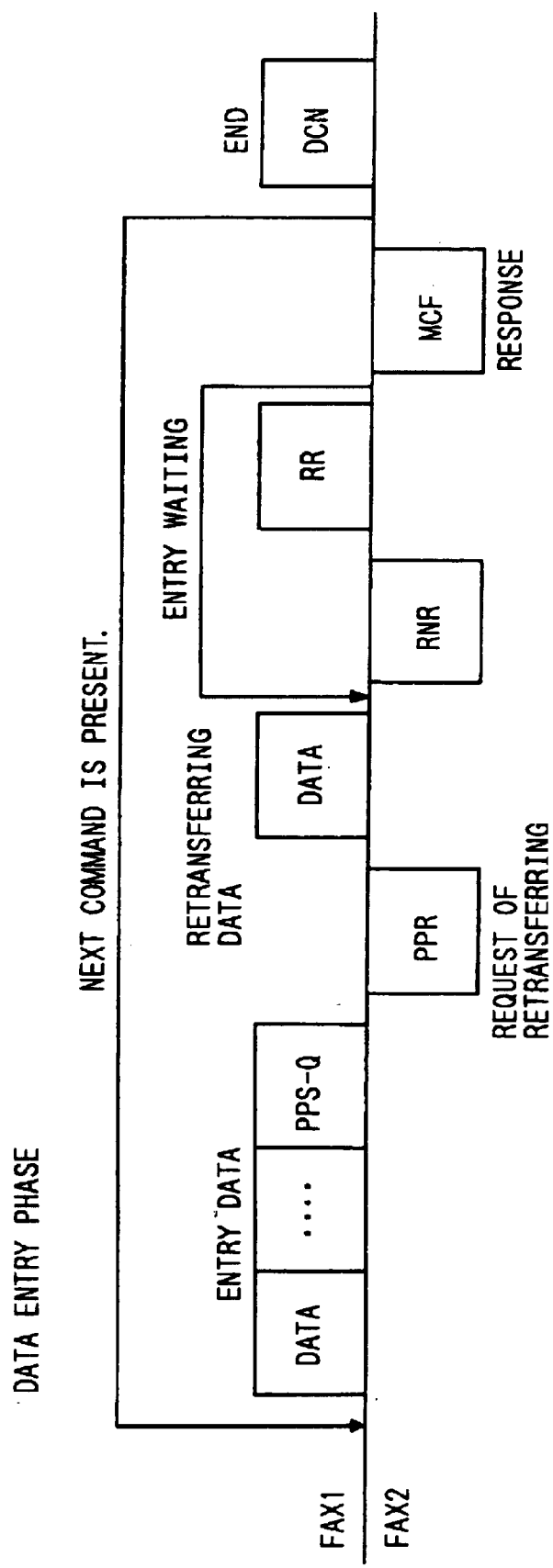
FIG. 23 is a view which illustrates a remote reading communication procedure according to the first modification.
Figure 24:
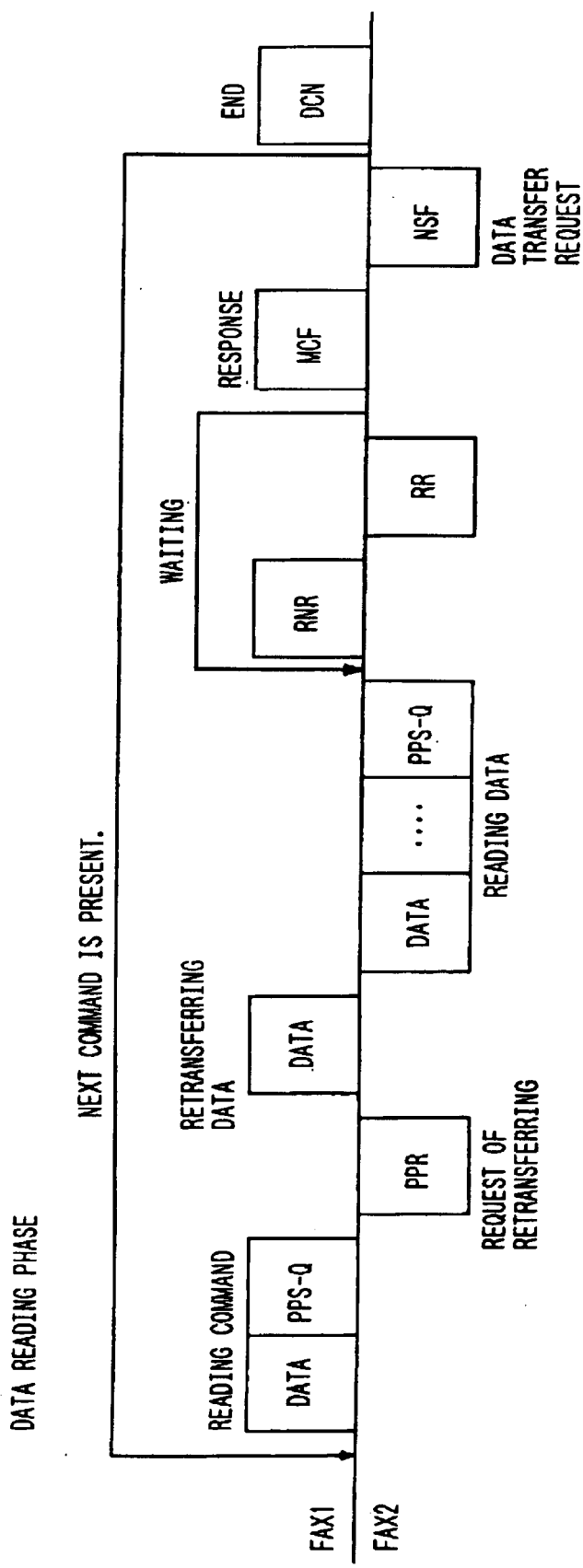
FIG. 24 is a view which illustrates a remote reading communication procedure according to the first modification.
Figure 25:
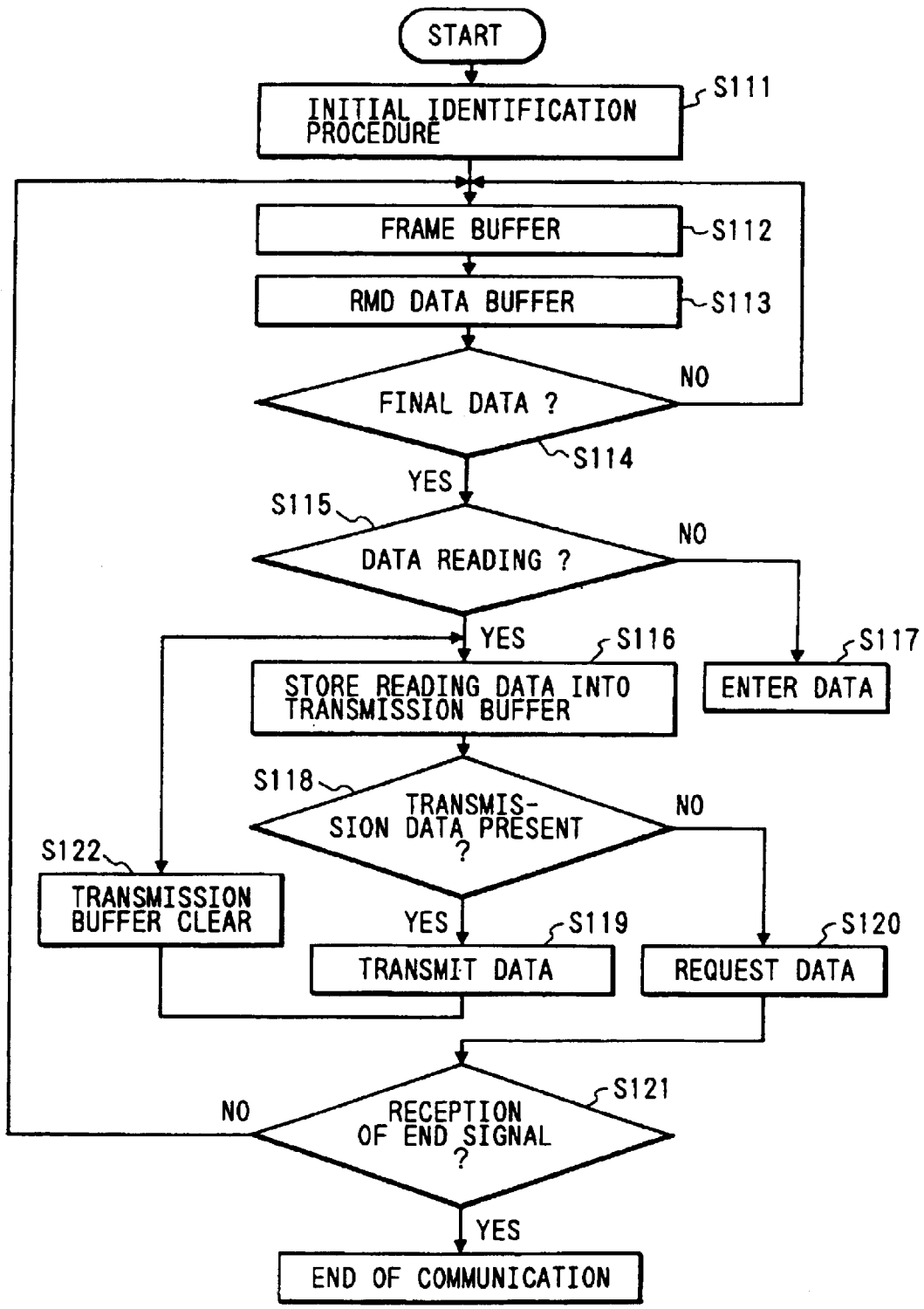
FIG. 25 is an operation flow chart of a facsimile communication system according to a second modification of the second embodiment.

FIG. 21 is a flow chart which illustrates the operation of the facsimile communication system according to a first modification of the second embodiment. FIGS. 22 to 24 are views which illustrate the remote reading communication procedure according to this modification. In this modification, high speed procedures adapted to 9600 bps and 4800 bps are employed.

The entrance of the remote reading communication procedure of the system according to this modification is the low-speed procedure of the remote communication, that is, the function of the facsimile machine about remote reading and the machine type declaration phase for confirming the function as shown in FIG. 22.

Then, training (see FIG. 22) is performed to determine the communication rate of the facsimile machine before the flow is shifted to the data reading phase (see FIG. 23) or the data entry phase (see FIG. 24). In this data reading phase, the data reading command is, in the HDLC frame format (see FIGS. 8A to 8C), received from the facsimile machine 1. The facsimile machine 2 checks the transmission error of each of the received frames by the FCS (Frame Check Sequence) of the HDLC frame after it has received the data.

If the frame includes a transmission error, the facsimile machine 2 transmits the re-transfer request signal PPR and again receives the frame. If all frames have been normally received, the reading data transmission operation is commenced. Since the facsimile machine 1 does not respond until the reading operation is completed, the facsimile machine 1 notifies the fact that it is performing the reading process upon receipt of the RNR to the facsimile machine 2. The facsimile machine 2 transmits the RR and waits for the completion of the reading operation.

After the reading process has been completed, the facsimile machine 1 transmits the normal reading response (MCF). Therefore, the facsimile machine 2 transmits the data transfer request signal (NSF) and waits for the transmission of the next command. When the circuit disconnection command (DCN) has been transmitted from the facsimile machine 1, the communication process is completed here.

Referring to the flow chart shown in FIG. 21, the operation of the facsimile communication system according to this modification will now be described. In step S91, the initial identification procedure is executed. In step S92, the foregoing training is performed. In step S93, the received image data in the form of the HDLC format is accumulated in the image buffer. When the final frame has been received, the transmission error in the image data is checked (step S95) and the accumulation of the image data is repeated until all data is normally received.

If a discrimination has been made in step S95 that the image data includes an error, the data retransfer is requested in step S94.

In steps S96 and S97, the remote reading command received as the image data is analyzed to accumulate the reading data to be transmitted to the remote reading center is accumulated in another image buffer which is different from the image buffer to be used in the storage operation to be performed in step S93. When all data items have been accumulated, the data transmission is performed (steps S99 and S100).

When the transmission of the reading data has been completed, the completion of the operation of the center is waited for. If the response (MCF) from the center has been received, the transfer request command (NSF) is transmitted (steps S101 and S102). The center transmits the DCN if no next data transmission is made. Thus, the remote reading operation of the facsimile machine is completed (step S103).

FIG. 26 is a flow chart which illustrates the operation of the facsimile machine 2 according to the second modification of the second embodiment. According to the flow chart shown in FIG. 26, the initial identification procedure is executed in step S111 similarly to the system according to the second embodiment shown in FIG. 19. In next step S112, data received by the facsimile machine is temporarily accumulated in the frame buffer in the form of the HDLC frame format according to the first embodiment shown in FIGS. 8A to 8C.

In step S113, the reading command in the HDLC frame is stored in the data receiving buffer (the RMD buffer) in the memory having a similar structure as that of the internal memory of the facsimile machine according to the first embodiment shown in FIG. 9. After the reading commands have been accumulated, the command of the data receiving buffer is analyzed (steps S114 and S115). In step S116, the reading data corresponding to the foregoing command is stored in the data transmitting buffer.

After all reading data items have been written on the data transmitting buffer, the transmission of the reading data is commenced (step S119). If the capacity of the buffer for transmitting the reading data is too small to store the transmission data into the transmitting buffer, the data transmission is performed during the data storage operation. In step S122, the contents of the transmitting buffer is cleared and to commence the next data accumulation.

When the completion signal (DCN) has been finally received from the facsimile machine 1, the remote reading operation is completed (step S121).

Since this modification is so arranged that the data transmission is performed simultaneously with the data storage process if the capacity of the remote reading data buffer is too small. Therefore, a large quantity of the reading data can be transmitted.

Third Embodiment

A third embodiment of the present invention will now be described. Since the structure of the facsimile communication system according to this embodiment is made to be the same as the system according to the first embodiment shown in FIGS. 1A and 1B, the illustration of the system is omitted here.

In this embodiment, the facsimile machine is initialized at the time of the remote entry process, the data entry menu is selected on the center side personal computer (PC) 3. Further, data initialization (clear) is selected on the input image plane of each entry data to execute the data transmission.

FIG. 26 is a view which illustrates an example of the entry menu of the one touch/shortened dial. FIG. 27 illustrates the menu for clearing the memory, and FIG. 28 illustrates a data transmission menu.

When the entry data is cleared on the menu shown in FIG. 26, the number of the one touch/shortened dial is selected. Further, the entry data read by the remote terminal is displayed on the entry menu so that the change entry of the data are enabled. In addition, the cursor is shifted to the item for clearing the data and a clear key (F5) is depressed so that the entry data is deleted from the image plane.

After the change entry operation has been completed, a data transmission menu shown in FIG. 28 is selected to transmit the changed data. Then, the PC makes a command file about the clear data and the changed data in response to a command similar to the remote entry command according to the second embodiment shown in FIG. 19. The partition characters for each data are determined to be a carriage return (cr: 0DH) and a line field (lf: 0AH). The command file is made when the transmission is executed with the data transmission menu and transmitted to the facsimile machine 1 by way of the RS-232C interface.

The form of the clear data in the command file is categorized into the following two types:

(1) In order to perform the data initialization operation by writing the clear data with the initial value, the data entry command and the initial value data are transmitted from the PC to the center side facsimile machine.

(2) If no data about clear of the telephone number, and the abbreviated name is present, the initial value of the data is not present. Therefore, a command, to which no data is added, is processed as a data clear command so that the data is cleared.

The following command files are present for clearing the data:

| | |
|---|---|
| DI01cr1f | abut one touch dial 01 |
| DTcr1f | deletion of entry |
| DI02cr1f | about one touch dial 02 |
| DT03 3765 6854cr1f | entry of telephone number |

-continued

| | |
|---|---|
| DNcr1f | clearing of destination abbreviation |
| DScr1f | clearing of transmission rate with initial value |
| DOcr1f | clearing of setting of overseas transmission mode with initial value |

The center facsimile machine 1 accumulates the clear data as the remote entry command file and receives a command to transmit the command file from the PC 3 so that the data clear communication is commenced. The remote communication is performed by the same procedure as that of the remote entry procedure according to the first embodiment shown in FIGS. 5 to 7 in such a manner that the center facsimile machine 1 initializes the entry data of the remote facsimile machine similarly to the remote entry process.

Figure 29:
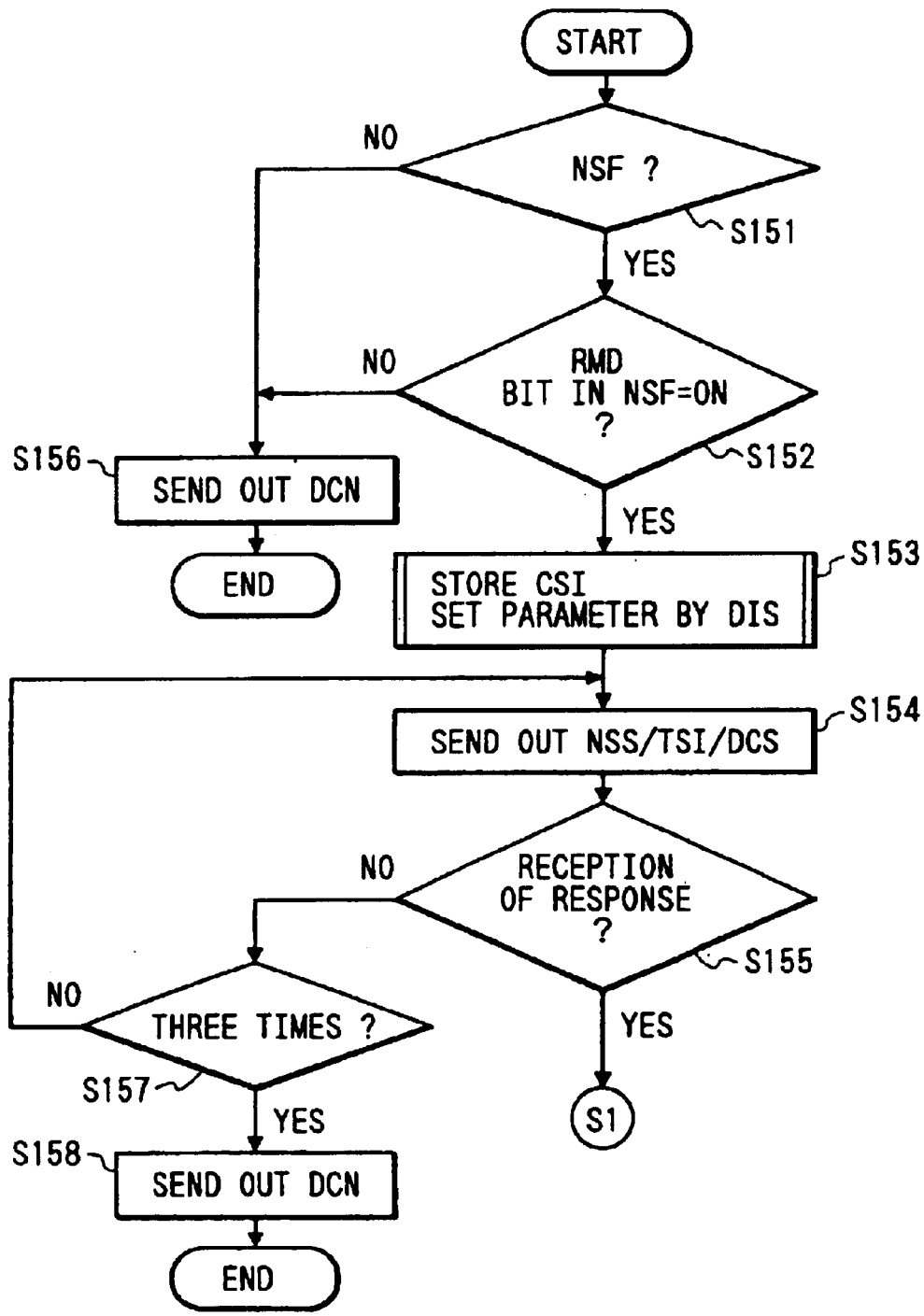
FIG. 29 is a flow chart of an initial identification procedure of a facsimile communication system according to the third embodiment.
Figure 30:
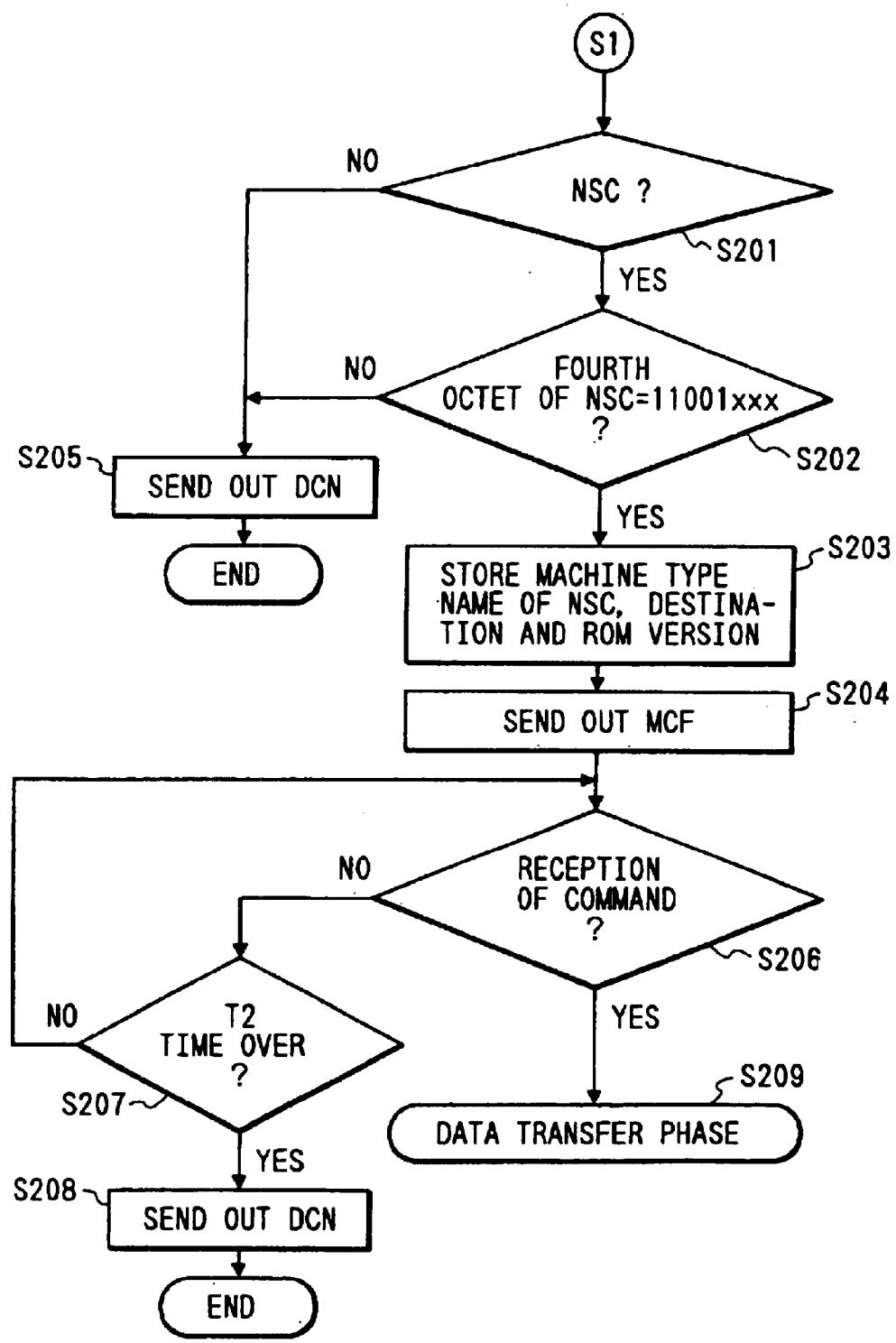
FIG. 30 is a flow chart of an initial identification procedure of a facsimile communication system according to the third embodiment.

FIGS. 29 and 30 are flow charts which illustrate the initial identification procedure to be performed by the facsimile communication system according to this embodiment.

As shown in FIG. 29, the type of the facsimile machine, which is the remote terminal, and whether or not it has the remote entry function (RMD bit) are confirmed by the NSF (non-standard function) in step S151. If the remote entry function bit is present in the NSF in step S152, CSI is stored and a parameter is set by the DIS in step S153. In next step S154, NSS/TSI/DCS are transmitted to commence the machine type confirmation process in the remote entry operation.

If no RMD bit is present in the NSF in step S152, the DCN (the disconnection command) is transmitted in step S156 so that the communication process is forcible completed.

If the response receipt is made in step S155 and if the NSC (the non-standard function command), which is the response to the NSS (non-standard function setting), is received in step S201 shown in FIG. 30, the remote entry function bit of the NSC is confirmed in next step S202. In accordance with the result of the confirmation, data about the machine type, destination and the ROM version and the like included in the NSC data field is, in step S203, stored in the file in the center facsimile machine. The center facsimile machine transmits the MCF (message confirmation) in step S204. In step S206, the command is received, and the flow is shifted to the data transfer phase in step S209.

If the response receipt is not made in step S155, the foregoing processes in steps S154 and S155 are repeated three times. If no response is made here, the DCN is transmitted in step S158. Thus, the foregoing process is completed. If the command receipt process in step S206 is resulted in the time over of T2 hours (if an affirmative discrimination is made), the DCN is transmitted in step S208. Thus, the process is completed.

Figure 31B:
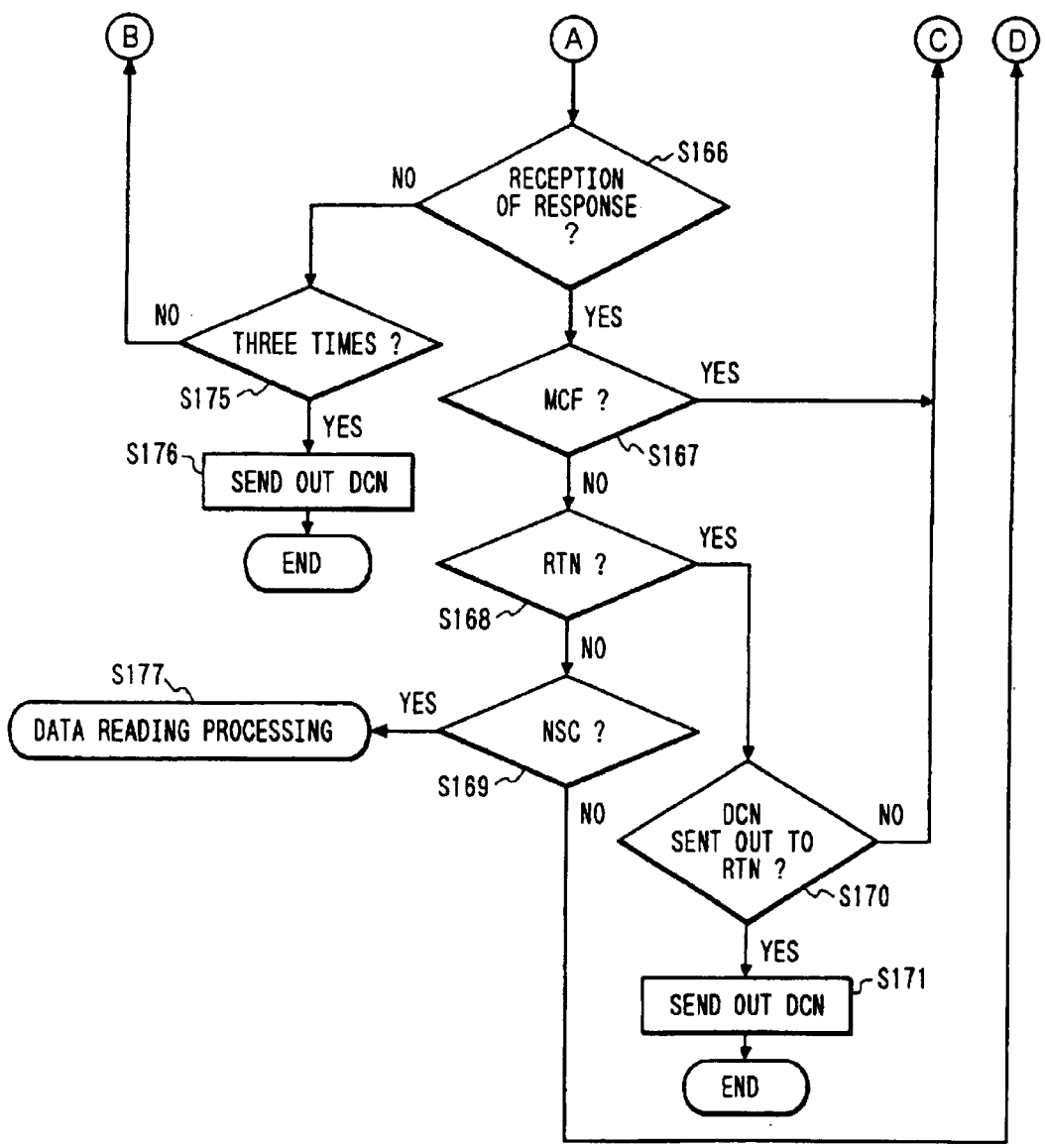
FIG. 31 is comprised of FIG. 31A and FIG. 31B showing detailed flow charts of a data tranfer phase.

FIGS. 31A and 31B are detailed flow charts for the data transfer phase shown in step S209 of FIG. 30. In step S161 shown in FIGS. 31A and 31B, the NSF is confirmed. If it has been confirmed, a discrimination is made in step S162 whether or not the RMD bit of the remote entry function is present in the NSF. If the bit is present, a discrimination is made in step S163 whether or not the transmission data with the next NSS is present.

If an affirmative result has been made in step S163, the NSS is transmitted in step S164 in which a response from the remote facsimile machine is made (an affirmative discrimination is made in step S166). If a discrimination is made in step S167 that the response is the MCF denoting the affirmative response, the flow returns to step S163. If the response is not the MCF but it is RTN (negation of the retraining) (if an affirmative discrimination is made in step S168), a discrimination is made in step S170 to complete the process by transmitting the DCN in step S171 or to return to step S163 while regarding the response, the discrimination being made in accordance with setting of the center side facsimile machine.

If a negative discrimination is made in step S166, the processes in steps S164 and S166 are repeated three times (the number is discriminated in step S175). If no response is obtained, a discrimination is made that no transmission data is present in the command file. Then, the DCN is transmitted in step S176, and the process is completed.

If the RTN is not received in step S168, the receipt of the NSC is discriminated in step S169. If the NSC has been received, a data reading process to be described later is commenced (step S177).

Figure 32:
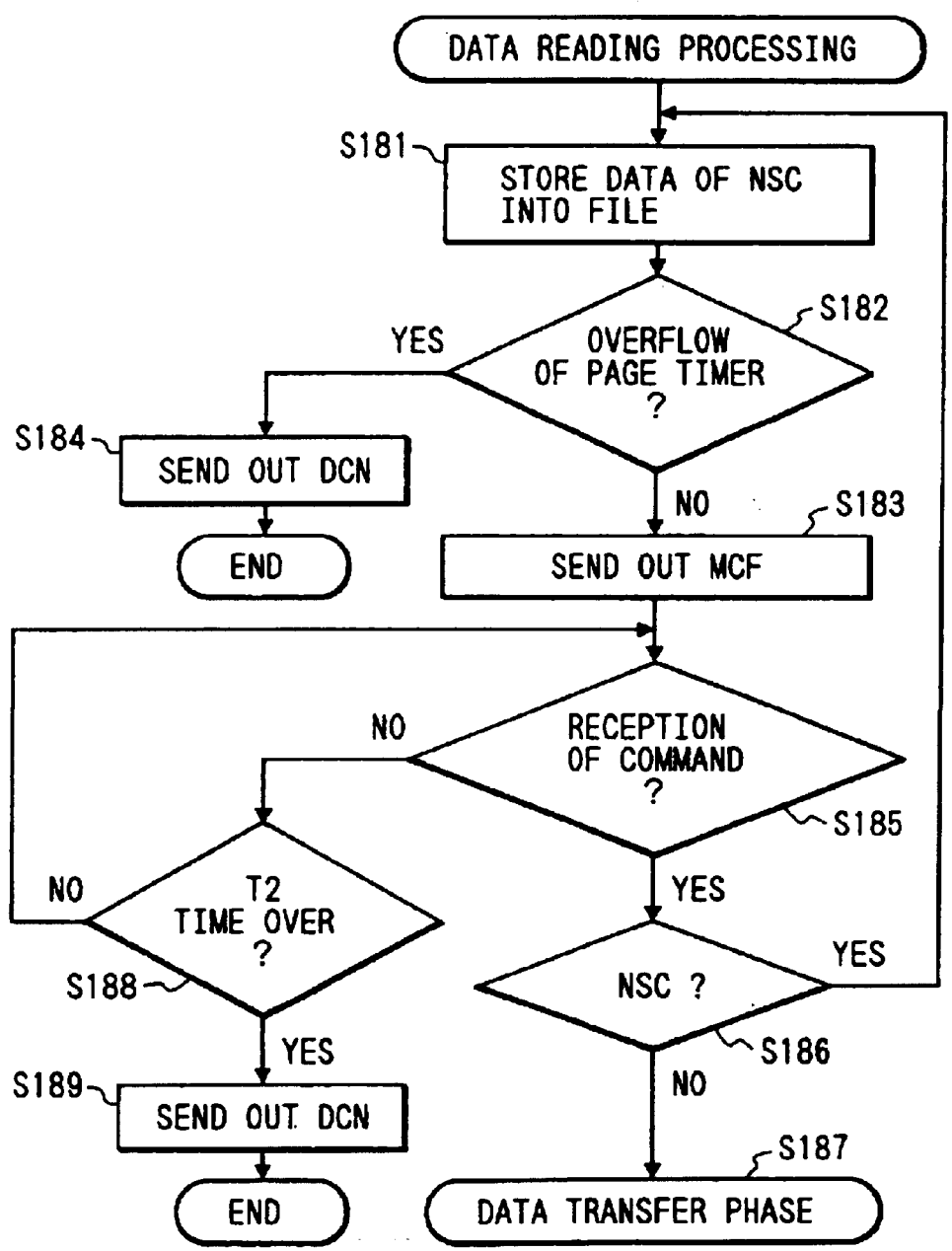
FIG. 32 is a detailed flow chart of a data reading process.

FIG. 32 is a detailed flow chart of the data reading process in step S177 shown in FIGS. 31A and 31B.

In step S181 shown in FIG. 32, the NSC data received in step S169 shown in FIGS. 31A and 31B is stored in the file. If the page time does not flow over in step S182, the MCF is transmitted in next step S183. If the overflow takes place, the flow is shifted to the DCN transmission in step S184.

After the command has been received in step S185, the NSC is received in step S186. If the NSC has been received, the flow returns to step S181. If the NSC has not been received, the flow proceeds to step S187 in which a data transfer phase is commenced. The command receipt process in step S185 is performed in such a manner that, if a discrimination is made is step S188 that the time over of T2 hour takes place the DCN is transmitted in step S189 and the process is completed.

In the foregoing remote entry operation, the center side facsimile machine 1 only transmits the data to the facsimile machine 2 but it does not perform the operations relating to the remote entry process. Further, the data transmission state is monitored by the PC 3 by way of the interface RS-232C during the communication. After the communication has been completed, a command to delete the command file is transmitted from the PC 3. As a result, the center side facsimile machine 1 deletes the command file and the data entry process is completed.

The remote entry operation procedure of the facsimile machine 2 will now be described.

FIGS. 33 to 36 are flow charts which illustrate the remote entry operation procedure according to this embodiment.

Figure 33:
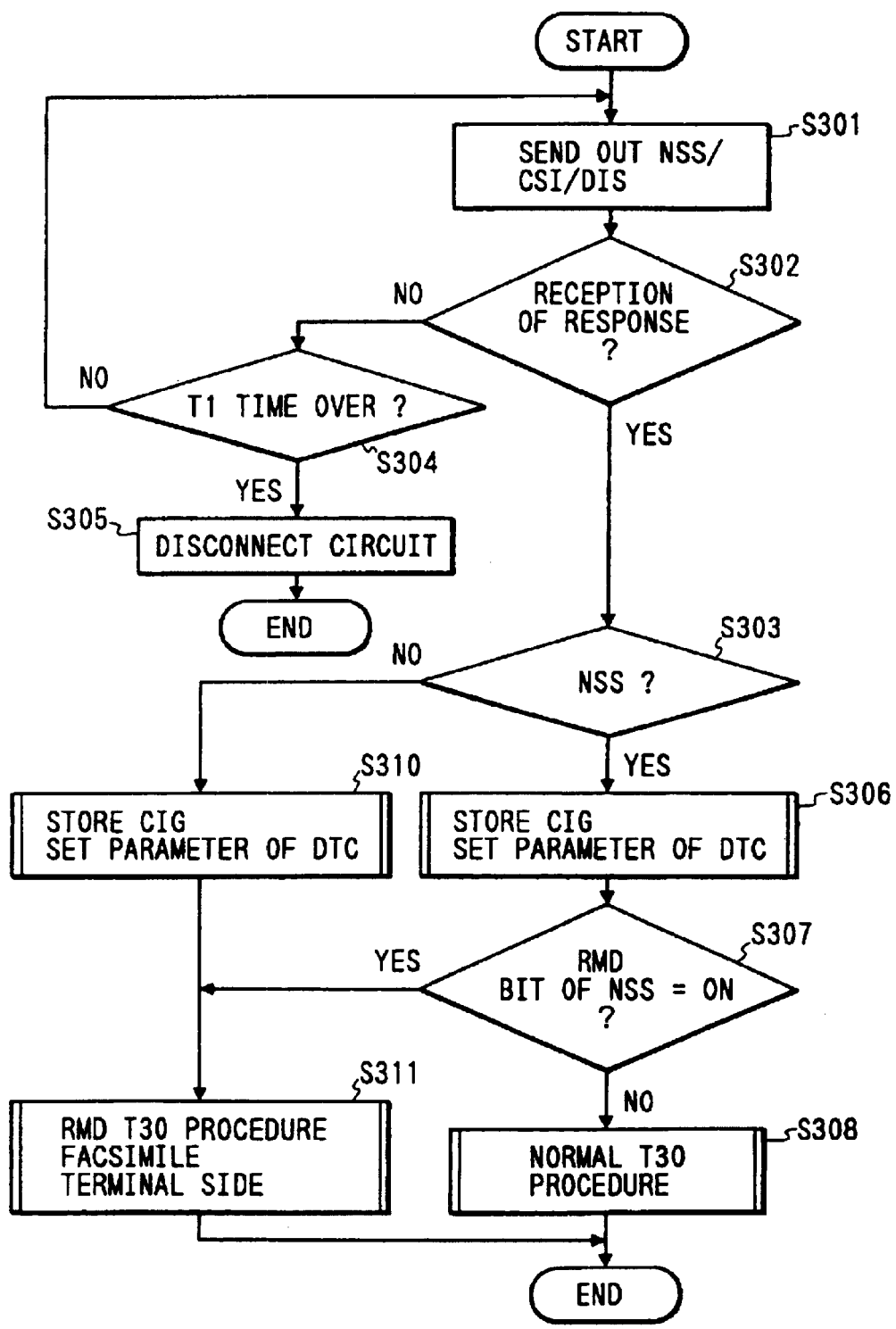
FIG. 33 is a flow chart of a remote entry operation procedure according to the third embodiment.

As shown in FIG. 33, the remote facsimile machine 2, in step S301, transmits NSF/CSI/DIS in accordance with the G3 facsimile communication procedure (T.30) in response to call made by the center side facsimile machine 1. Then, the response is waited for in step S302. At this time, a fact that the remote entry/reading function is possessed is notified to the center side facsimile machine 1 by turning on the RMD bit of the NSF.

If no response is made in step S302, the flow proceeds to step S304 in which the time over of T1 hours is counted. If the time over takes place, the circuit is disconnected in step S305. If the response is made, the remote entry communication procedure is confirmed with the NSS transmitted from the center side facsimile machine 1 in step S303. If it has been confirmed, the storage of the CIG and the DTC parameter setting are performed in step S306.

In step S307, a discrimination is made whether or not the RMD bit of the NSS is turned on. If the bit is turned on, the communication is commenced in accordance with the procedure T.30 of the RMD in step S311. If a discrimination has been made in step S307 that the RMD bit of the NSS is not turned on, a discrimination is made that the subject procedure is not the remote communication procedure. The flow proceeds to step S308 in which the facsimile communication is performed in accordance with the usual T.30.

The remote facsimile machine writes data about the machine type, the destination, and the ROM version and the like on the data field of the NSC in accordance with the command in the NSS transmitted from the center side facsimile machine, the data being then transmitted. The center side facsimile machine 1 stores the data and transmits the MCF response so that the data entry/reading phase is commenced.

Figure 34:
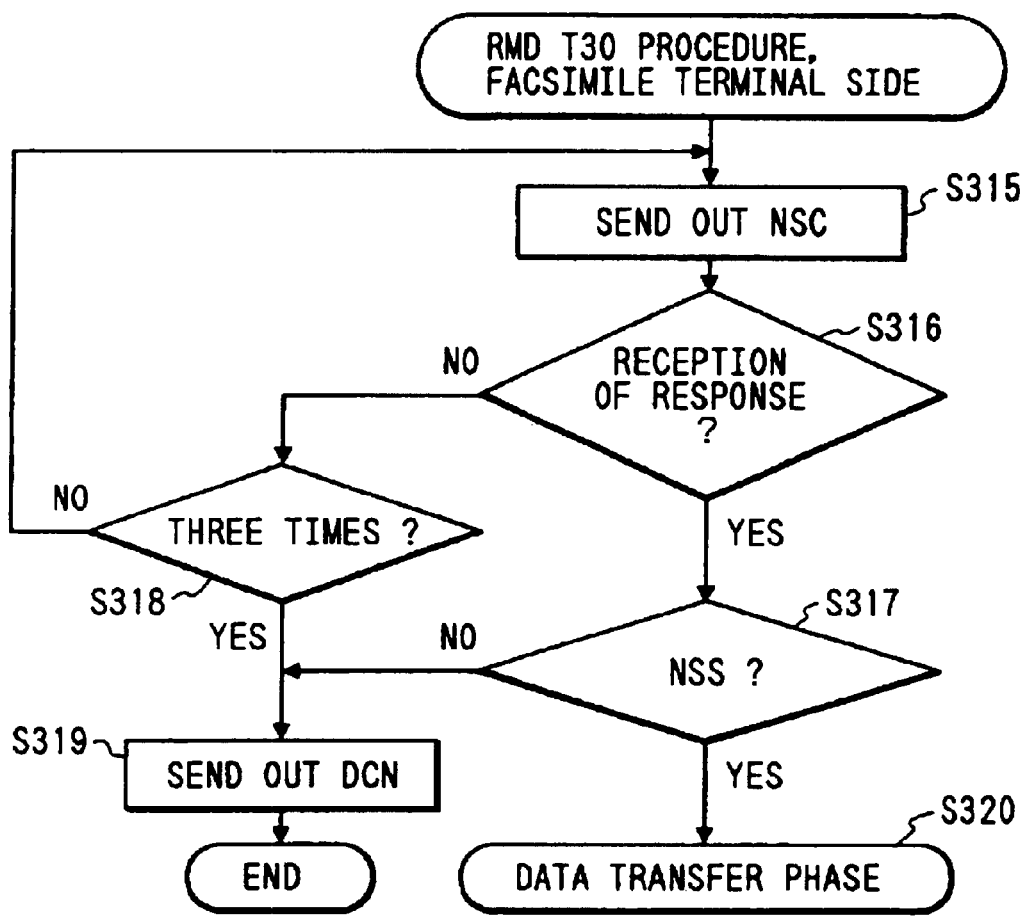
FIG. 34 is a flow chart of the remote entry operation procedure according to the third embodiment.

FIG. 34 is a detailed flow chart of T.30 of the RMD (Remote Diagnostic) in step S311 shown in FIG. 33. In step S315, the NSC is transmitted, the response is received in step S316 and the NSS is confirmed in step S317.

If the response receipt has been confirmed, the data transfer phase in step S320 is commenced. If the response cannot be confirmed in step S316, the processes in steps S315 and S316 are repeated three times (the number of times is counted in step S318). If the response is not made within the number of times, the flow proceeds to step S319 in which the DCN is transmitted.

Figure 35:
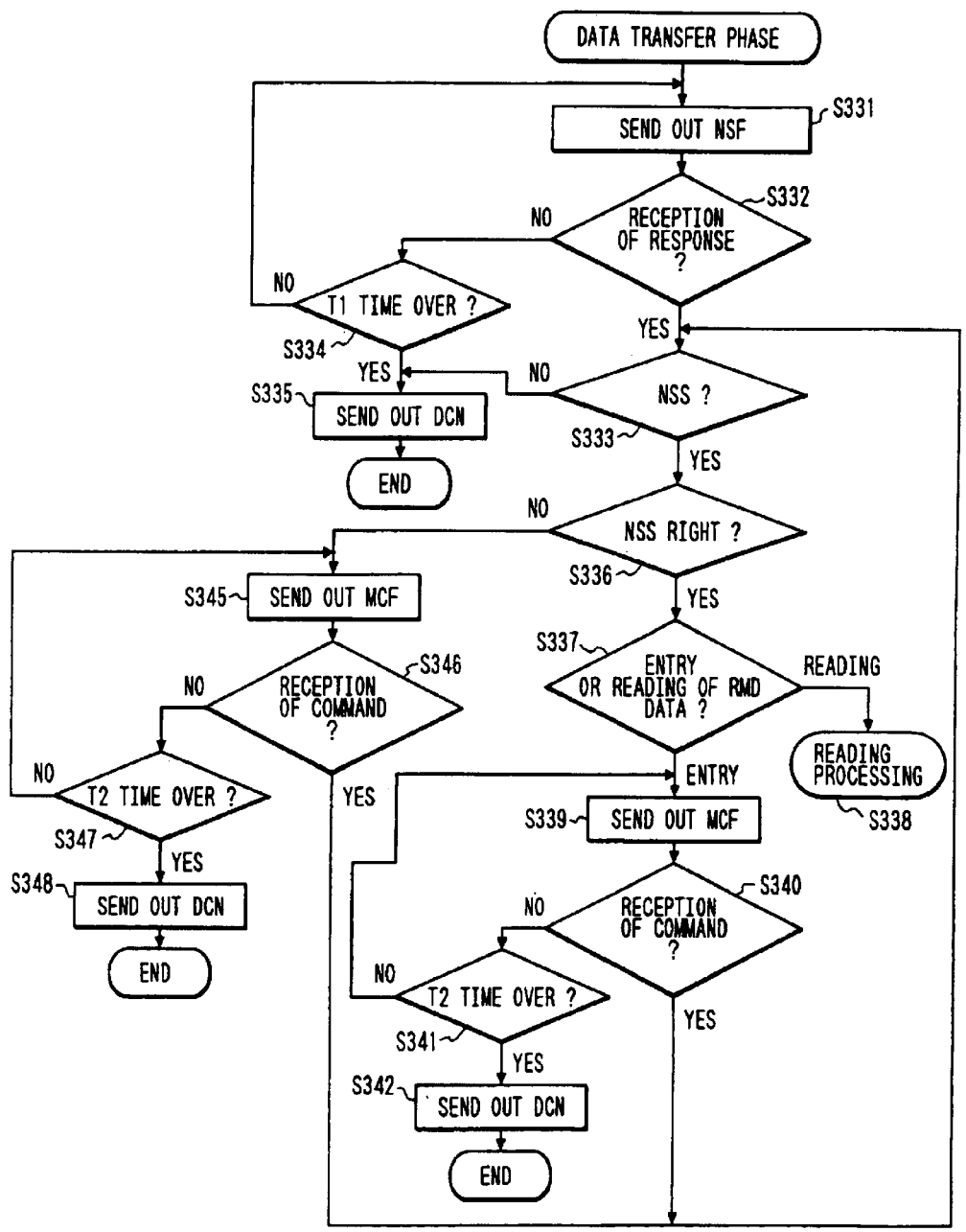
FIG. 35 is a flow chart of the remote entry operation procedure according to the third embodiment.

FIG. 35 is a detailed flow chart of the data transfer phase. In the phase shown in FIG. 35, the facsimile machine 2 transmits the data transfer request command NSF in step S331, and the response is confirmed in step S332. In next step S333, the entry and reading command in the NSS transmitted from the center is waited for.

When the facsimile machine 2 receives the NSS, it analyzes the command and data in the NSS. If the command and the data are correct data (if an affirmative discrimination is made in step S336), a discrimination is made in step S337 that the received command is the RMD data reading command or the entry request command. If the command is the reading command, the flow proceeds to step S338 in which the reading process (to be described later) is performed. If the command is the entry request command, the MCF is transmitted in step S339, and the command receipt is discriminated in step S340.

Figure 36:
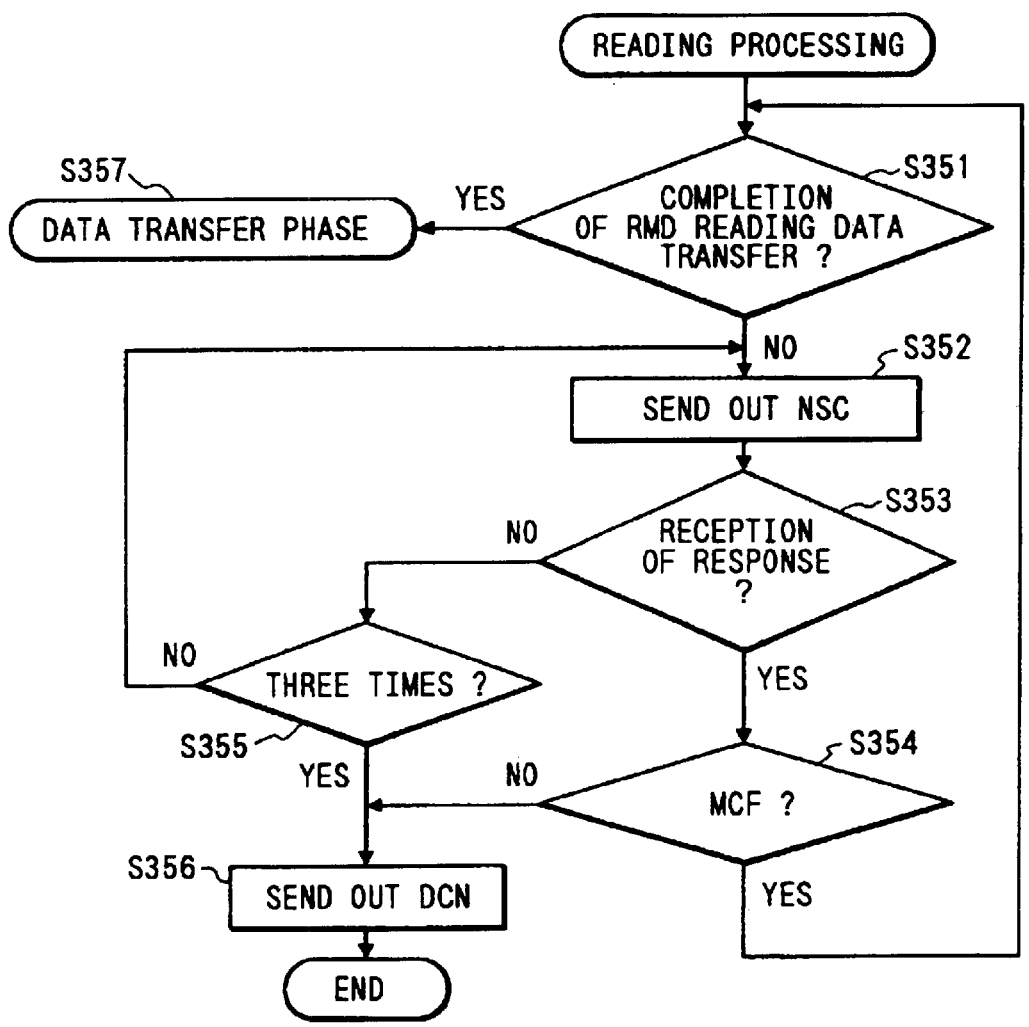
FIG. 36 is a flow chart of the remote entry operation procedure according to the third embodiment.

FIG. 36 is a detailed flow chart of the reading process. As shown in FIG. 36, a discrimination is made in step S351 whether or not the transference of the RMD reading data has been completed. If the data transference has been completed, the flow proceeds to step S357, that is the data transfer phase. If the data transfer has not been completed, the NSC is transmitted in step S352, and the response receipt is waited for in next step S353.

If the response cannot be confirmed in step S353, the processes in steps S352 and S353 are repeated three times (the number of times is counted in step S355). If no response is made within the times, the flow proceeds to in step S356 in which the DCN is transmitted.

Then, the entry processing procedure according to this embodiment will now be described.

Figure 37B:
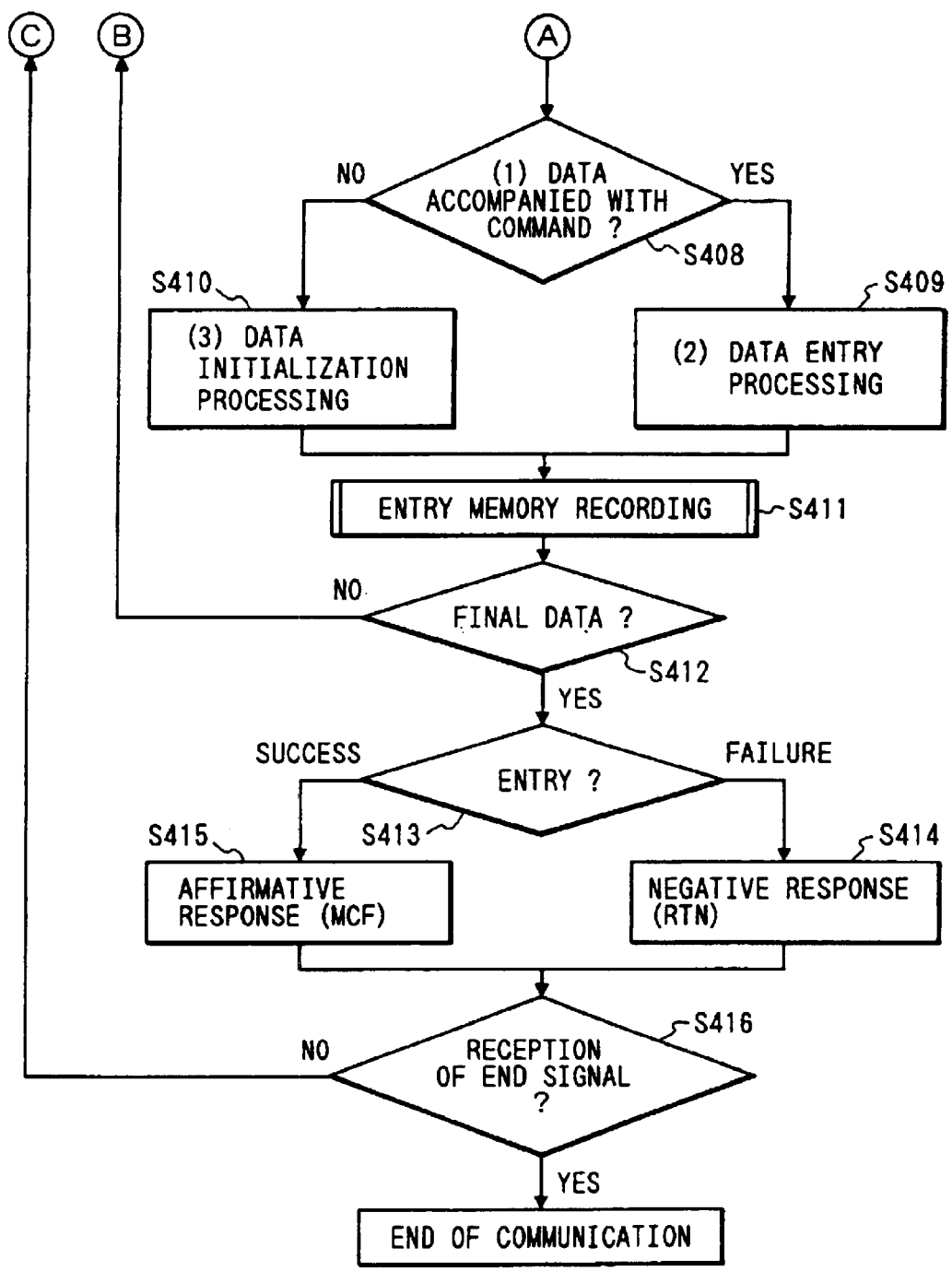
FIG. 37 is comprised of FIG. 37A and FIG. 37B showing flow charts of an entry procedure of the facsimile communication system according to the third embodiment.

FIGS. 37A and 37B are flow charts which illustrate the entry procedure of the facsimile machine 2 according to this embodiment. As shown in FIGS. 37A and 37B, when the circuit has been established with the remote center side facsimile machine 1, the initial identification procedure is executed in step S401. In next step S402, the transmitted NSS signal is stored in the frame buffer, and the entry data in the NSS is stored in the remote entry data buffer in step S403.

In step S404, a discrimination is made whether or not the data is the final data, and then the data analysis process is commenced in step S405. In step S406, a discrimination is made whether or not the data entry is made. The analysis of the stored data is performed in such a manner that the data entry item is determined in accordance with the entry command and the entry data is recorded in the item. In step S408, branching is realized depending upon whether or not data is accompanying with the command. It should be noted that the initialization process is also performed at the time of the command analysis.

If the data accompanying with the transmitted command is the previous initialize data, that is, if an affirmative discrimination is made in step S408, the initialization is performed in the data entry process in step S409. If no data is accompanying with the transmitted command, the data is deleted as the initialization process in step S410. For example, if the data is the destine number of the one touch/shortened dial, the entry of the one touch/shortened dial number is deleted. The abbreviated destination name or the like is processed in such a manner that the entry contents are cleared.

The foregoing process is continued until the data transmission from the center side facsimile machine 1 is completed. In step S413, a discrimination is made whether or not the entry process has been completed normally. If the entry process has been completed normally, the MCF of the affirmative response is transmitted in step S415 and the next command is waited for. If the entry process has been failed, the RTN which is the negative response is transmitted in step S414 and next command is waited for. If the receipt of the completion signal has been confirmed in next step S416, that is, if the DCN denoting the completion of transmission of the command file has been transmitted from the center side facsimile machine 1, the remote entry process is completed.

As described above, this embodiment enable the process for initializing each item of the facsimile machine to be performed in a remote manner by the remote data initialization. Therefore, the entry data and various software switches can be initialized while omitting the necessity for the service person to visit the user.

Further, the remote initialization can be executed simultaneously with the remote entry. Therefore, if the initialization process accompanies the process for changing the entry data, it can be completed in a remote manner.

The contents to be cleared in the remote initialization may be performed in the overall memory region relating to a certain entry item. In order to achieve this, the PC menu shown in FIG. 27 is used to simultaneously execute the input of the connection N and the data transmission. In order to perform a partial initialization of the memory region, a remote command shown in FIG. 38 is used.

The initialization may be performed by using the entry process procedure according to the third embodiment. In the data entry process in step S409, when the command shown in FIG. 38 is received, the memory defined by the command is cleared. The foregoing clear process is performed in such a manner that the user data or the one touch shortened dial are cleared by deleting all entered data items. The service software switches and the user software switches are processed in such a manner that the entry data is set to the initial value (default).

The foregoing method is effective in a case where all data items are cleared in the data initialization operation.

The present invention may be applied to a system composed of a plurality of units or a sole apparatus.

As described above, reading of remote data and entry are performed simultaneously so that the entry data is initialized in a remote manner at the time of the remote data entry or the entry confirmation data is generated. As a result, if the entry data is crushed, the abnormality can be detected.

Further, the maintenance and service of the apparatus can easily be performed by displaying the entry data on the center facsimile machine.

Fourth Embodiment

The facsimile machine 2 according to this embodiment has a DRAM for storing a large-size data file such as image data, the DRAM having a region for use a working region and as a transmitting/receiving buffer and the like.

<Data Entry Process (Data Registry Process)>

Figures 40, 41:
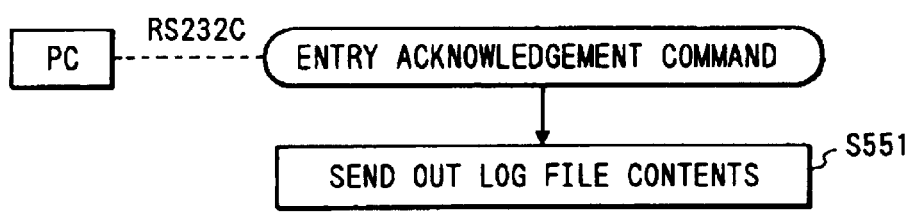
FIG. 40 is an operation flow chart of the remote entry system according to the fourth embodiment.
FIG. 41 is a view which illustrates an entry data menu on a PC image plane of the remote entry system.

At the time of the data entry, the user first inputs the entry data to the remote facsimile machine 2 by using the host program on the PC 3 in accordance with a menu shown in FIG. 41. The PC 3 transmits, together with command to serve as the entry command, the supplied data to the facsimile machine 1 by way of the RS232C.

Figure 39:
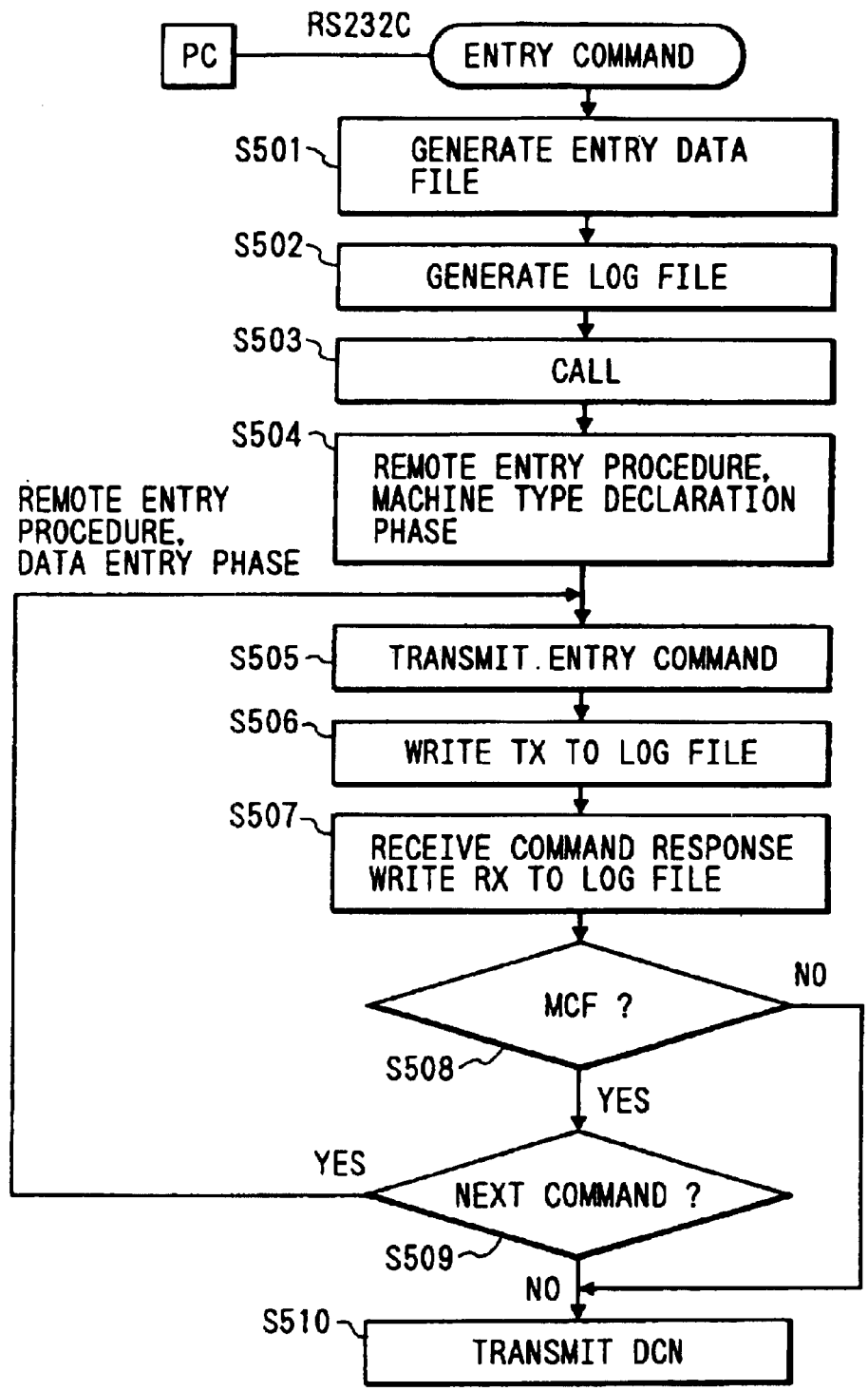
FIG. 39 is an operation flow chart of a remote entry system according to a fourth embodiment.

The flow of the operation of the facsimile machine 1 serving as a communication adapter to be performed at the time of receiving the entry data is shown in FIG. 39. The data entry command can be said that it is a variation of the file write command. When the command is received, a file is made from the supplied data in accordance with the file write command process in step S501.

Figure 44:
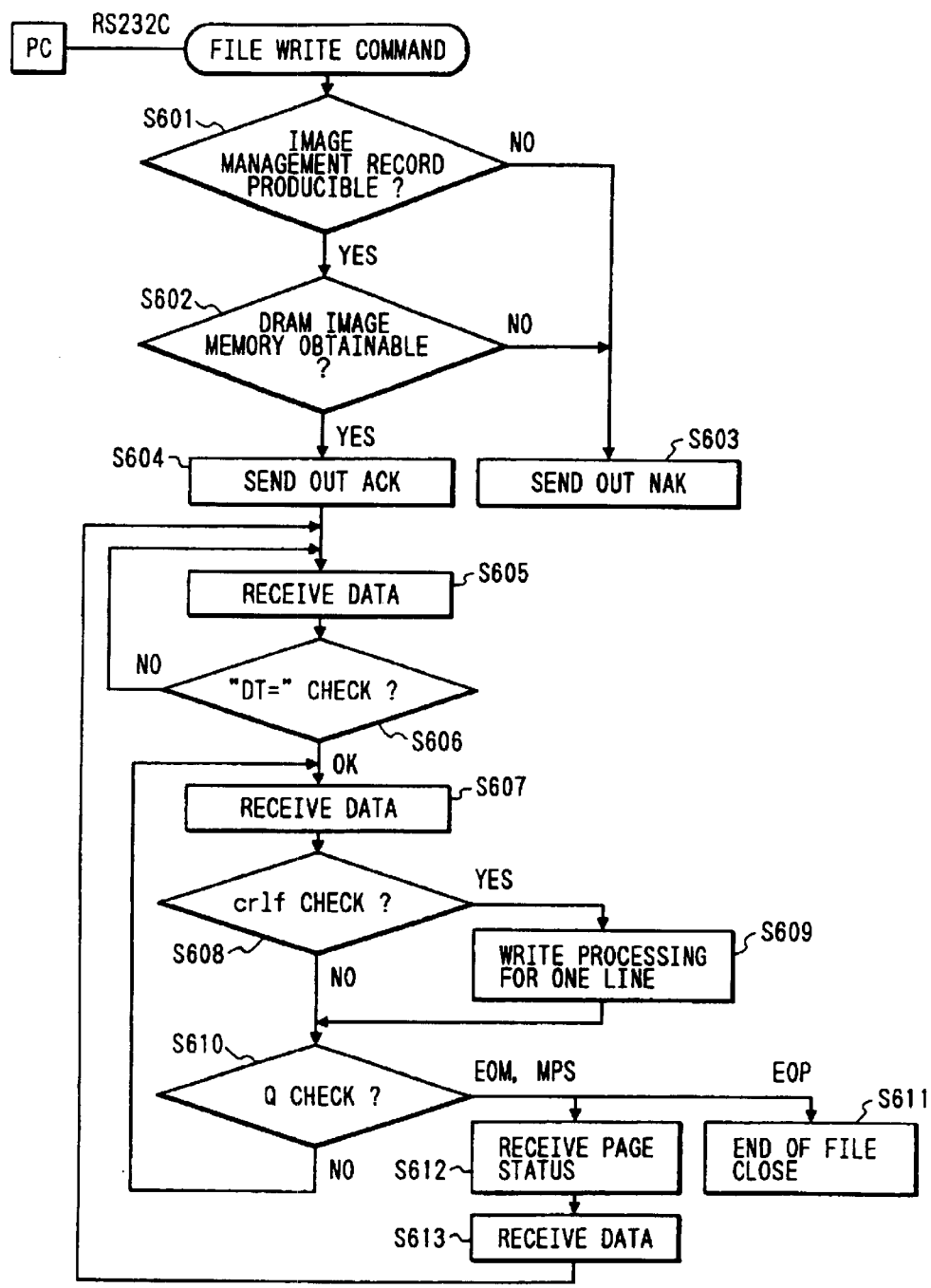
FIG. 44 is a flow chart of the operation of the remote entry system by way of the interface RS-232C to be performed when file writing is performed.

In step S501, the facsimile machine 1 is operated as shown in FIG. 44 when the entry data has been transmitted from the PC 3. The foregoing process is the same as the process to be performed when the facsimile machine 1 has received the file write command from the PC 3.

Making of Entry Data File (Registry Data File)

Figure 48:
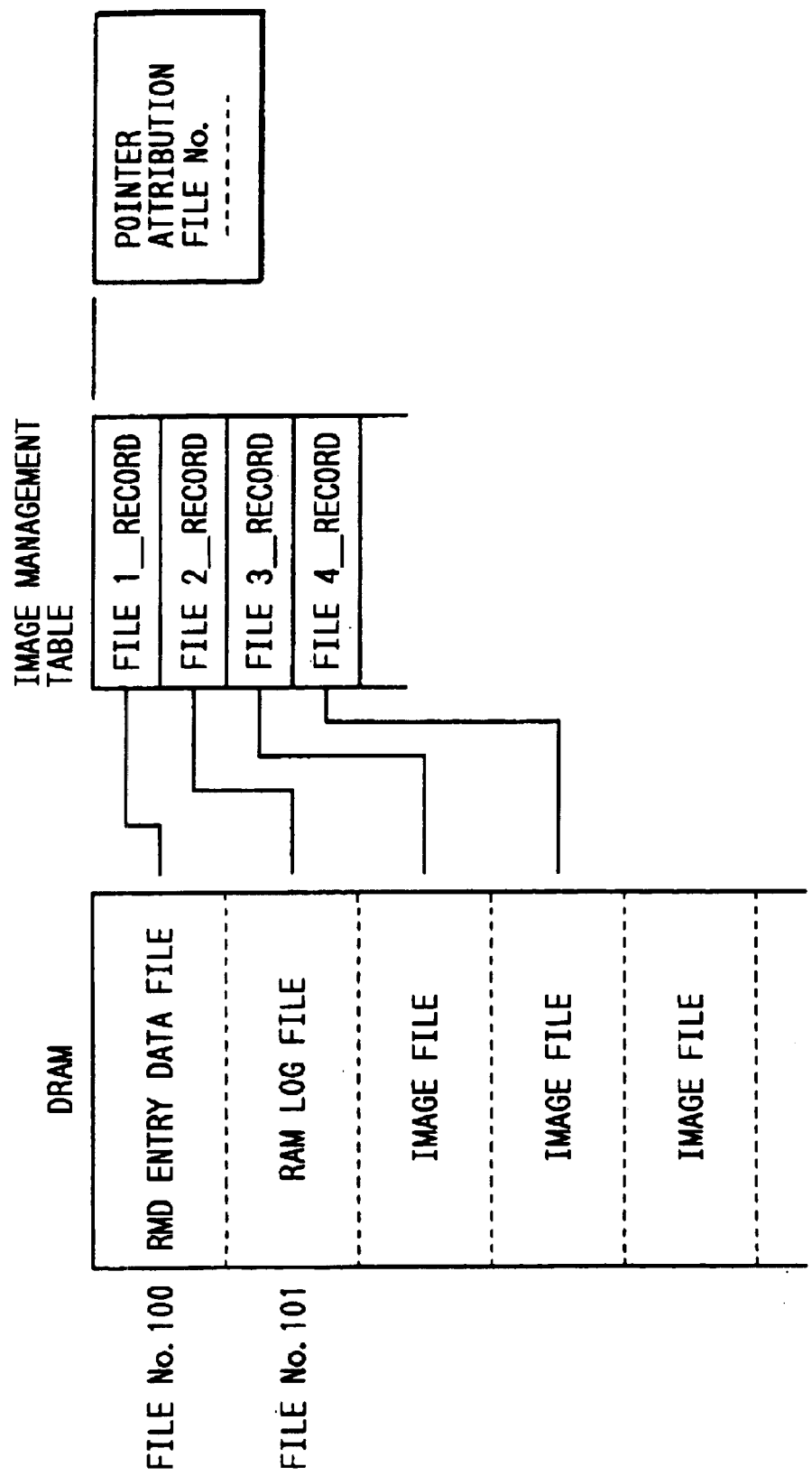
FIG. 48 is a view which illustrates an image management table and an image memory of a facsimile machine 1.

First a management record of a file to be made is obtained onto an image management table to obtain a file region from the DRAM. The management record corresponds to the image file and the entry data file and the like as shown in FIG. 48. When a region has been obtained on the DRAM, ACK is sent out. If no region has been obtained, NACK is sent out (steps S601 to S604). When the management record of the entry data file is made, the file is given the file number.

Then, data supplied from the PC 3 obtained by way of the interface RS232C is sequentially stored in an exclusive buffer. At this time, the data must be composed of an ASCII code and a control code, the data start must be "DT=" and the end of the data must be Q=eop. Therefore, when the data is received (step S605), whether or not the start of the data is "DT=" is checked (step S606). If an affirmative result is obtained, the data receipt is continued (step S607). While storing the received data into the buffer, the data is analyzed in a non-synchronous manner. The data is, in one line units (receipt of "crlf" denotes the completion of one line), transferred from the buffer to an image area on the DRAM. The process for each one line is repeated until the data transfer is completed. Thus, the data file is closed. That is, when "crlf" is received (step S608), a discrimination is made that one line is completed, causing data for one line is written into the file formed in the DRAM (step S609).

Figure 46:
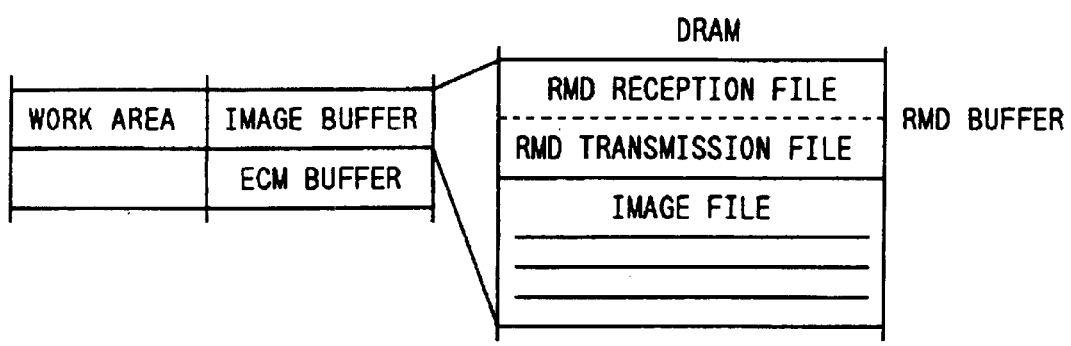
FIG. 46 is a view which illustrates a RMD transmitting/receiving buffer of the remote entry system according to the fourth embodiment and a fifth embodiment.

The transmitting buffer according to this embodiment means an RMD transmission file shown in FIG. 46. The foregoing file is the same as the RMD entry data file and serves as a region for storing data supplied from the PC 3 and also serves as a region for the entry data to be transmitted to the remote facsimile machine 2. The receiving buffer is the RMD receipt file shown in FIG. 46. The foregoing file is the same as an RMD log file, the file being a region for storing the signal received from the remote facsimile machine and the transmission signal of the communication adapter and also a region for recording the log.

The entry data file is, as shown in FIG. 48, made in the same file as that for the image file to be made at the time of the image communication operation to be performed by the facsimile machine. Therefore, the entry data and the image data can be handled similarly, and an image can be written into an image area of the remote facsimile machine 2 by a similar method for the entry data.

While processing the data, Q given to the trailing portion of the data is tested. If the result is "EOP", a discrimination is made that the procedure is completed, and the file is closed (step S611). If the result is "EOM" or "MPS", a status command ensuing the data is received from the PC 1 (step S612). In accordance with the foregoing command, the file number given at the time of making the management record is, as status information, transmitted to the PC 1 by way of the interface RS232C (step S613).

The command for use in the procedure shown in FIG. 44 and its response are shown in FIGS. 42A to 42D. FIG. 42A and FIG. 42B are continue, FIG. 42C illustrates the format of a file write command, and FIG. 42D illustrates the contents of a status command 52.

Making of Log File

When making of the entry data file in step S501 has been completed as described above, the flow proceeds to step S502 in which the log file is made in the image area on the DRAM. The procedure for making the log file is shown in a flow chart shown in FIG. 49.

The log file is opened such that the file number of the latest image file (the term "image file" is the name including the entry data and the log file) is examined (steps S801 and S802), and then the file number is given to correspond to the result of the examination (step S803). Then, the management record of the log file is, similarly to the entry data file, obtained on to the image management table. In order to obtain it, examinations are performed whether or not the management record region can be obtained on the image management table and whether or not the file region can be obtained on the DRAM (step S804). If they can be obtained, a management record is made (step S806) so that the log file can be opened in the image file region (step S807). The management record can be managed with the file number (corresponding to the file) which is the member. The file number is increased by one from the previous file number at the time of obtaining the image management record on to the image management table. Assuming that the file number of the entry data file is 100, and the file number of the log file is 101 (see FIG. 48).

Connection and Initialization of Circuit

When the entry data file and the log file have been opened as described above, the facsimile machine 1 calls the facsimile machine 2 in the public circuit network in step S503. If the circuit has been connected, the entry data form is converted into a transmission signal in the 300 bps HDLC frame format shown in FIGS. 8A to 8C in accordance with a remote entry communication procedure and it is transmitted in step S504. The remote entry communication procedure has the introduction thereof which is the T.30 initial identification phase shown in FIG. 5. That is, the message change shown in FIG. 5 is performed in step S504. In this phase, the rate of the ensuing communication is set to a high speed procedure of 9600 bps or 4800 bps. The remote facsimile machine 2 which has received the entry data declares that it has the remote entry function in the NSF (Non-Standard Function). The facsimile machine 1, which has received the declaration, issues a machine type request command, which is the machine type reading command, to the remote facsimile machine 2 and waits for the machine type declaration response. The facsimile machine 1 then waits for the machine type declaration response. The machine type request command is issued in the NSS (Non-Standard Function). When the NSC (Non-Standard Function) of the machine declaration response has been received, the MCF (Message Confirmation) denoting the completion of the machine type declaration is transmitted. When the machine type declaration phase has been completed, the remote entry procedure is shifted to the data entry phase shown in FIG. 6.

(Writing to Entry Data File and Log File)

In the data entry phase, the facsimile machine 1 receives the NSF, which is the data transfer request command supplied from the remote facsimile machine 2 to transmit the NSS which is the entry command and the entry data. The facsimile machine 1 waits for the entry response from the remote facsimile machine 2 after it has transmitted the NSS. The NSS is in the form realized by converting the entry data into the HDLC frame format, and FIF (information field) of the NSS is the contents of the entry data.

The response with respect to the NSS and supplied from the remote facsimile machine 2 is categorized into an affirmative response and a negative response which respectively are MCF and RTN (training negation). When the communication adapter 2 has received the MCF, it transmits the NSS of the next command if the next command is present. If no next command is present, it transmits the DCN (disconnection command). If the communication adapter 2 has received the RTN, it transmits the DCN and completes the process or transmits a next command.

The process for executing the foregoing procedure is performed in steps from step S505 in such a manner that the command is received in step S205. Then, the transmitted contents and the received contents are stored into the receiving buffer, that is, the log file in steps S506 and S507. At this time, transmission identifier "TX" is added to the received contents and receipt identifier "RX" is added to the received contents as shown in FIGS. 50 and 51 before the contents are written.

Figure 52:
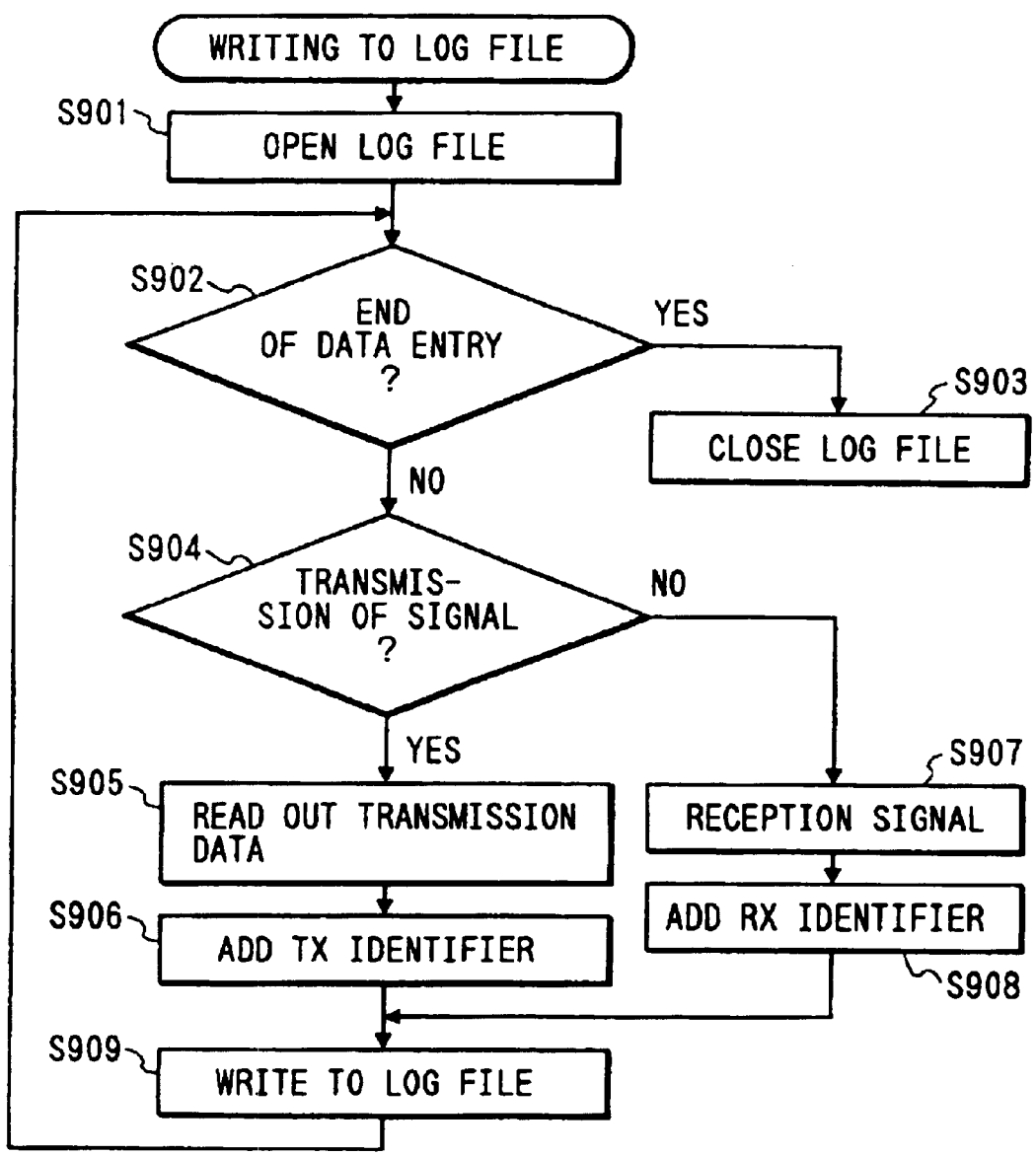
FIG. 52 is a flow chart for generating a log file in the facsimile machine 1.

The processes to be performed in steps S506 and S507 are shown in a flow chart shown in FIG. 52.

First, the log file is opened (step S901), and an examination is performed that the signal is transmitted or received (step S902). In accordance with the result of the examination, data is written on the log file. If the transmission is made, the contents of the entry data file are read out (step S905) and the identifier "TX" is added (step S906). If the signal is received, that is, if a signal is received from the facsimile machine 2, the received signal is read (step S907) and the identifier "RX" is added (step S908). Then, data is written on to the log file (step S909). When the transmission contents are written to the log file, an operation of transferring the data from the entry data, which is the transmitting buffer, to the receiving buffer is performed and an access to the two buffers is made. When the transmission has been completed, that is, when the remote data entry has been completed, the log file is closed (step S903).

The identifiers "TX" and "RX" are effectively used when the log file is transmitted to the PC 3 in accordance with the entry confirmation command issued from the PC 3 and a confirmation is made whether or not it has been allowed to enter normally.

When the transmission and receipt contents have been recorded into the log, an examination is made in step S508 whether or not the MCF has been received. If it has not been received, the DCN is transmitted to the facsimile machine 2 and the transmission of the entry data is completed. If the MCF has been received, an examination is made in step S509 whether or not the command to be transmitted is present. If the command is present, the process of transmitting the entry command in step S505 is repeated. If no command is present, the DCN is transmitted in step S510 and the process is completed.

(Reading of Log File)

The log file made by the foregoing procedure can be read out by the PC 3.

The facsimile machine 1 transmits the contents of the log file in accordance with the result request command (the file read command) issued from the PC 3. The result request command is a command for requesting the transmission of the log file. The command requires the file number to be instructed from the PC 3. The PC 1 reads out the file number of the entry data file with the status command at the time of making the previous entry data file (in step S613 shown in FIG. 44). Since the file number of the log file is a value obtained by adding one to the file number of the data file as described above, the number of the log file can be obtained by adding one to the file number of the entry data file which has been read out.

The file reading procedure is shown in FIGS. 43A and 43B. FIG. 43A illustrates the message transmission/receipt, and FIG. 43B illustrates the format of the file read command 61.

FIG. 40 illustrates the process to be performed by the facsimile machine 1 which has received the image confirmation command from the PC 3. In this process, the procedure of the file read command shown in FIG. 45 is executed while making the log file to be the subject.

Figure 45:
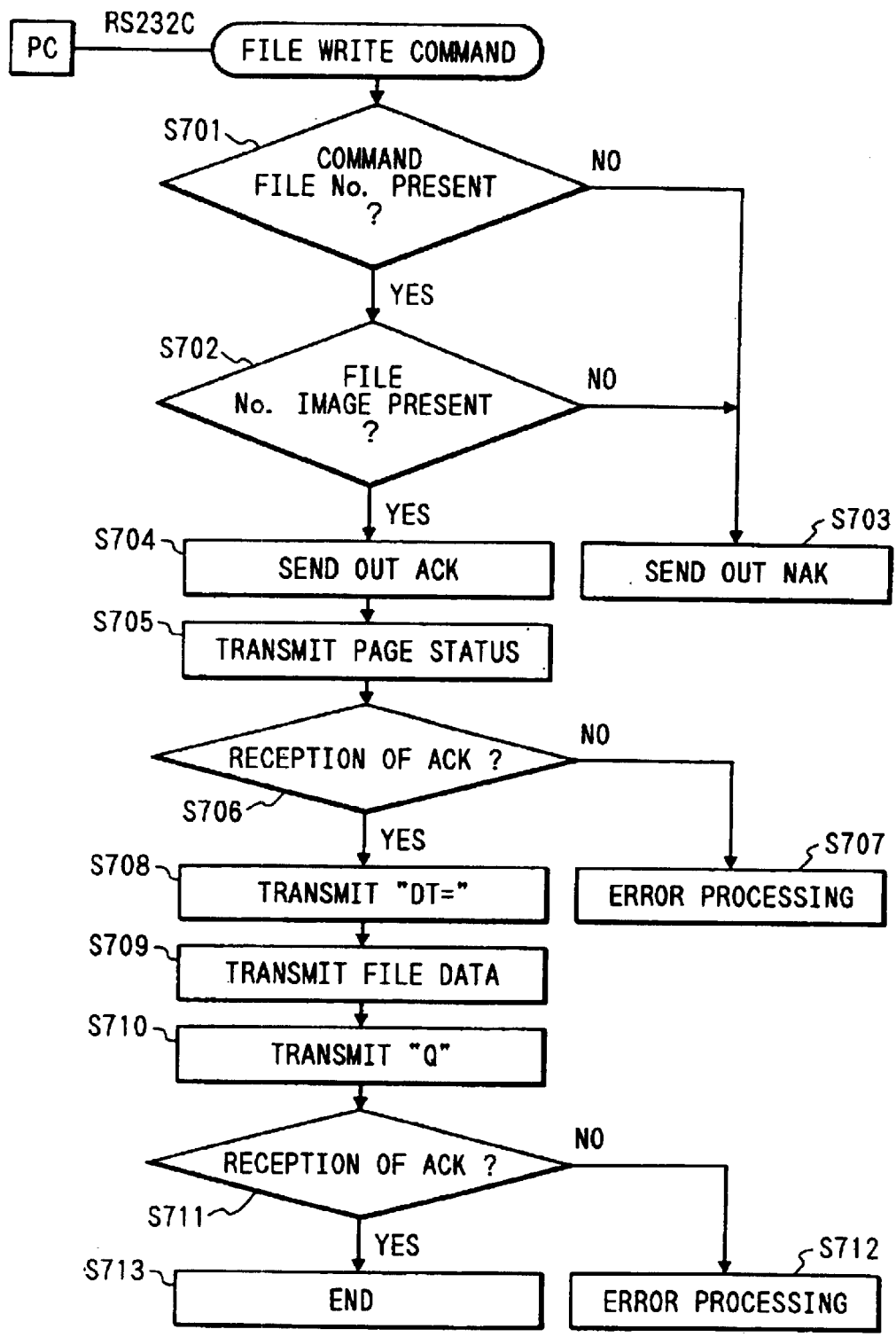
FIG. 45 is a flow chart of the operation of the remote entry system by way of the interface RS-232C to be performed when file reading is performed.

As show in FIG. 45, an examination is made whether or not the file number is given to the command (step S701). If the file number is present, whether or not the file having the number is examined (step S702). If the file is present, the ACK is sent to the PC 3 (step S704). Then, the page status is transmitted to examine the response (steps S705 and S706). If the ACK response has been made, the contents of the file are transmitted while conforming to a predetermined format (steps S708 to S712).

Since the log file, which is the result of the entry, is transmitted to the PC 3 as described above, the normal completion of the remote data entry can be recognized through the PC 3.

Fifth Embodiment

Figure 53:
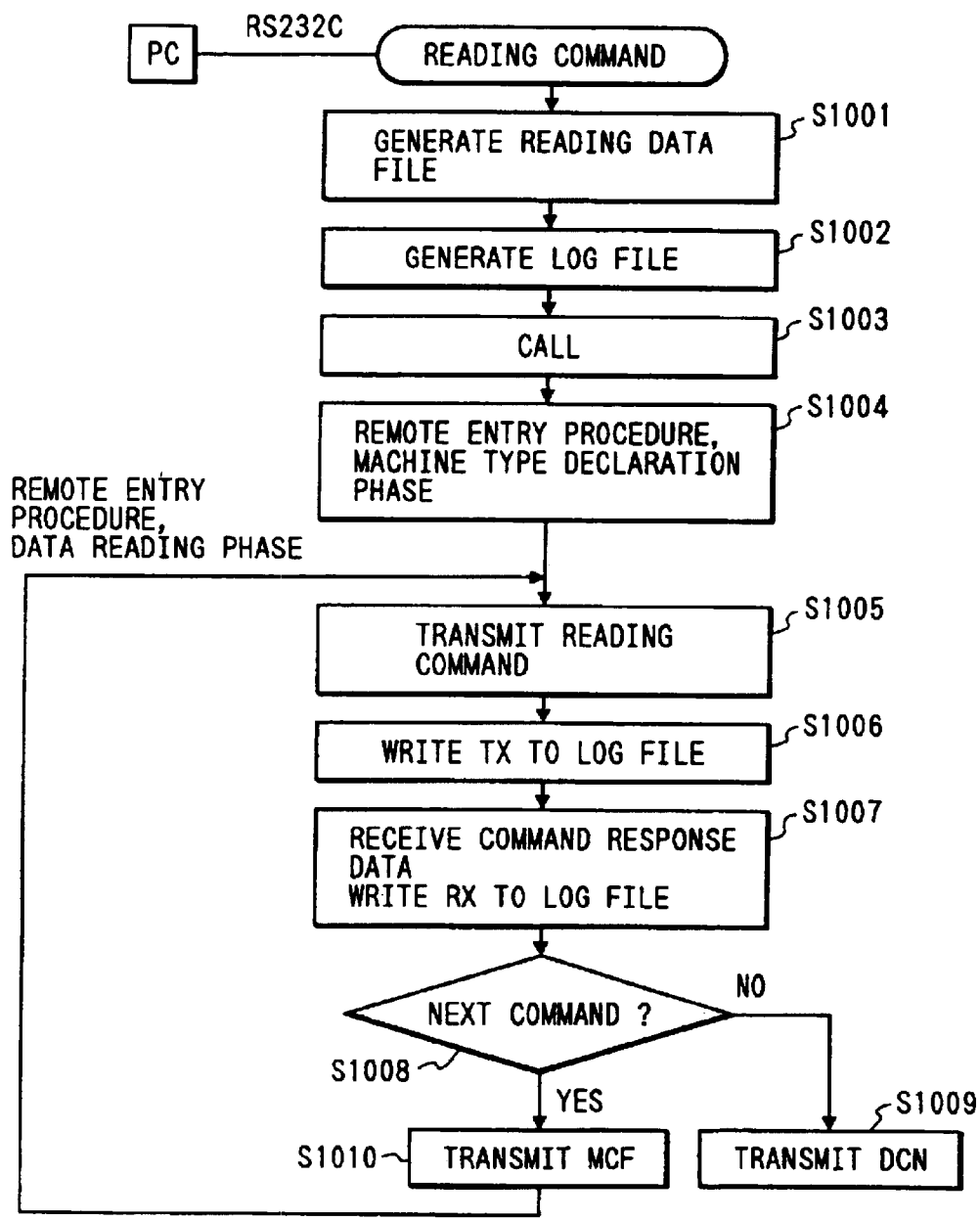
FIG. 53 is an operation flow chart of the facsimile machine 1 of the remote entry system according to the fifth embodiment.

A fifth embodiment will now be described in which entry data allowed to enter the remote facsimile machine 2 is read out. FIG. 53 illustrates the procedure of the process to be performed by the facsimile machine 1 which has received the entry data reading command from the PC. The foregoing procedure is substantially the same as the process for setting the entry data described in the fourth embodiment except for the different between the command and the response and a slight difference in the process. Therefore, the common process to the fourth embodiment is described briefly.

The PC 3 inputs the entry data items to be read from the remote facsimile machine 2 in accordance with the host program on the PC 3 (see FIG. 41) and transmits data to the facsimile machine 1 by way of the interface RS232C (see FIGS. 42A to 42D and FIG. 44).

The facsimile machine 1 sequentially stores the data transmitted from the PC 3 into the exclusive buffer to write the data for each line into the entry data file. When the data transmission has been completed, the entry data file is closed.

Then, the log file is generated. Assuming that the entry data file number is 100, the log file number of the file is 101.

The communication adapter 2 calls the remote facsimile machine 2 in the public circuit network. When the circuit has been connected, the communication adapter 2 transmits the entry data in accordance with the remote entry communication procedure while converting it into the 300 bps HDLC frame format (see FIGS. 8A to 8C). The remote entry communication procedure has the introduction thereof which is the T.30 initial identification phase (see FIG. 5). The remote facsimile machine which has received the data declares that it has the remote entry function in the NSF (Non-Standard Function). The communication adapter which has received the declaration issues the machine type request command, which is the command to read the machine type, to the remote facsimile machine and waits for the machine type declaration response. The machine type request command is issued in the NSS (Non-Standard Setting). When the NSC (Non-Standard Function Command) of the machine type declaration response is received, the MCF denoting the completion of the machine type declaration is transmitted. When the machine type declaration phase has been completed, the remote entry procedure proceeds to the data reading phase.

The foregoing operations are performed in steps S1001 to S1004 shown in FIG. 53. The data reading phase is performed in accordance with the procedure shown in FIG. 7.

As shown in FIG. 7, the data reading phase is performed in such a manner that the facsimile machine 1 receives the NSF, which is the data transfer request command issued by the remote facsimile machine 2, and transmits the NSS which is the reading command to the facsimile machine 2. After the NSS has been transmitted, the entry response from the remote facsimile machine 2 is waited for. The NSS is obtained by converting the reading data into the HDLC frame format. The response from the remote facsimile machine 2 is made in the form of the reading data, which is the NSC. The facsimile machine 1 makes a response to the NSC, the response being categorized into an affirmative response and a negative response each of which is composed of the MCF (message confirmation) and the RTN (training negation). After the response has been transmitted, the NSF which is the data transfer command of the remote facsimile machine is waited for. After the NSF has been received, the NSS is transmitted if the reading data item is present. If the item is not present, the DCN is transmitted, and the process is completed.

The process for executing the foregoing procedure is performed in the step from step S1005. In step S1005, the reading command is transmitted, and the contents to be transmitted and received are stored in the receiving buffer, that is, the log file in steps S1006 and S1007. At this time, the transmission identifier "TX" is added to the contents to be transmitted as shown in FIGS. 50 and 51, while the receipt identifier "RX" is added to the contents to be received. The processes to be performed in steps S506 and S507 are shown in the flow chart shown in FIG. 52.

Figure 54:
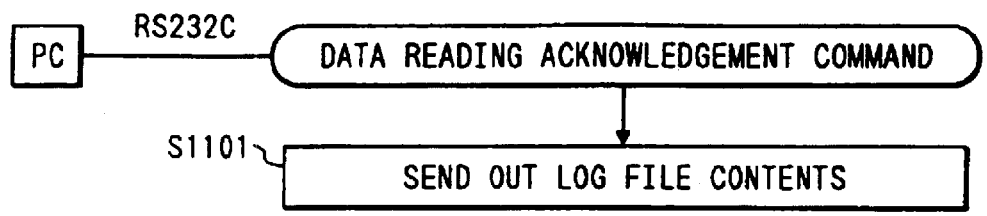
FIG. 54 is an operation flow chart of the facsimile machine 1 of the remote entry system according to the second embodiment.

The log file thus-made can be read on to the PC 3 by using the data reading confirmation command issued from the PC 3. FIG. 54 illustrates the process to be performed to correspond to the command and performed by the facsimile machine 1, the process being substantially the same as the process which is performed when the log file is instructed with the file read command shown in FIG. 45.

When the entry data is read out as described above, the hysteresis can be read out on to the PC 3 and the results can be recognized on the PC 3.

Sixth Embodiment

Figure 13:
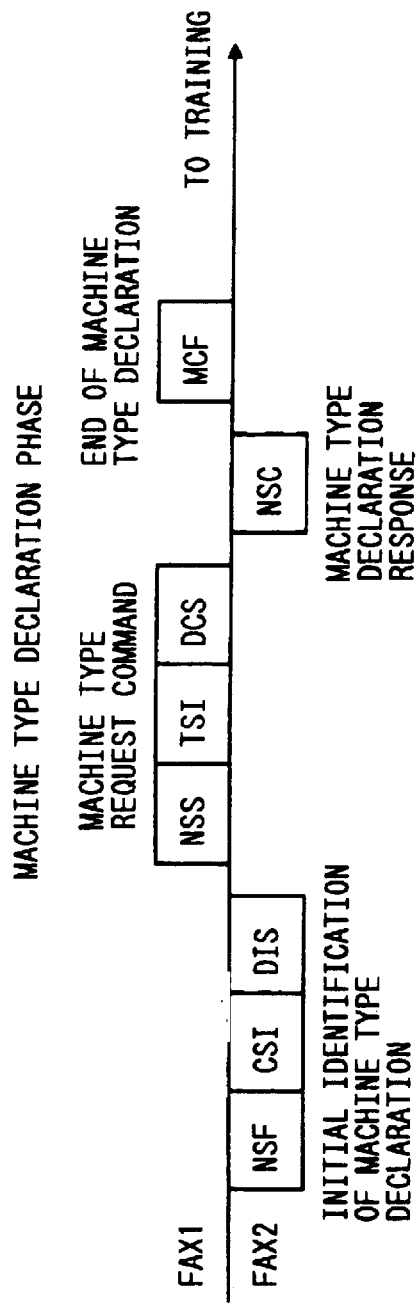
FIG. 13 is a view which illustrates a remote entry communication procedure according to the second modification.
Figure 14:
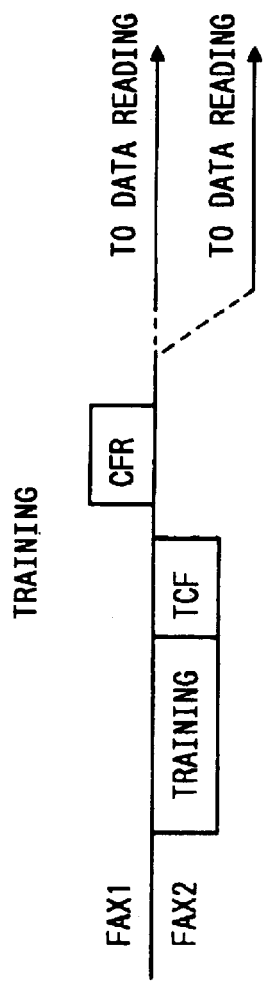
FIG. 14 is a view which illustrates a remote entry communication procedure according to the second modification.

FIG. 13 illustrates the procedure of the process to be performed when the entry command has been sent from the PC 3 to the facsimile machine 1.

The PC 3 supplies data to be caused to enter the remote facsimile machine 2 by the host program on the PC 3 (see FIG. 41) and transmits the data to the facsimile machine 1 by way of the interface RS232C (see FIGS. 42A to 42D and FIG. 44).

The facsimile machine 1 sequentially stores the data sent from the PC 3 into the exclusive buffer and writes the data for each line on the data file. When the data has been transferred, the data file is closed. The data file is generated on the image area on the DRAM for the image file to be generated at the time of the image transfer performed by a usual facsimile machine (see FIG. 48).

The image file is managed by means of the file number and also the file number is given to the entry data file. The transmitting buffer according to this embodiment means the RMD transmitting buffer shown in FIG. 47 which is a region for storing the reading data of the contents of the generated data file, that is, the entry data to be transmitted to the remote facsimile machine. By possessing the buffer, the formation of the transmission data at the time of the retransfer and data writing on to the log file can efficiently be performed.

The facsimile machine 1 calls the remote facsimile machine 2 in the public circuit network. The machine type declaration phase of the remote entry is defined as the entrance of the remote entry procedure. In this state, a high speed procedure at 9600 bps and 4800 bps is employed to perform the communication. The procedure of the machine type declaration phase is as shown in FIG. 13.

The remote facsimile machine 2 which has received the data declares that it has the remote entry function in the NSF (Non-Standard Function Declaration). The facsimile machine 1 which has received the declaration issue, to the remote facsimile machine 2, the machine type request command which is the command to read the machine type and waits for the machine type declaration response. The machine type request command is issued in the NSS (Non-Standard Function Declaration). When the NSC (Non-Standard Function Command) of the machine type declaration response has been received, the MCF denoting the completion of the machine type declaration is transmitted. When the machine type declaration phase has been completed, training is performed and the CFR (receipt preparation confirmation) is transmitted. Then, the entry command and data are, in the form of the HDLC format, are transmitted similarly to the transmission of the image data. In this case, a data capacity of 64 Kbyte can be transmitted in one transmission operation. When the communication adapter 2 has received the entry command, it writes the command on the log file. The foregoing procedure is the same as that according to the first embodiment.

The foregoing processes are performed in steps S1201 to S1206.

The remote facsimile machine 2 which has received the entry data checks transmission error in the received data. If the transmission data is present, the remote facsimile machine 2 transmits the PPR (retransfer request signal) to the facsimile machine 1. The facsimile machine 1 waits for the response of the remote facsimile machine 2 to test it (step S1208). If the PPR has been received, the facsimile machine 1 retransfers the frame denoted by the PPR (step S1209).

If the result of the check of the error in the receive data is normal, the remote facsimile machine 2 commences the entry operation such that it transmits the RNR until the entry operation is completed. When the entry has been completed, it transmits the MCF. Therefore, the facsimile machine 1 is made standby until it receives the MCF while transmitting the RR with respect to the received RNR (step S1210).

When the response is received from the remote facsimile machine 2, it is written on the log file (step S1211). The procedure in this case is the same as that according to the fourth embodiment. Then, whether or not the received response is the MCF is tested (step S1212). If the MCF has been received, whether or not next data is present is examined (step S1213). If the data is present, the next data is transmitted. If the next data is not present, the DCN is transmitted and the communication is completed (step S1214).

Figure 15:
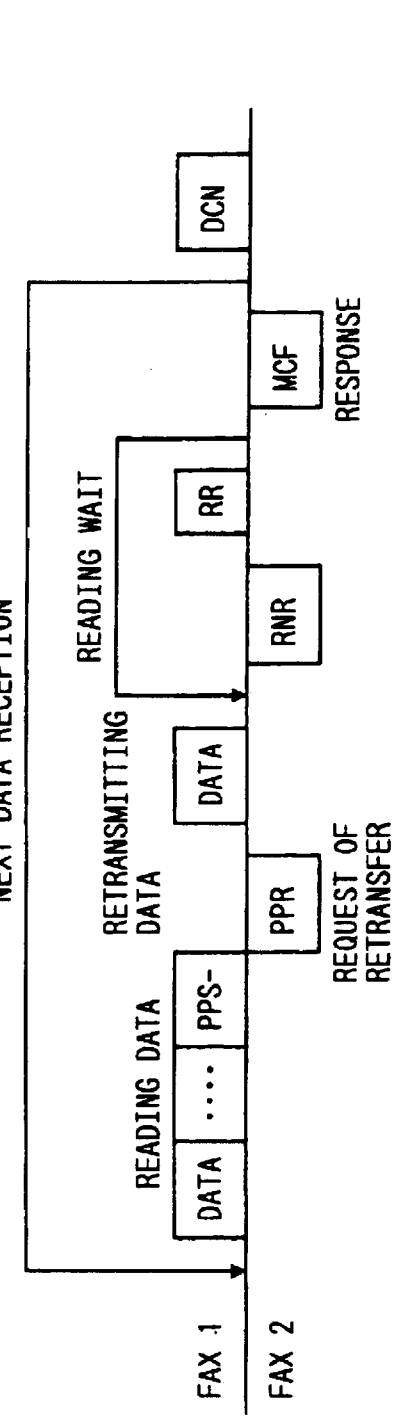
FIG. 15 is a view which illustrates a remote reading communication procedure according to the second modification.
Figure 16:
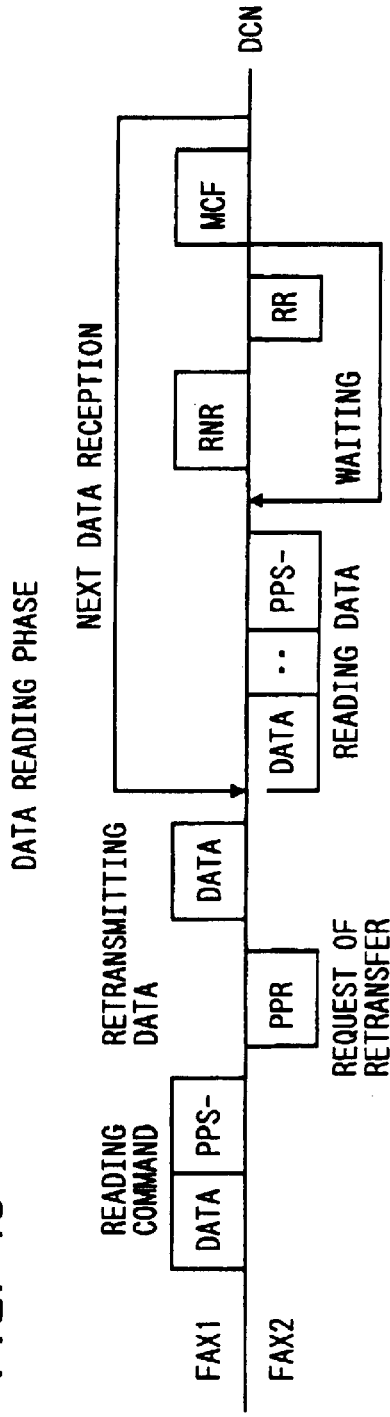
FIG. 16 is a view which illustrates a remote reading communication procedure according to the second modification.
Figure 55:
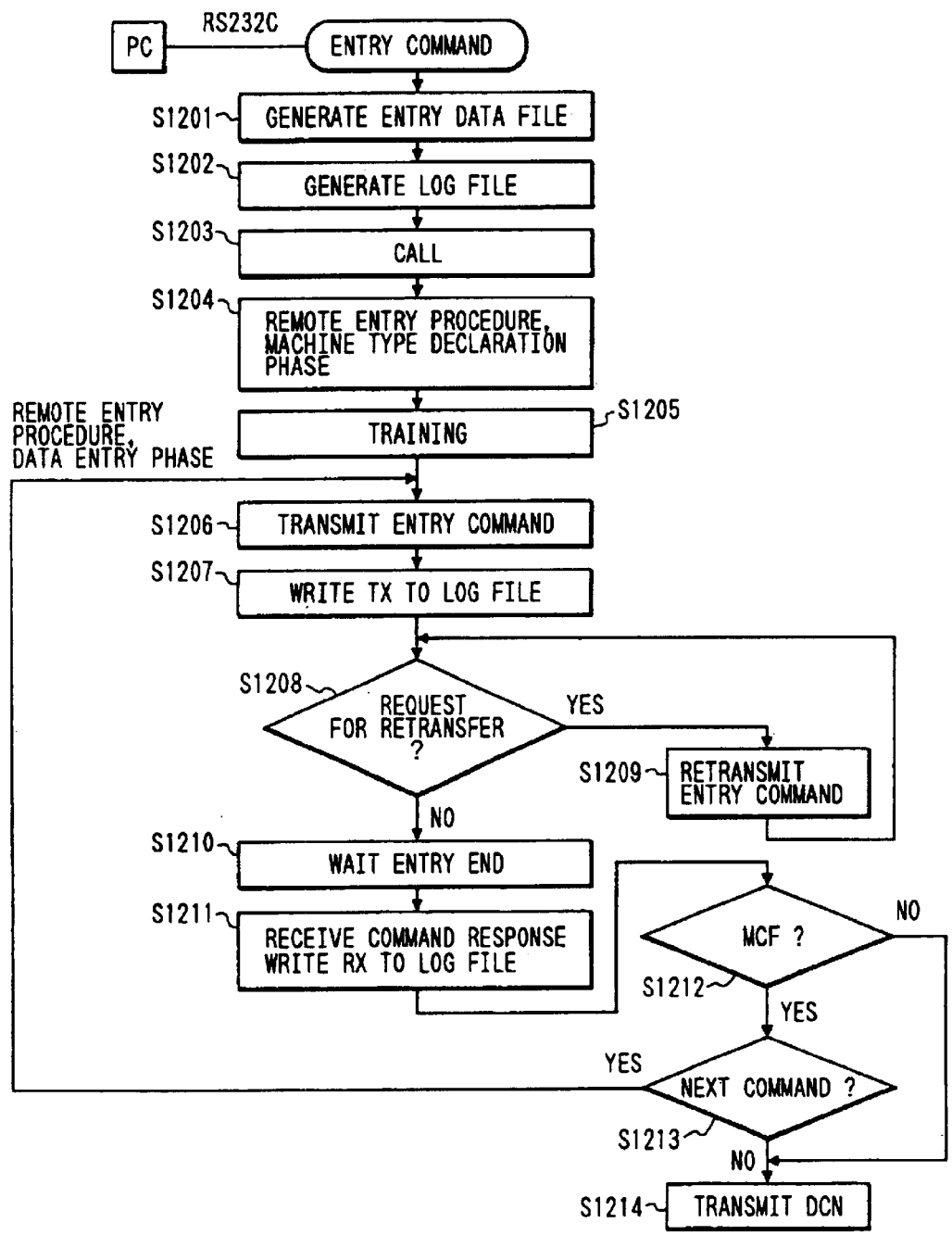
FIG. 55 is an operation flow chart of a communication adapter of the remote entry system according to a sixth embodiment.

The procedure from step S1206 to step S1214 is made similarly to that shown in FIG. 15. By employing the procedure shown in FIG. 55, only the command received correctly is recorded on the log while preventing recording of the command transferred again due to the transmission error. Therefore, the size of the log file can be made adequately.

The thus-made log file can be read out from the PC 3. That is, the facsimile machine 1 is operated in such a manner that the communication adapter transmits the contents of the log file to meet the result request command (file read) issued from the PC 3 by way of the interface RS232C (see FIGS. 40, 43A, 43B and 45). The PC 3 side is able to know the normal completion of the remote data entry due to the foregoing response.

Seventh Embodiment

Figure 56:
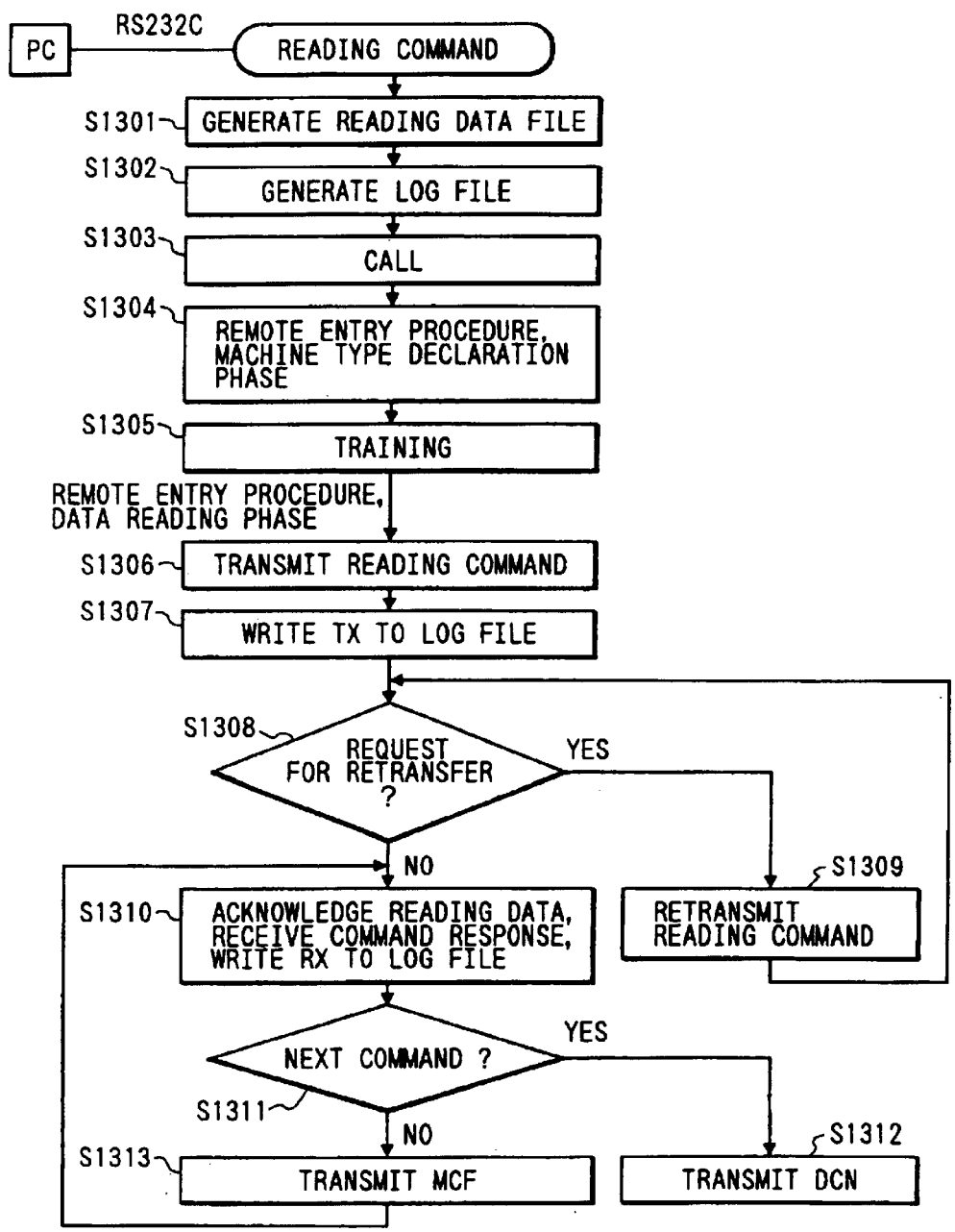
FIG. 56 is an operation flow chart of the facsimile machine 1 of the embodiment of an RMD system.

FIG. 56 illustrates the procedure of the process to be performed by the communication adapter according to the seventh embodiment. This embodiment is so arranged that the entry command according to the sixth embodiment is replaced by a reading command.

The PC 3 receives the reading data items onto the remote facsimile machine 2 from a user by using the host program on the PC 3 (see FIG. 41) and transmits the data to the communication adapter 2 via the interface RS232C (see FIGS. 42A to 42D and 44).

The facsimile machine 1 sequentially stores the data transferred from the PC 3 into the exclusive buffer to write data for each line on to the entry data file. When the data transfer has been completed, the entry data file is closed. The entry data file is generated on a similar image area to the image file to be generated at the time of the usual facsimile operation (see FIG. 48).

Figure 47:
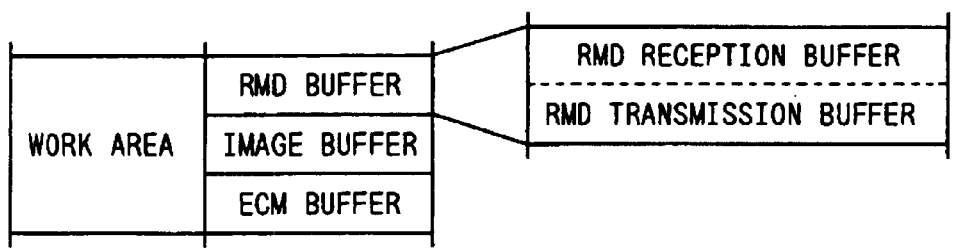
FIG. 47 is a view which illustrates the RMD transmitting/receiving buffer of the remote entry system according to the fourth and fifth embodiments.

The image file is managed with the file number and the entry data file is also given the file number The transmitting buffer according to this embodiment means the RMD transmitting buffer shown in FIG. 47 which is the region for storing reading data of the data file generated here, that is, the entry data to be transmitted to the remote facsimile machine. By possessing the foregoing buffer, the formation of the transmission data at the time of the retransfer and data writing on to the log file can efficiently be performed.

The facsimile machine 1 calls the facsimile machine 2 in the public circuit network. The machine type declaration phase of the remote entry is defined as the entry of the remote entry procedure and the high speed procedure of 9600 bps and 4800 bps is employed to perform the communication (see FIG. 5).

The remote facsimile machine 2 which has received the data declares that it has the remote entry function in the NSF (Non-Standard Function Declaration). The facsimile machine 1 which has received the declaration issues, to the remote facsimile machine 2, the machine type request command which is a command to read the machine type and waits for the machine type declaration response. The machine type request command is included in the NSS (Non-Standard Function Declaration). When the NSC (Non-Standard Function Command) of the machine type declaration response is received, the MCF denoting the completion of the machine type declaration is transmitted. When the machine type declaration phase has been completed, training is performed and the CFR (Confirmation of the Receipt Preparation) is transmitted. Then, the reading data items are transmitted in the form of the HDLC format similarly to the transmission of the image data. In this case, a data capacity of 64 Kbyte can be transmitted in one transmission operation.

The remote facsimile machine 2 which has received the reading data transmits the PPR (Retransfer Request Signal) if the transmission error is present as a result of the transmission error check. The facsimile machine 1 which has received the PPR retransfers the frame indicated by the PPR. If a normal result is obtained in the error check performed by the remote facsimile machine 2, the remote facsimile machine 2 transmits the contents of the entry data in the HDLC format. The facsimile machine 1 receives the data and performs the process of writing the received data on to the receiving buffer. If an item having no reading data response is present, the MCF is transmitted. If all reading data items are normal, the DCN is transmitted and the communication is completed.

The facsimile machine 1 stores the transmission contents and the receipt signal into the receiving buffer while communicating with the remote facsimile machine 2. At this time, the transfer identifier "TX" is added to the transmission contents and the receipt identifier "RX" is added to the receipt signal before they are written. When the transmission is completed, that is, the remote data entry is completed, the log file is closed (see FIG. 52).

The foregoing procedure is shown in steps S1301 to S1313. The foregoing procedure is similar to the procedure shown in FIG. 16.

The facsimile machine 1 transmits the contents of the log file in response to the result request command (file read) issued from the PC 3 by way of the interface RS232C. Thus, the normal completion of the remote data entry can be known on the PC 3 due to the foregoing response.

Eighth Embodiment

An eighth embodiment of the communication system capable of recognition the communication state of the facsimile machine 1 on the PC 3 will now be described.

The PC 3 transmits the entry data, as a command, to the facsimile machine 1 which acts as the communication adapter. The facsimile machine 1 is connected to the PC 3 by an RS232C cable.

The remote facsimile machine 2 to which the data is caused to enter is connected to the facsimile machine 1 by a public circuit.

<Entry Command Procedure (Registry Command Procedure) to be Performed by Communication Adapter>

Figure 69:
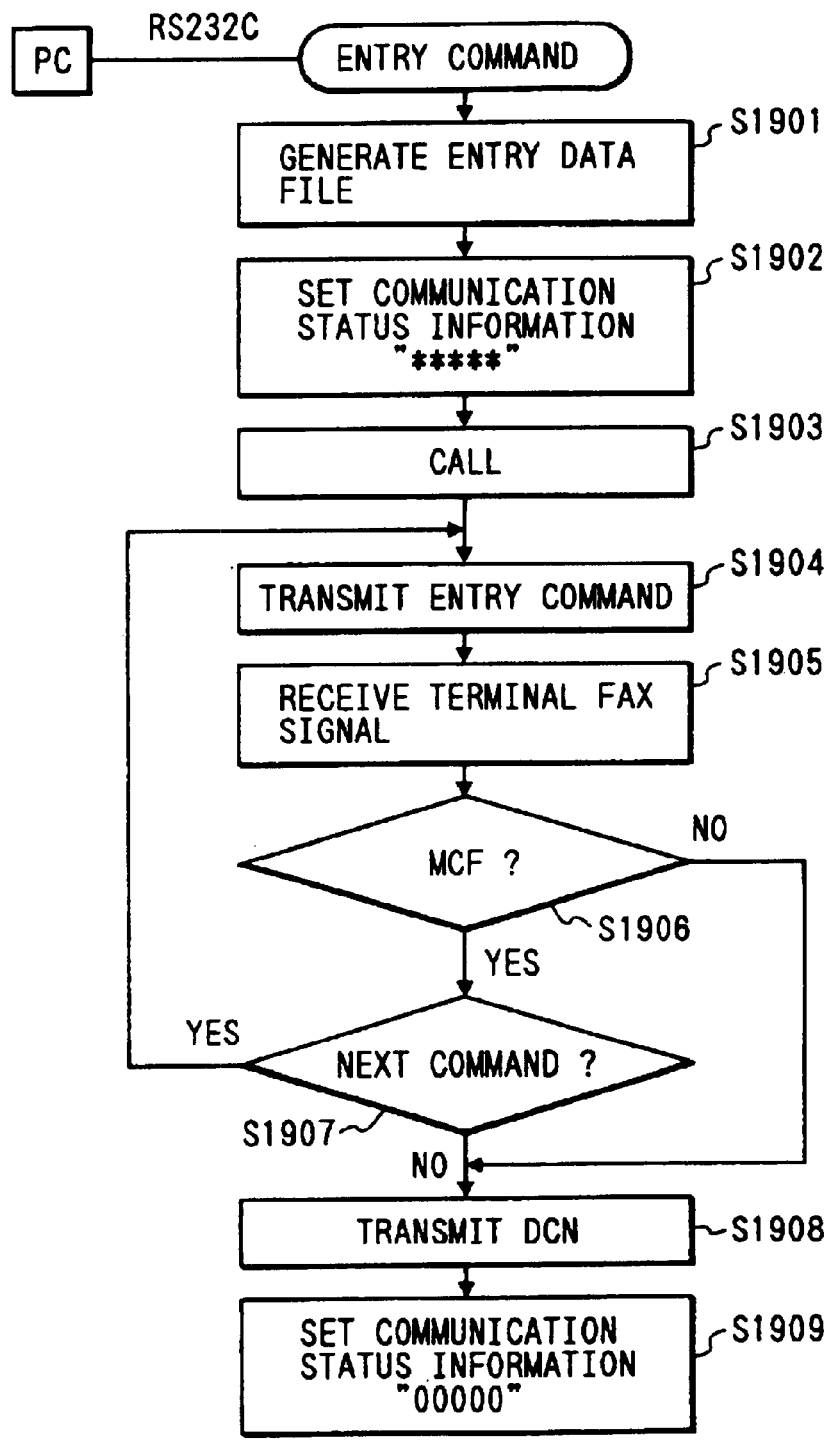
FIG. 69 is an operation flow chart of a communication adapter of the remote entry system according to an embodiment.

FIG. 69 illustrates the procedure of the operation of the facsimile machine 1 to be performed in accordance with the remote data entry command issued from the PC 3.

Figure 49:
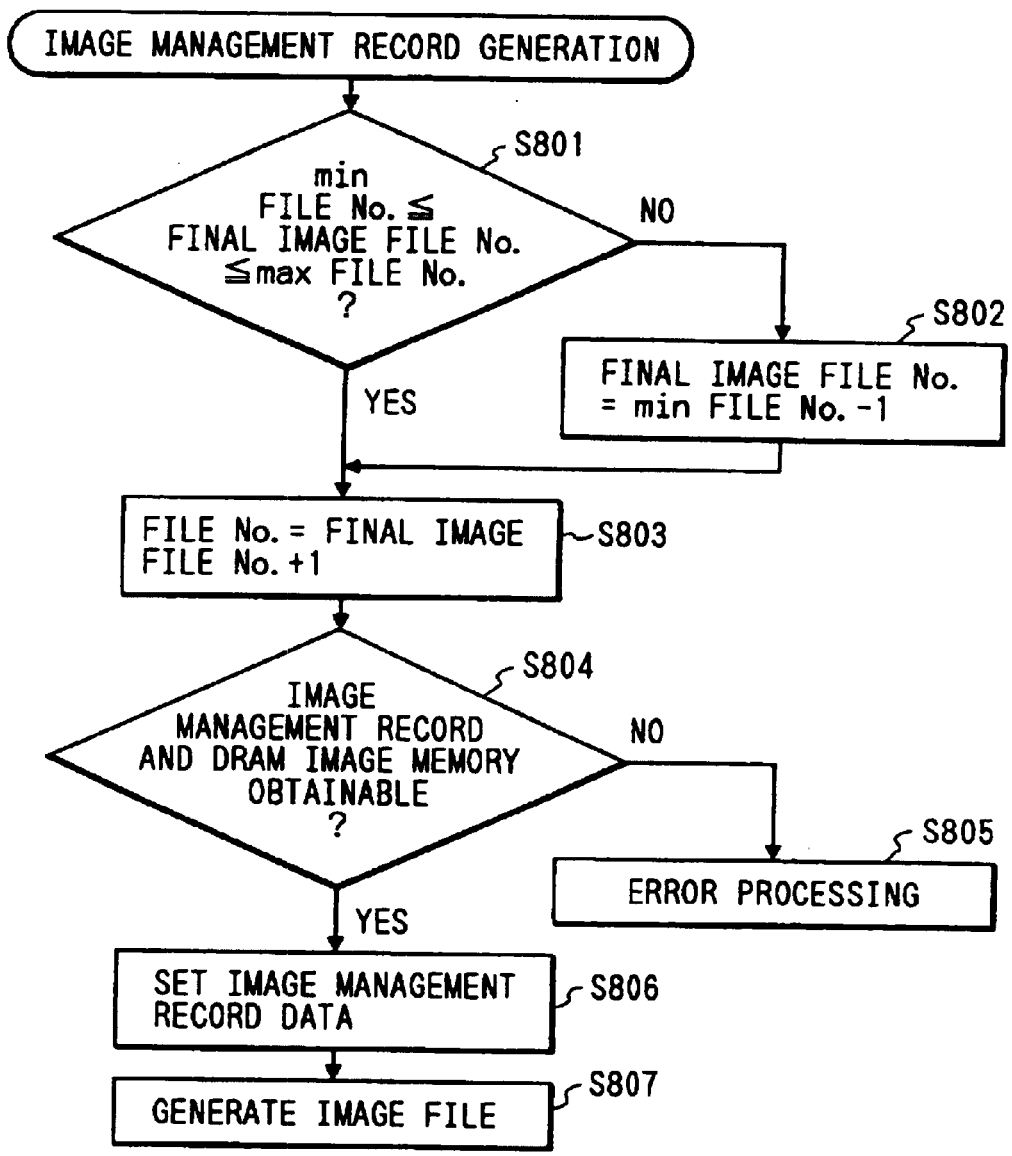
FIG. 49 is a flow chart for generating an image management record in the facsimile machine 1.

The entry data to be caused to enter the remote facsimile machine 2 is supplied by the host program (see FIG. 41) on the PC 3. The PC 3 transmits the data supplied to the facsimile machine 1 by way of the interface RS232C, the data being transmitted as the entry command (see FIGS. 42A to 42D). Then, the process shown in FIG. 49 is commenced.

When the facsimile machine 1 receives the entry command from the PC 3, it obtains a management record of the file to be made on the image management table in step S1901, given a file number and obtains a memory from the DRAM so that the entry data file is made.

The file number is an image file management number which is given to correspond to the file at the time of making the file. The entry data file is generated in the same image area for the image file to be generated at the time of transmitting the image (see FIG. 48).

The facsimile machine 1 sequentially stores the data supplied from the PC 3 by way of the interface RS232C into the exclusive buffer. When the data transfer has been completed, the entry data file is closed.

In next step S1902, the facsimile machine 1 writes "***" as the communication status at the transmission commencement moment. The communication status is data to be stored in a region assigned on to a memory, such as the DRAM, which is included in the apparatus, the communication status being reloaded to correspond to the state of the communication at the time of the completion of the communication. Therefore, the value "***" which has been written before the communication is commenced is employed if the communication is being performed.

In next step S1903, the facsimile machine 1 calls the remote facsimile machine 2 in the public circuit network. If the circuit is connected, the facsimile machine 1 converts the entry data into the transmission signal in accordance with the remote entry communication procedure to transmit the signal in step S1904. The procedure is the same as that shown in FIG. 5.

The response of the facsimile machine 2 to the foregoing transmission is categorized into an affirmative response and a negative response which respective are the MCF (message confirmation) and the RTN (retraining negation). The facsimile machine 1 receives the response from the facsimile machine 2 in step S1905.

When the facsimile machine 1 receives the response, it examines the response in step S1906. When it receives the MCF, the flow proceeds to step S1907 in which an examination is made whether or not the next command is present. If the next command is present, the NSS of the next command is transmitted and the DCN (disconnection command) is transmitted if the next command is present (step S1908). If the RTN is received, the DCN is transmitted and the process is completed. As an alternative to this, the next command is transmitted.

The procedure from step S1904 to step S1908 are the same as that shown in FIG. 6.

Finally, the facsimile machine 1 rewrites the communication status to "0000" at the time of the completion of the communication (the transmission of the entry data file generated in accordance with the file write command of the PC 3 to the remote facsimile machine 2) in step S1909.

<Reading of Status by PC 3>

The PC 3 transmits the status command to the facsimile machine 1 after the PC 3 has transmitted the file write command. The reading protocol to be employed here is arranged as shown in FIG. 57. The commands are arranged as described in the description about the fourth embodiment. The status command is in the form in which subject file number is instructed, the file number being the number of the entry data file in this embodiment. The foregoing status command is continuously transmitted until the communication status indicates the completion or at certain intervals.

The facsimile machine 1 is able to respond to the command issued from the PC 3 by way of the RS232C even if the communication with the remote facsimile machine 2 is being performed. In response to the status command issued from the PC 3, the facsimile machine 1 is operated as shown in the flow chart shown in FIG. 59 in accordance with the protocol shown in FIGS. 57A to 57C.

Figure 59:
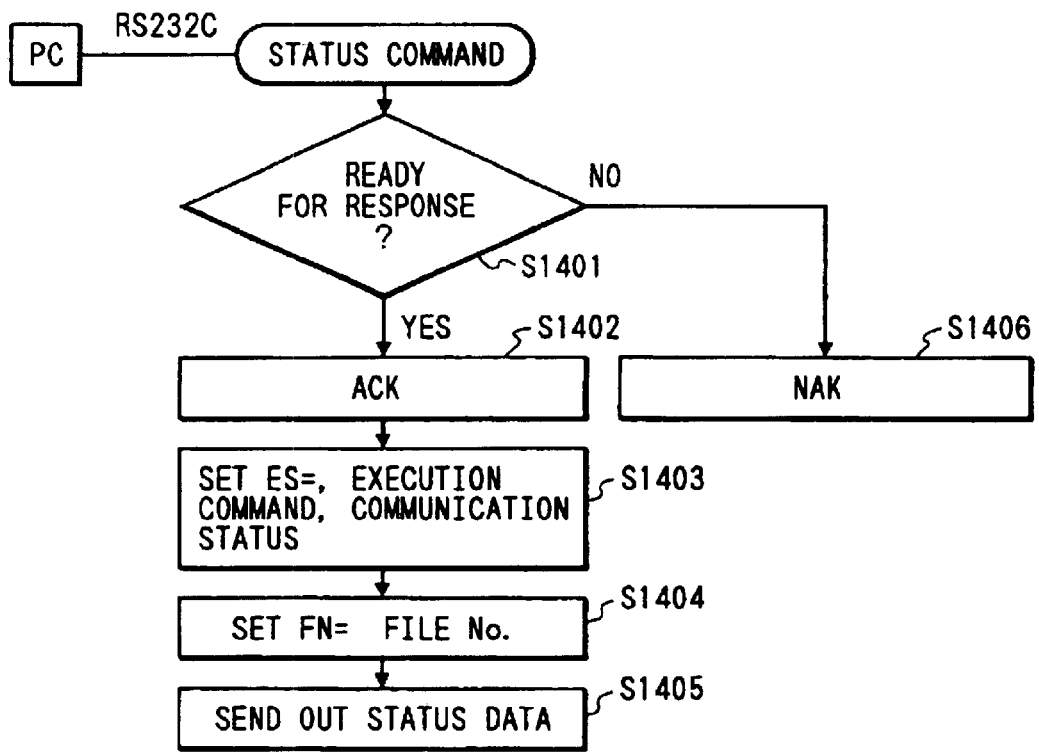
FIG. 59 is an operation flow chart of the facsimile machine 1 of the embodiment of the RMD system.

As shown in FIG. 59, the facsimile machine 1 transmits the ACK if the response to the command can be made (step S1402). If an abnormal state has been realized, the NAK is transmitted (step S1403).

Figures 57A, 57B, 57C:
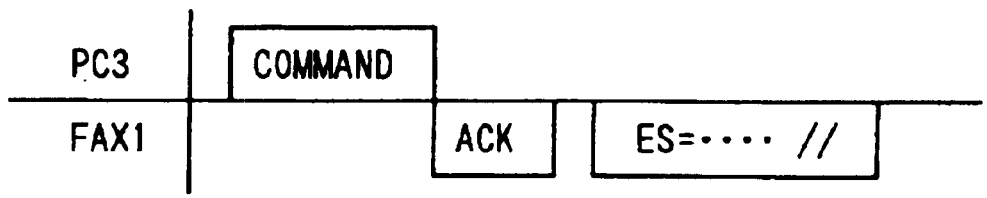
FIGS. 57A to 57C are views which illustrate a status command format by way of the interface RS-232C of the RMD system.

After the ACK has been transmitted, the communication status is formed into the response form and a command response is performed as shown in FIGS. 57A and 57C (steps S1403 to S1405). The form of the response is composed of the file number of the RMD transmission entry data file, the command which is being executed by the file or the executed command and the communication status (see FIGS. 58A to 58C). The communication status is a value read from the memory in which it is stored. The PC which has received the communication status is able to know whether or not the communication is being performed by looking the communication status portion. That is, if the value is "*****", the communication is being performed. If the value is "0000", the communication has been completed.

As a result of the foregoing procedure, the states of the communication between the communication adapter and the remote facsimile machine can be known through the PC to which the communication adapter is connected.

Ninth Embodiment

Figure 60:
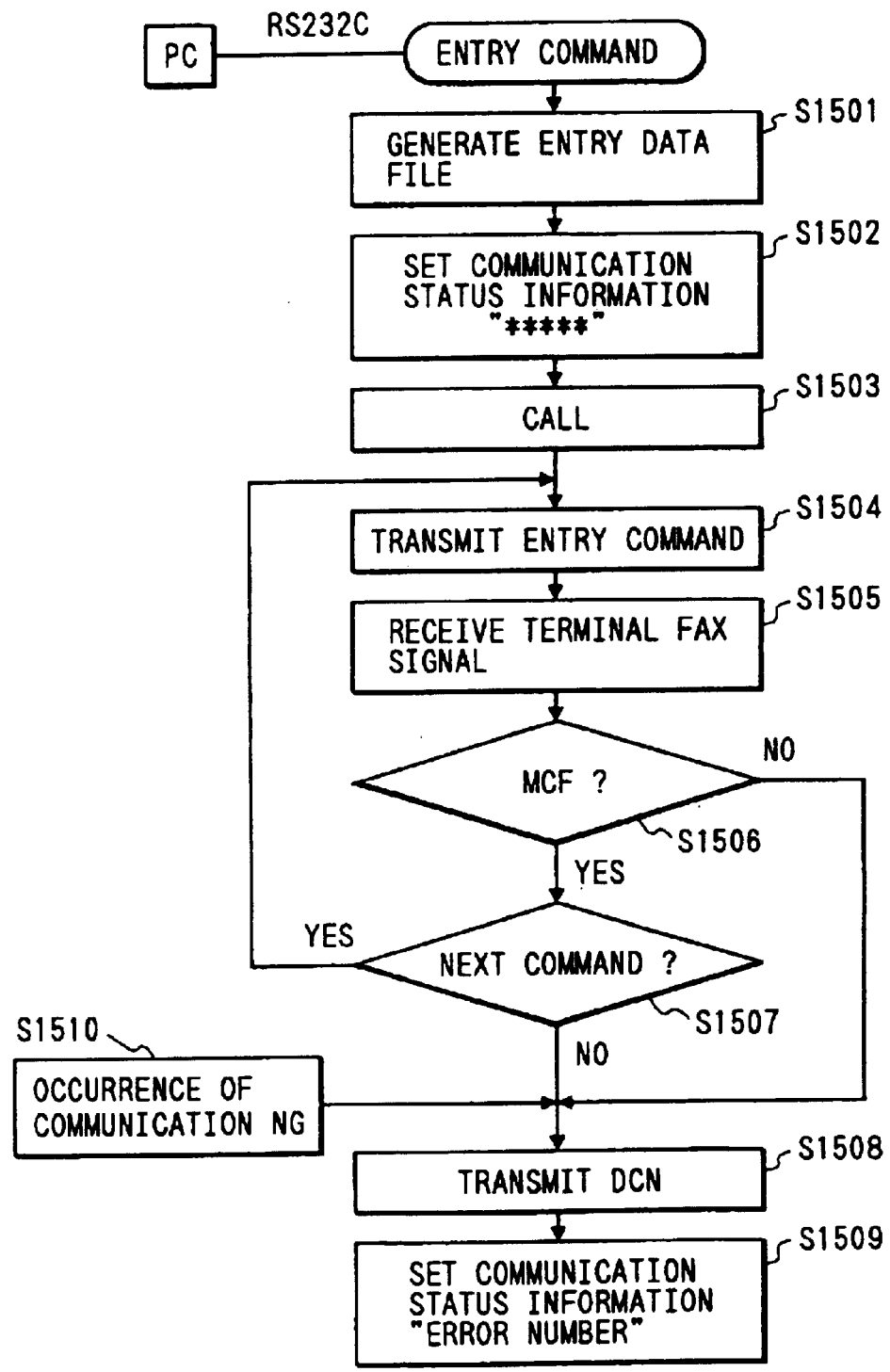
FIG. 60 is an operation flow chart of the facsimile machine 1 of the embodiment of the RMD system.

FIG. 60 illustrates the procedure of the entry command to be issued from the facsimile machine 1 according to this embodiment.

The entry data to be caused to enter the remote facsimile machine 2 is supplied by using the host program (see FIG. 41) on the PC 3, the entry data being transmitted to the facsimile machine 1 by way of the interface RS232C.

As shown in FIG. 60, when the facsimile machine 1 has received the entry command from the PC 3, it makes a management record of the file to be made from the command on the image management table, assigns a file number and obtains a memory from the DRAM as to generate the data file.

The file number is an image management number which is given to correspond to the file at the time of making the file. The data file is made in an image area similar to the image file to be made at the time of a usual file is operated (see FIG. 48).

The data from the PC 3 obtainable by way of the interface RS232C is sequentially stored in an exclusive buffer. When the data transfer has been completed, the data file is closed (step S1501).

Then, the facsimile machine 1 makes the communication status to be "***" at the time of the commencement of the transmission (step S1502). Since the communication status is rewritten only at the completion of the communication, it is made to be "***" if the communication is being performed.

Then, the facsimile machine 1 calls the remote facsimile machine 2 in the public circuit network. When the circuit has been established, the facsimile machine 1 converts the entry data into the form of a transmission signal and transmits it in accordance with the remote entry communication procedure (step S1504).

The response from the remote facsimile machine 2 is categorized into an affirmative response and a negative response which respective are the MCF (message confirmation) and the RTN (retraining negation).

When the facsimile machine 1 has received the MCF, it transmits the NSS of a next command if any. If no next command is present, it transmits the DCN (disconnection command). When the facsimile machine 1 has received the RTN, it transmits the DCN and the process is completed. As an alternative to this, it transmits the next command (steps S1504 to S1508).

If a communication error takes place during transmission of a command to the facsimile machine 2 according to this embodiment, the facsimile machine 1 writes an error number as the communication status (step S1509). The error number is a value which is determined depending upon the phenomenon of the error and the cause.

The PC 3 transmits the file write command, and then transmits a status command. The status command is in the form with which the file number is instructed, and the file number is the file number of the entry data file (see FIGS. 57A to 57C). The foregoing command is continuously transmitted until the communication status indicates the completion.

The facsimile machine 1 is able to respond the command from the PC 3 by way of the interface RS232C during communication with the remote facsimile machine 2. When the status command is issued from the PC 3, the facsimile machine 1 is operated as shown in the flow chart shown in FIG. 59 in accordance with the protocol shown in FIGS. 57A to 57C.

As described above, the communication state of the facsimile machine 1 or the state of the communication completed latest from the PC 3.

Tenth Embodiment

Figure 63:
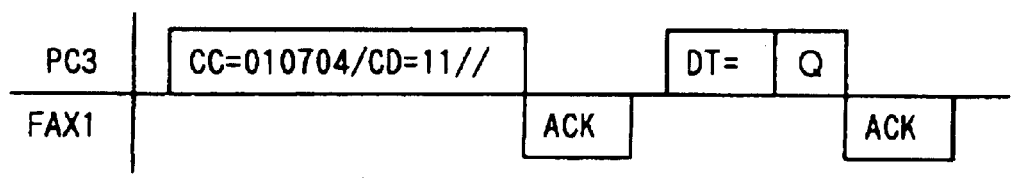
FIG. 63 is a view which illustrates an NSF/DIS command of the remote entry system by way of the interface RS-232C.
Figure 64:
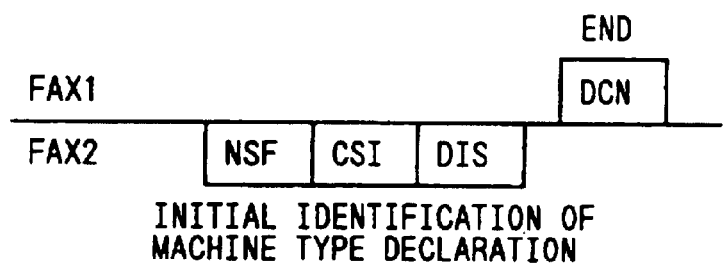
FIG. 64 is a view which illustrates an NSF/DIS reading communication procedure.

The operator inputs the connection number which is the telephone number of the remote facsimile machine by using the host program on the PC 3. At this time, the data is supplied in accordance with the menu image plane exemplified in FIG. 62. When "EXECUTION" is selected from the menu, the PC 3 transmits the NSF/DIS reading command to the facsimile machine 1 by way of the interface RS232C. The procedure is shown in FIG. 63.

The NSF/DIS reading command is in a special form of the file write command shown in FIGS. 42A to 42D arranged such that the file write data code is made to be "NSF/DIS" and only data Q (EOP) is written on the file.

<Procedure of Processing NSF/DIS Reading Command>

Figure 61:
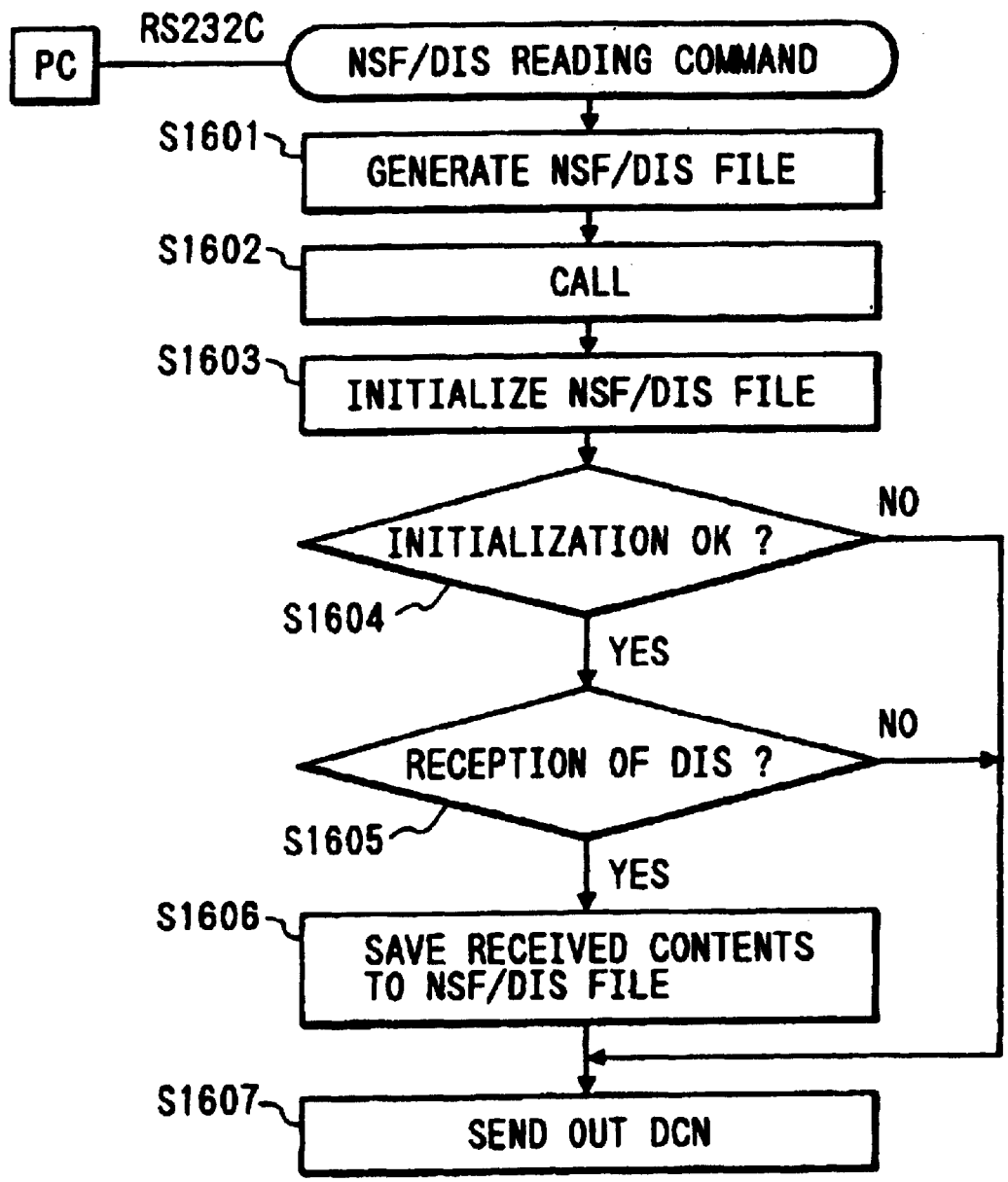
FIG. 61 is an operation flow chart of the facsimile machine 1 according to the embodiment of the remote entry system.

FIG. 61 illustrates the procedure of the process to be performed by the facsimile machine 1 which has received the NSF/DIS reading command.

As shown in FIG. 61, when the facsimile machine 1 has received the NSF/DIS reading command from the PC 3, it obtains, on the image management table, a management record of the file to be made in step S1610 and obtains a memory from the DRAM. The image management record of the data file is made and the file number is given to it (see FIG. 48). The file number is transmitted to the PC 1 as status information by way of the interface RS232C with the status command to be supplied from the PC 1. The foregoing file is called NSF/DIS hereinafter.

In next step S1602, the facsimile machine 1 calls the destined remote facsimile machine 2 in the public circuit network.

In next step S1603, the parameter of the NSF/DIS command is instructed as "CD=11" so that the attribute of the file is made to be NSF/DIS of the RMD. Further, file initialization is performed in such a manner that the page forming the present file is deleted and a new page is formed to examine in step S1604 whether or not the initialization has succeeded.

The remote facsimile machine 2 (destined facsimile machine) which has been called transmits the NSF (Nonstandard Function Declaration), the CSI (Called-Side Identification) and DIS (Digital Identification Signal) indicating the performance of the called side.

Figures 67, 68:
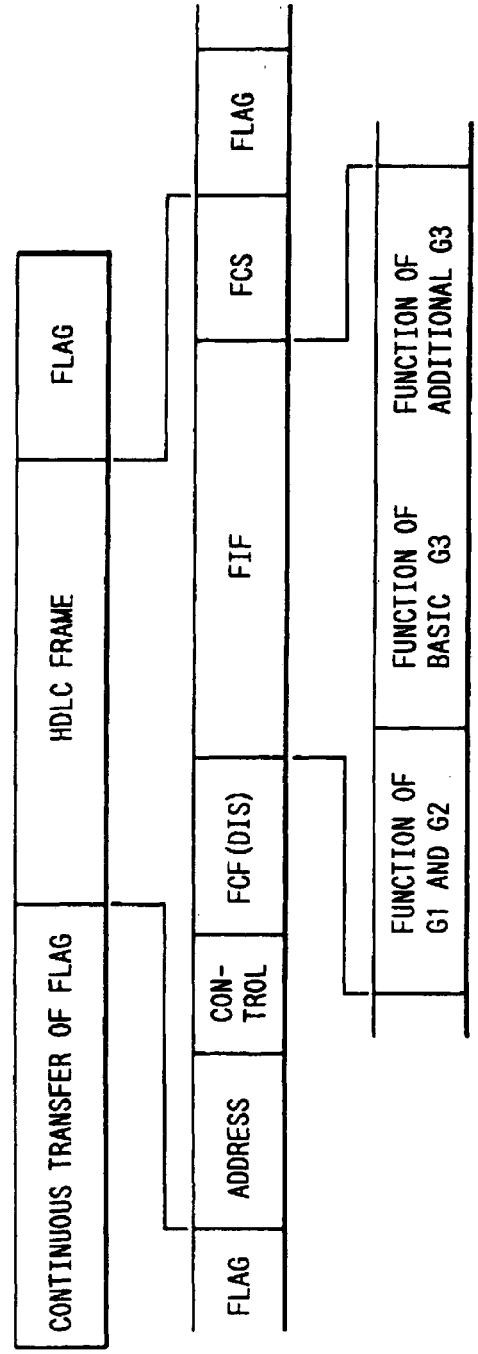
FIG. 67 is a view which illustrates a reading data menu on the PC image plane of the remote entry system.
FIG. 68 is a view which illustrates an HDL frame of a receipt signal.

The communication adapter which has received the foregoing signals, it tests in step S1605 whether or not the received contents are DIS. If the contents are the DIS, the communication adapter, in step S1606, writes the contents on the NSF/DIS file which has been made previously. As an example of this, the HDLC frame of the DIS is shown in FIG. 68. The contents to be written on the file are the FIF in the frame. The foregoing operations are shown in FIG. 65.

Figure 65:
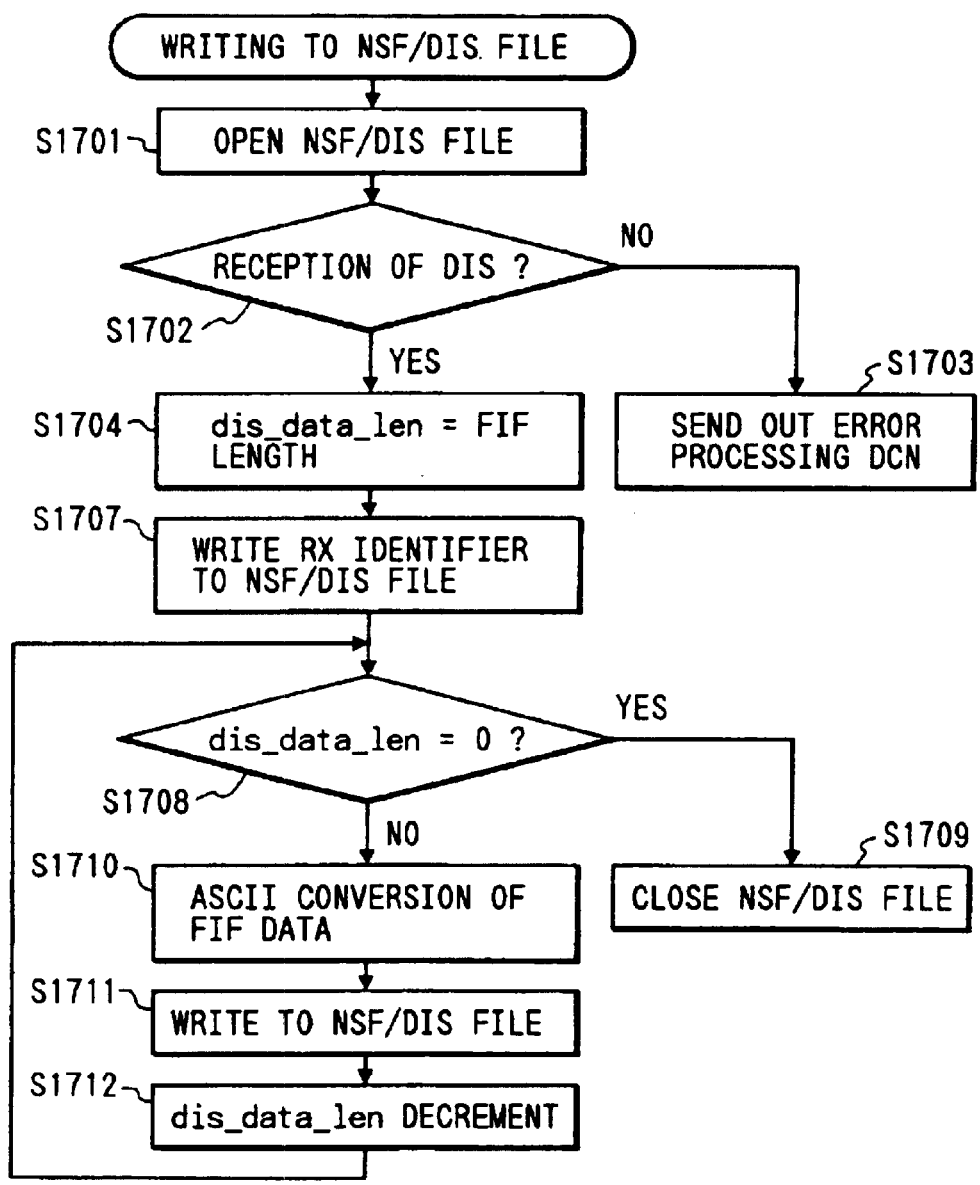
FIG. 65 is a flow chart of an NSF/DIS file writing procedure.

As shown in FIG. 65, the NSF/DIS file is opened (step S1701). Then, a discrimination is made whether or not the received signal is the DIS (step S1702). If the signal is the DIS, the frame length, from which the address of the received frame, the control, FCF and FCS fields are omitted, is calculated (step S1704). If the DIS could not be received, the DCN is transmitted and the communication is completed here (step S1703).

Then, the RX identifier denoting the received data is written on the NSF/DIS file (step S1705). Then, the data of FIF is converted from BCD to ASCII (step S1710). The foregoing operation is performed for the purpose of making a display at the time of the transmission of the NSF/DIS file to the PC 3. The converted contents are written on the NSF/DIS file (step S1711), and dis-data-len is decreased (step S1712) until all FIF data items are written to the file. Then, the NSF/DIS file is closed (step S1709).

As a result of the foregoing procedure, the facsimile machine 1 stores the function read from the remote facsimile machine 2 as the file.

<Reading of NSF/DIS File from PC>

The PC 3 request transmission of the NSF/DIS file to the facsimile machine 1 by way of the interface RS232C. The foregoing request is performed by using the foregoing file read command and by instructing the file number of the NSF/DIS file.

When the file read command is issued from the PC 3, the communication adapter transmits the contents of the NSF/DIS file. The results are shown in the right half portion of FIG. 62. In accordance with the foregoing results, the entry items, entry data or reading data items can be set into the remote facsimile machine. Further, the facsimile function of the destined machine can be recognized.

Eleventh Embodiment

In this embodiment, the description will be made about the procedure in which the logs of the remote entry data reading command are sequentially recorded as is performed in the fifth embodiment together with the process of the NSF/DIS file according to the tenth embodiment.

Figure 66:
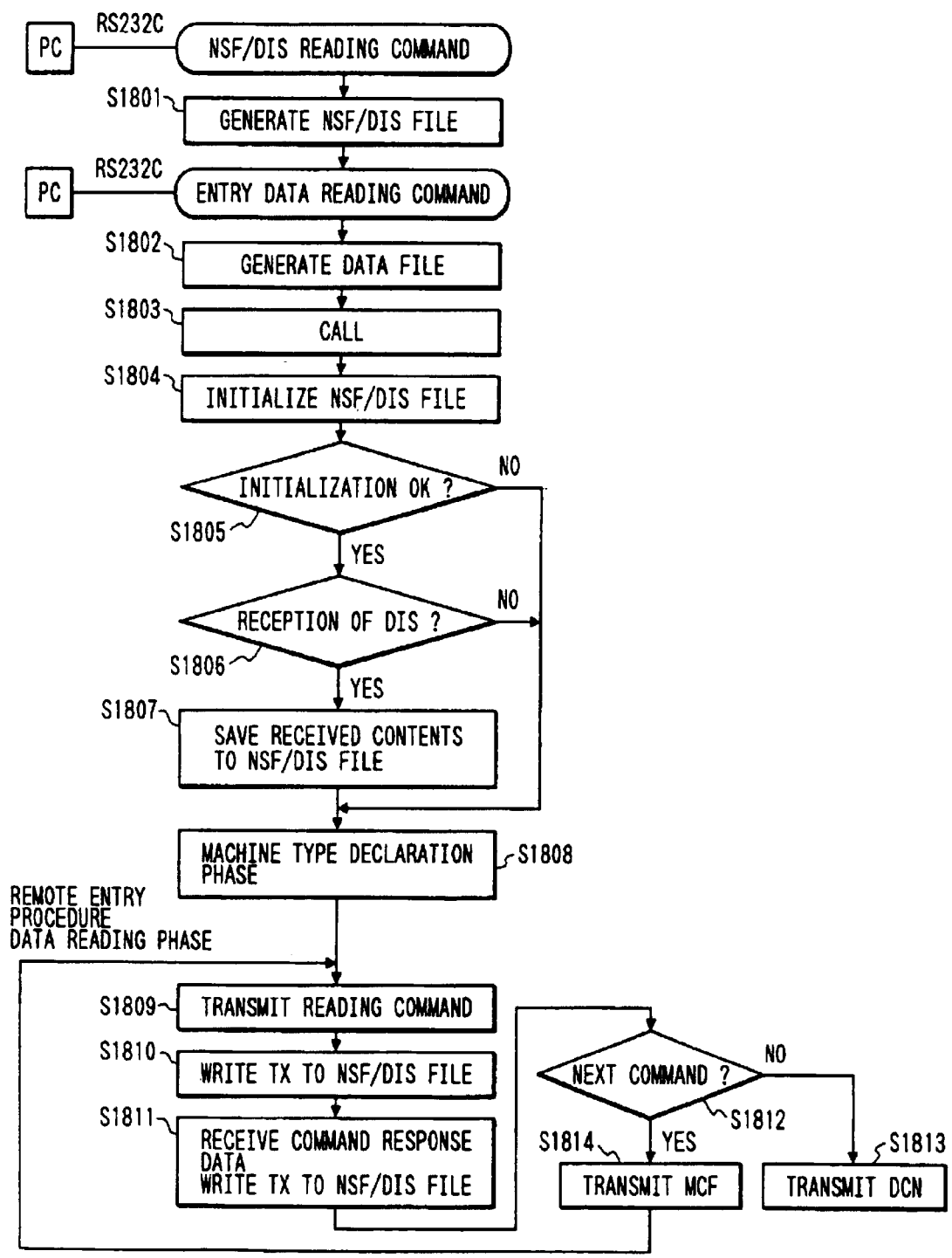
FIG. 66 is an operation flow chart of the facsimile machine 1 of the remote entry system according to an embodiment.

FIG. 66 illustrates the procedure of the operation to be performed by the facsimile machine 1 which performs the NSF/DIS file command and the entry data reading command.

The operator inputs the connection number which is the telephone number of the remote facsimile machine 2 by using the host program on the PC 3 (see FIG. 62). When "EXECUTION" is selected, the PC 3 transmits the NSF/DIS reading command to the facsimile machine 1 by way of the interface RS232C (see FIG. 63). The NSF/DIS reading command is in a special form of the file write command shown in FIGS. 42A to 42D arranged such that the file write data code is made to be "NSF/DIS" and only data Q (EOP) is written on the file.

Further, the operator inputs the entry data items to be read from the remote facsimile machine 2 in accordance with the menu by using the host program on the PC 3 (see FIG. 67) and transmits data to the communication adapter 2 by way of the interface RS232C. The procedure of the foregoing process is shown in FIGS. 42A to 42D.

FIG. 66 illustrates the process to be performed by the facsimile machine 1 from the moment at which it receives the command sent from the PC 3 which has received the two inputs.

As shown in FIG. 66, when the facsimile machine 1 has received the NSF/DIS reading command issued from the PC 3, it opens the NSF/DIS file in step S1801. That is, the management record of the file to be made is obtained on the image management table and obtains a memory from the DRAM. Further, an image management record of the data file is made while giving the file number (see FIG. 48). The file number is transmitted as the status information to the PC 3 by way of the interface RS232C in accordance with the status command to be issued from the PC 3 (see FIGS. 42A to 42D). The foregoing file will be called "NSF/DIS" hereinafter. By instructing the parameter of the reading command to be "CD=11", the attribute of the file is made to be NSF/DIS of the RMD.

When the remote data entry command is issued from the PC 3, the entry data file is made in step S1802, the entry data file is made and data is written in step S1802. When the data transfer has been completed, the data file is closed. The foregoing procedure is arranged similarly to the foregoing description.

In next step S1803, the facsimile machine 1 calls the remote facsimile machine 2 in the public circuit network. In next step S1804, the page which forms the present NSF/DIS file is deleted and a new page is provided so that the file is initialized. In next step S1805, the results of the initialization are examined.

The remote facsimile machine 2, which has been called, transmits the NSF (Non-Standard Function Declaration), the CSI (Called-Side Identification) and DIS (Digital Identification Signal) indicating the performance of the called side.

When the facsimile machine 1 has received the response from the remote facsimile machine 2, it examines in step S1806 whether or not the DIS has been received. If it has been received, the flow proceeds to step S1807 in which the received contents are written on the NSF/DIS file.

After the foregoing writing operation has been completed, the procedure of the machine type declaration phase shown in FIG. 5 is executed in step S1808. The facsimile machine 1 issues the machine type request command, which is the command to read the machine type, and waits for the machine type declaration response. When the machine type request command NSS (Non-Standard Function Declaration) is issued and the NSC (Non-Standard Function Command) of the machine type declaration response has been received, the MCF denoting the completion of the machine type declaration is transmitted. When the machine type declaration phase has been completed, the remote entry procedure is shifted to the data reading phase.

The facsimile machine 1 stores the contents to be transmitted and the receipt signal into the NSF/DIS file while communicating with the remote facsimile machine 2 in steps S1809 to S1811. At this time, the transmission identifier "TX" is added to the contents to be transmitted and the receiving identifier "RX" is added to the receipt signal (see FIG. 18). The foregoing file is not a log file but it is an NSF/DIS file.

In the data reading phase, the facsimile machine 1 receives the NSF, which is the data transfer request command, from the remote facsimile machine 2 and transmits the NSS which is the reading command. The NSS is obtained by converting the reading data into the HDLC frame format. After the NSS has been transmitted, the entry response from the remote facsimile machine 2 is waited for. The response from the remote facsimile machine 2 is the reading data, that is, the NSC.

The facsimile machine 1 responds to the NSC, the response being categorized into an affirmative response and a negative response which respectively are the MCF (Message Confirmation) and the RTN (Retraining Negation). After the response has been transmitted, the NSF, which is the data transfer request from the remote facsimile machine 3, is waited for. After the NSF has been received, a discrimination is made in step S1812 whether or not the reading item is further present. If the reading item is present, the flow proceeds to step S1814 in which the MCF is transmitted. If no reading item is present, the DCN is transmitted and the communication is completed in step S1813.

As a result of the foregoing procedure, the function of the remote facsimile machine and the remote entry data reading log can be stored in the NSF/DIS file.

<Reading of NSF/DIS File>

The PC 3 request the transmission of the NSF/DIS file via the interface RS232C (see FIGS. 43A and 43B). It is the file read command having the contents which are the same as that according to the foregoing embodiment.

That is, when the command from the PC 3 has been received, the facsimile machine 1 transmits the contents of the NSF/DIS file. As a result, the communication function of the remote facsimile machine 2 and the contents of the read remote entry data can be known.

The present invention may be applied to a system consisting of a plurality of units or a sole apparatus. The present invention may, of course, be applied to a structure in which a program is supplied to a system or an apparatus.

Therefore, the hystresis of the data entry performed by the communication can be left. Further, the function of the destined apparatus and the state of the communication can be known from the host computer to which it is connected.

Twelfth Embodiment

Figure 70:
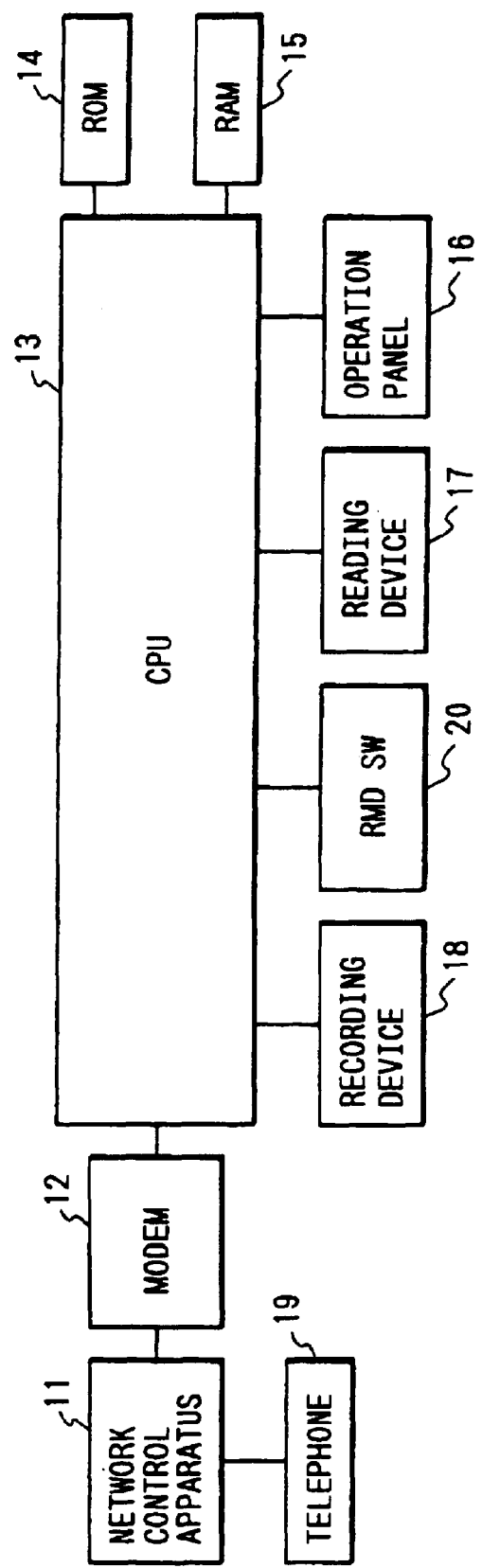
FIG. 70 is a block diagram which illustrates a remote facsimile machine 2.

FIG. 70 is a block diagram which illustrates the structure of the remote facsimile machine 2.

Reference numeral 11 represents a network control apparatus for controlling the public circuit network, 12 represents a modem for modulating and demodulating the digital signal and the analog signal and 13 represents a CPU for controlling the facsimile machine 2. Reference numeral 14 represents a ROM for storing, for example, a program to be executed by the CPU 13, and 15 represents a RAM to be used as a working area or which stores remote entry data, such as shortened telephone number list and a calling side name and the like. Reference numeral 16 represents an operation panel which is operated by an operator, 17 represents a reading apparatus for reading an original document, 18 represents a recording apparatus for printing information on to recording paper, 19 represents a telephone for performing communication, and 20 represents a switch for inhibiting/permitting the entry and reading to and from the RMD.

Figure 71:
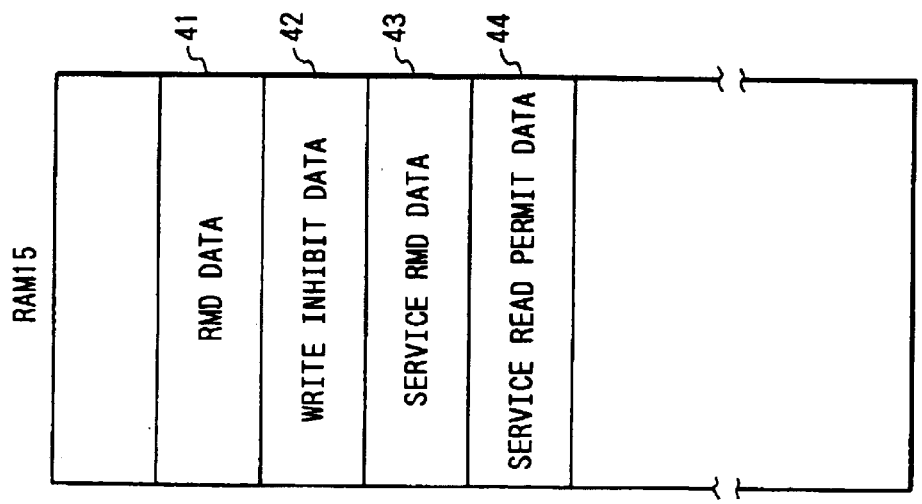
FIG. 71 is a structural view which illustrates a RAM of the remote facsimile machine 2 according to a twelfth embodiment.

The RAM 15 includes regions as shown in FIG. 71, that is, an RMD data region 41 on which a value corresponding to the state of the RMD switch is written, a write inhibited data region 42 on which a value corresponding to the state of the write inhibition switch is written, a service RMD data region 43 on which the value of the service RMD switch is written, and a service reading permission data region 44 on which a value corresponding to the state of the service permission switch is written. Although the foregoing switches may be software switches to be inputted as binary data, mechanical and electrical switches provided for the RMD switch 20 are employed in this embodiment.

With the foregoing structure, the operator executes, for example, the program included in the PC 3 to instruct and input data to be remote entry in the remote facsimile machine or data allowed to enter the remote facsimile machine 2. In accordance with the input thus-made, the PC 3 sends supplied data and a command such as data entry about the remote entry or a command to read data to be facsimile machine 1 by way of the interface RS323C.

The facsimile machine 1 which has received the foregoing commands, makes a remote entry file in accordance with the supplied data, and transmits data filed in the remote facsimile machine 2 in accordance with a predetermined control procedure. The predetermined control procedure according to this embodiment is arranged to be a binary procedure. That is, a phase is performed in which the functions of the destined machines are changed, and then a phase is commenced in which data to be allowed to enter or data to be read is sent.

The transmission control procedure between the facsimile machine 1 and the facsimile machine 2 in each phase is shown in FIGS. 5 to 7.

Figure 72:
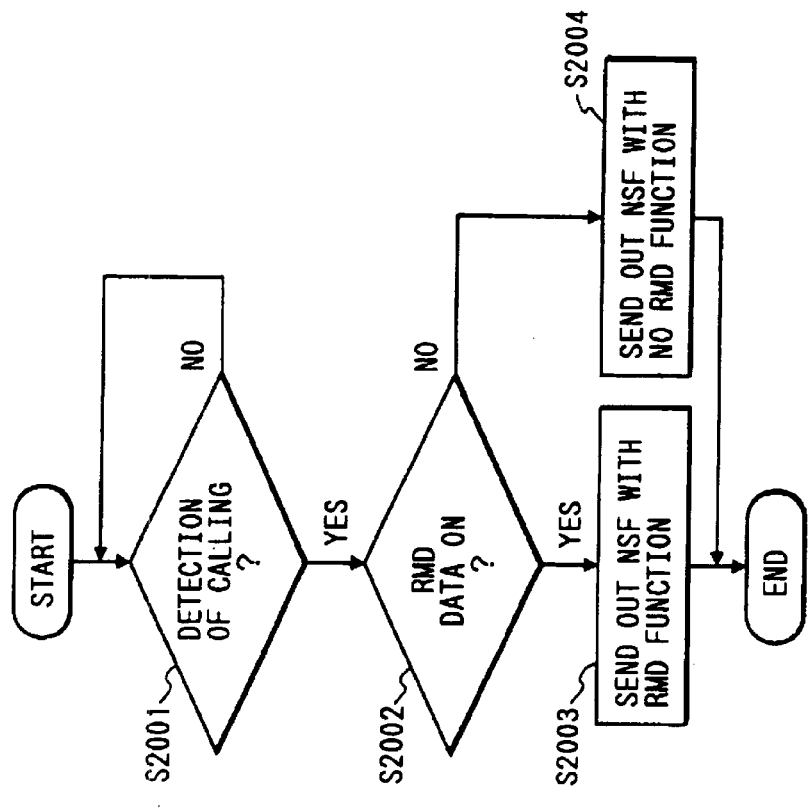
FIG. 72 is an operation flow chart of the remote facsimile machine 2 according to the twelfth embodiment.

In the machine type declaration phase shown in FIG. 5, the remote facsimile machine 2 called from the facsimile machine 1 declares the machine type in accordance with the flow chart shown in FIG. 72. The flow chart shown in FIG. 72 illustrates the procedure of the process to be performed by the facsimile machine 2 from the declaration moment, that is, that performed by the CPU 13.

In a standby state, the state of the RMD switch 20 is observed at predetermined interval. If the RMD switch 20 is switched on, "1" (also called "ON") is written on the RMD data 41 of the RAM 15. If it is switched off, "0" (also called "OFF") is written on the same.

FIG. 72 illustrates a state from the foregoing state. Referring to FIG. 72, an examination is continued in step S201 that the call is received. If the call is received, the RMD data 41 of the memory 15 is tested in step S202.

If the RMD data is turned on (1), the flow proceeds to step S203 in which the bit denoting that the RMD function is possessed is made to be "0" and a machine type declaration initial identification is transmitted.

Thus, the machine type declaration initial identification is sent to the facsimile machine 1. The facsimile machine 1 discrimination whether or not the remote facsimile machine 2 has the RMD function.

If the bit denoting that the RMD function is possessed is "1", the data entry/request phase is commenced.

If the bit denoting that the RMD function is possessed is "0", the facsimile machine 1 sends the DCN (disconnection completion signal) to the remote facsimile machine 2 to disconnect the communication.

As a result of the foregoing procedure, the remote facsimile machine 2 is able to prevent the remote data entry from the center by operating the switch as well as its original function. Therefore, undesirable data entry can be prevented.

Another method may be available that the data entry or rewriting is inhibited in place of notifying that the facsimile machine 1 has not the remote entry function. If writing is inhibited, the entry data can be read. Therefore, a write inhibition switch provided for the switch 20 is used in addition to the RMD switch.

Figure 73:
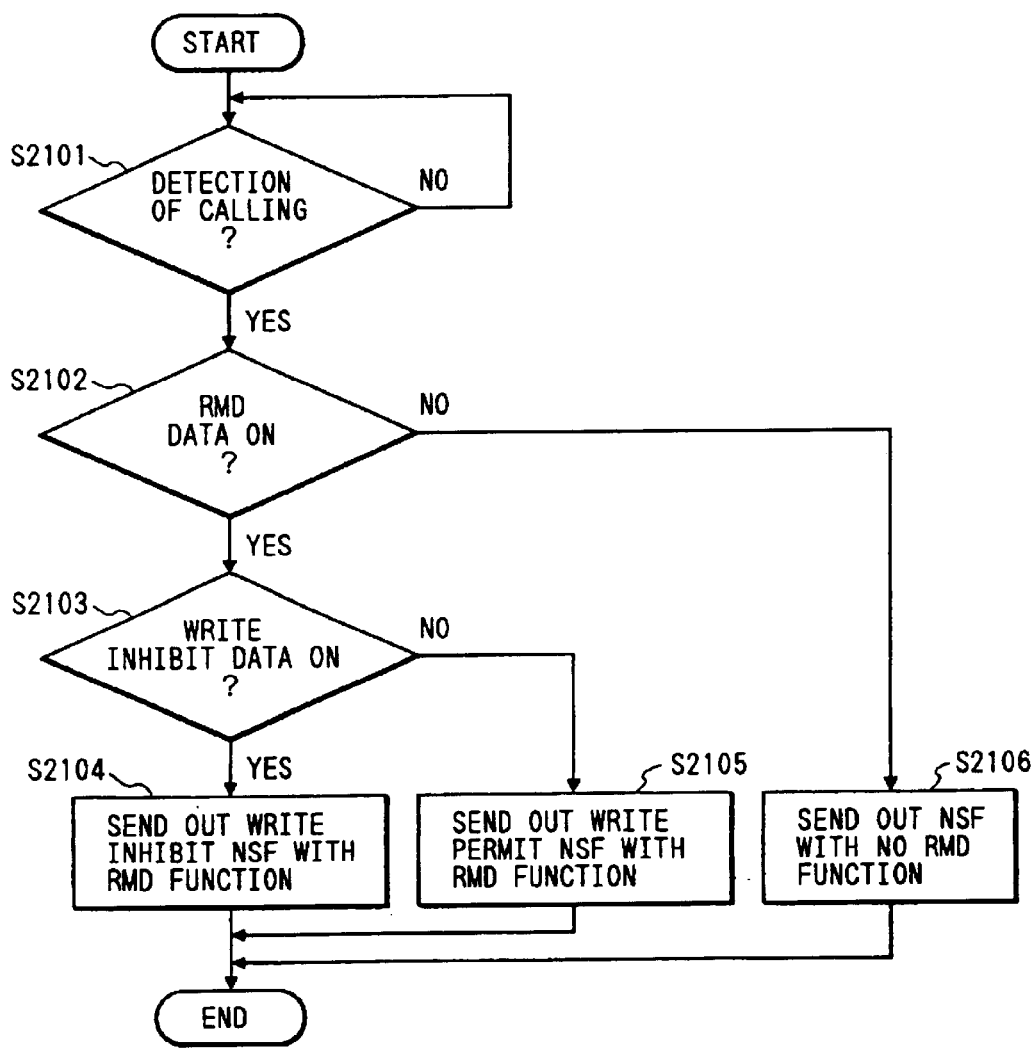
FIG. 73 is an operation flow chart of the remote facsimile machine 2 according to the twelfth embodiment.

The facsimile machine 2 observes the states of the RMD switch and the write inhibition switch at predetermined intervals in the standby state. If the switches are switched on, "1" is written on the RMD data 41 and the write inhibition data 42 in the RAM 15. If the switches are switched off, "0" is written on the same. The flow chart shown in FIG. 73 illustrates the process to be performed by the facsimile machine 2 from the foregoing moment, that is, the process to be performed by the CPU 13 which controls the facsimile machine 2.

In step S2101, a call from the facsimile machine 1 is examined. If call receipt from a telephone circuit or the like has been detected, the flow proceeds to step S2102 in which the RMD data 41 is tested. If the RMD data is turned on (1), the flow proceeds to step S2103 in which the write inhibition data 42 is tested.

If the write inhibition data is turned on (1) in step S2103, the bit of the NSF denoting that the RMD function is possessed shown in FIG. 5 is made to be "1" and the write inhibition bit is made to be "1" to send the machine type declaration initial identification in step S2104.

If the write inhibition data is turned off (0), the bit of the NSF denoting that the RMD function is possessed shown in FIG. 5 is made to be "1" and the write inhibition bit is made to be "0" to send the machine type declaration initial identification.

If the RMD data is turned off (1) in step S2102, the bit of the NSF denoting that the RMD function is possessed is made to be "0" to send the machine type declaration initial identification in step S2106.

As described above, the remote facsimile machine 2 is able to inhibit data writing in place of the arrangement that the use of the remote entry function is not allowed the center side. In this state, the center side cannot rewrite the data but is able to know the value of the entry data.

In the system according to this embodiment, an arrangement may be employed in which the notification from the center, that is, the facsimile machine 1, of a fact that the remote entry function is not possessed is not permitted for usual users at the remote facsimile machine 2, but is limited to a portion of service persons who maintain the apparatus. Further, the usual users are inhibited to enter or rewrite data. If writing is inhibited, entry data can be read. Accordingly, the service RMD switch allocated to the switch 20 is used in place of the foregoing RMD switch. Since use of the foregoing switch is inhibited for the usual user, it must be displaced, for example, in portion of the apparatus that cannot be usually operated.

Figure 74:
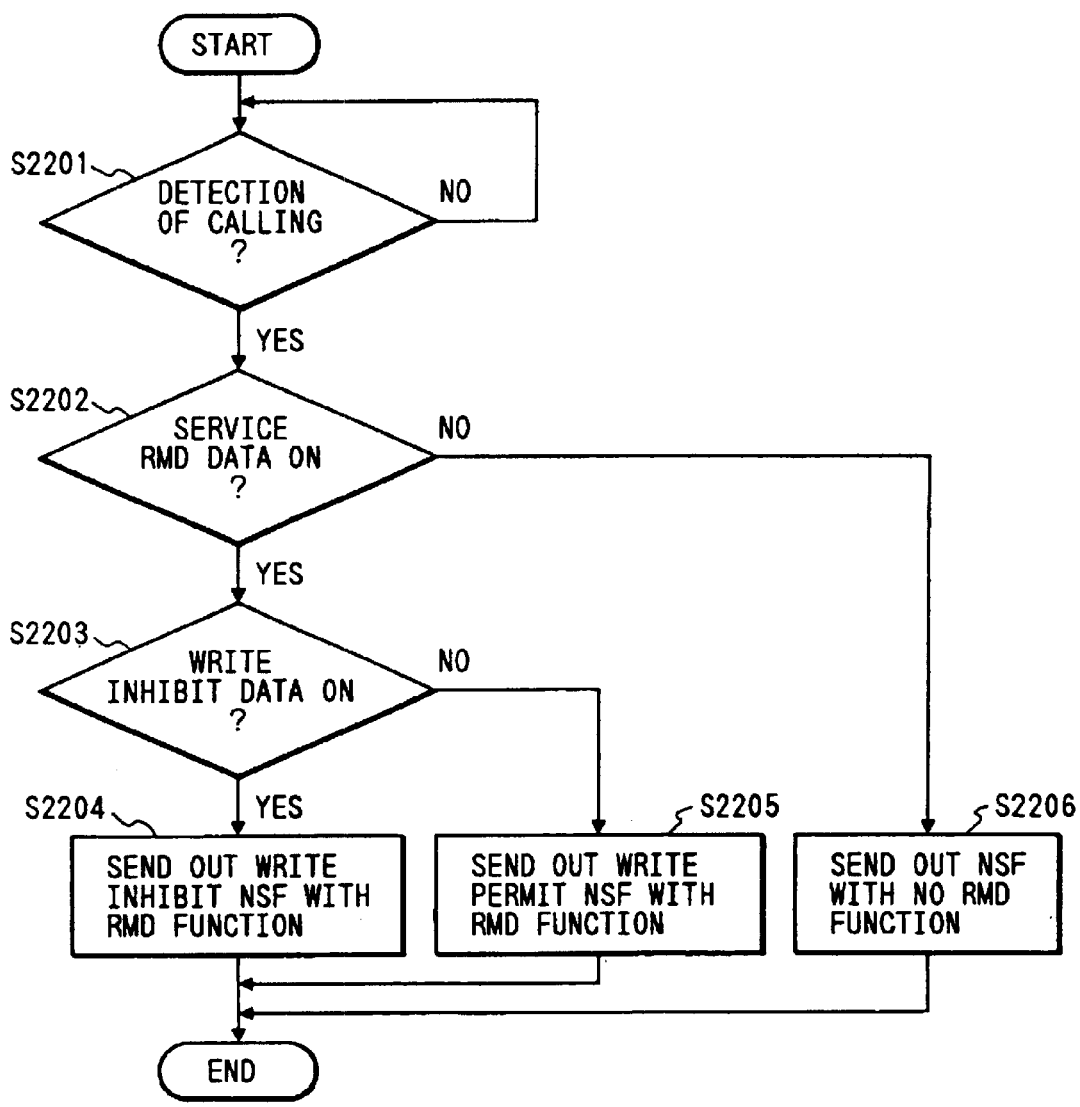
FIG. 74 is an operation flow chart of the remote facsimile machine 2 according to the twelfth embodiment.

The facsimile machine 2 looks the states of the RMD switch and the write inhibition switch at predetermined intervals. If the switches are switched on, "1" is written on the RMD data 41 and the write inhibition data 42 in the RAM 15. If the switches are switched off, "0" is written on the same. FIG. 74 is a flow chart which illustrates the procedure of the operations to be performed by the facsimile machine 2, that is, the CPU 13 which controls the facsimile machine 2 from the foregoing moment.

In step S2201, a call from the facsimile machine 1 is examined. If a call from a telephone circuit or the like is detected, the flow proceeds to step S2202 in which the service RMD data 43 is tested. If the service RMD data is turned on (1), the flow proceeds to step S2203 in which the write inhibition data 42 is tested.

If the write inhibition data is turned on (1) in step S2203, the bit of the NSF denoting that the RMD function is possessed shown in FIG. 5 is made to be "1" and the write inhibition bit is made to be "1" to send the machine type declaration initial identification in step S2204.

If the write inhibition data is turned off (0), the bit of the NSF denoting that the RMD function is possessed shown in FIG. 5 is made to be "1" and the write inhibition bit is made to be "0" to send the machine type declaration initial identification.

If the service RMD data is turned off (1) in step S2202, the bit of the NSF denoting that the RMD function is possessed is made to be "0" to send the machine type declaration initial identification in step S2206.

As described above, the remote facsimile machine 2 is able to inhibit data writing in place of the arrangement that the use of the remote entry function is not allowed the center side. In this state, the center side cannot rewrite the data but is able to know the value of the entry data.

The fact whether or not the remote entry function is possessed is not determined by the user of the remote facsimile machine 2. It is determined at the time of, for example, installing the remote facsimile machine 2 while inhibiting the latter change.

As the RMD switch, a service RMD switch which cannot be used for a usual user and a switch for the usual user are disposed, and the fact whether or not the RMD entry function is possessed is determined by the AND.

Figure 75:
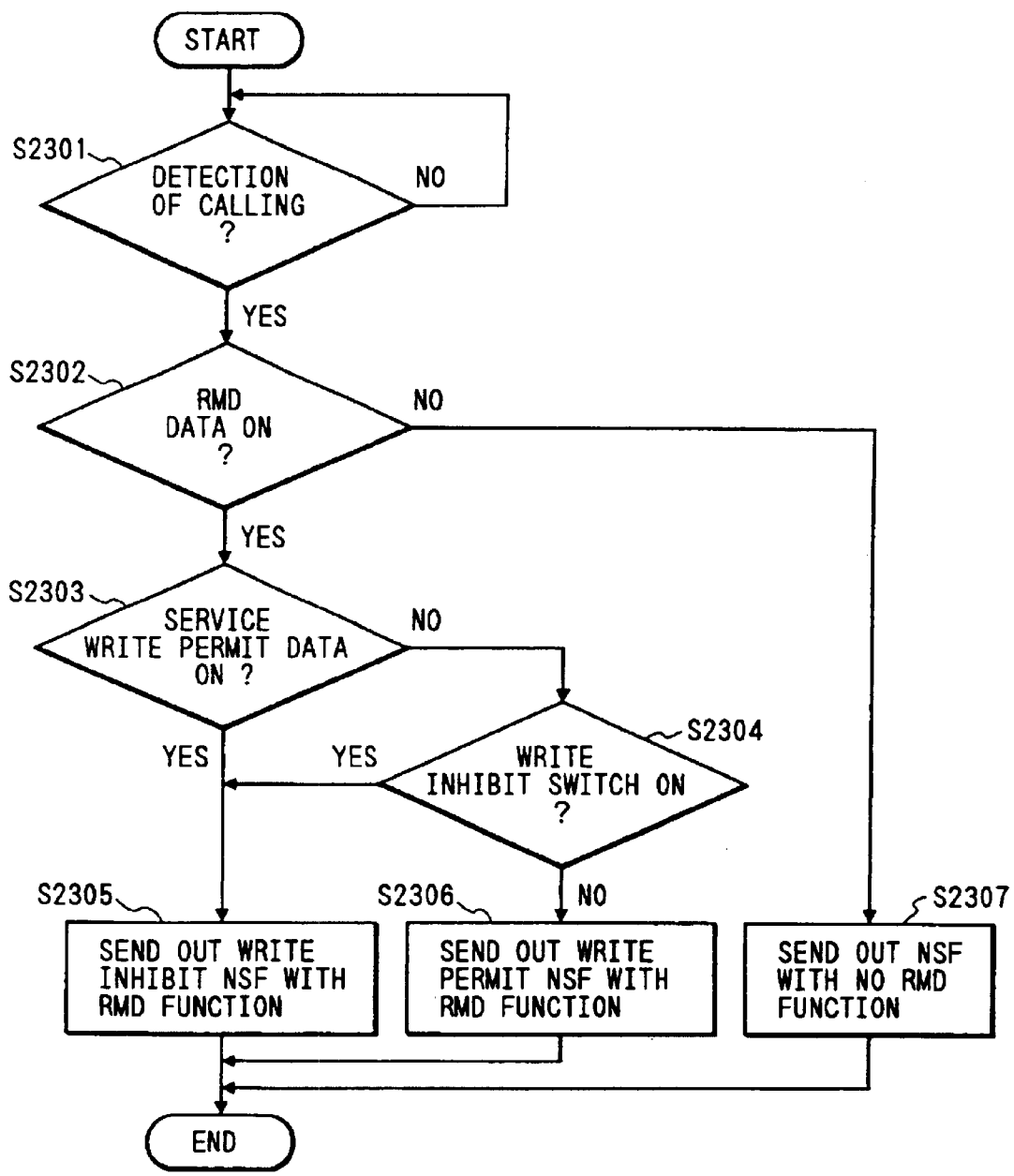
FIG. 75 is an operation flow chart of the remote facsimile machine 2 according to the twelfth embodiment.

The system according to this embodiment may be arranged in such a manner that a service reading permission switch which cannot be operated by a usual user is used in addition to the RMD switch and the write inhibition switch. Since the service reading permission switch cannot be used for a usual user, it must be disposed, for example, in the apparatus so as not to be operated usually. FIG. 75 is a flow chart which illustrates the process to be performed by the CPU 13 at the time of transmitting the machine type declaration initial identification.

In a standby state, the states of the RMD switch, the write inhibition switch and the service reading permission switch are looked at predetermined intervals. If the switches are switched on, "1" is written on the RMD data 41, the write inhibition data 42 and the service reading permission data 44 in the RAM 40. If the switches are switched off, "0" is written on the same. The flow chart starts the foregoing moment.

In step S2301, a call from the telephone circuit or the like is examined. If a call is detected, the flow proceeds to step S2302 in which a reference to the RMD data 41 is made. If the RMD switch is switched on (1), the flow proceeds to step S2303.

In step S2303, the service reading permission data 44 is tested. If it is turned on (1), the bit of the NSF shown in FIG. 5 and denoting that the RMD function is possessed is made to be "1" and the write inhibition bit is made to be "1" to send the machine type declaration initial identification in step S2305.

If the service permission data is turned off (0), the write inhibition data 42 is tested in step S2304. If the write inhibition data is turned on (1), the flow proceeds to step S2305.

If the write inhibition data 42 is turned off (0), the bit of the NSF shown in FIG. 5 and denoting the RMD function is possessed is made to be "1" and the write inhibition bit is made to be "0" to send the machine type declaration initial identification in step S2306.

If a discrimination is made in step S2302 that the RMD data is turned off (0), the bit of the NSF shown in FIG. 5 and denoting the RMD function is possessed is made to be "0" to send the machine type declaration initial identification in step S607.

As described above, the remote facsimile machine 2 sends the machine type declaration initial setting to the facsimile machine 1 in accordance with setting of the switch. The facsiimle machine 1, which has received the setting, makes a reference to the RMD function bit and that to the write inhibition bit. In accordance with the setting, the flow proceeds to the next phase so that data entry or data reading is performed. As a result, the remote facsimile machine is able to inhibit the usual user to write data by the remote data entry. Therefore, the entry data can be protected.

Although the RMD switch is made of metal in this embodiment, the RMD switch may be a software switch by means of a program or a operator's console input. In this case, data of the RMD switch is written on the data regions 41 to 44 for reading the value of each switch whenever the data of the RMD switch is caused to enter.

Thirteenth Embodiment

The illustrated PC 3 is called a RMD personal computer which edits and manages entry data to the facsimile machine 2 such as the input, edition and save of the remote data and which performs data communication with the center facsimile machine 1. The remote entry system is formed by the RMD personal computer in such a manner that the system comprises a host program (called RMDHOST.EXE) 213, machine type and image plane data bases (DB) 211 and 212, a file 214 such as a reservation file, and a program (RSHND) 215 for establishing the connection with peripheral units, such as a CRT and a printer and the like, and the communication adapter 2 by means of the interface RS232C.

The host program 213 is executed to support:
1. Data input by an operator;
2. Data transmission and receipt to and from the center facsimile machine;
3. Display on a CRT (the menu image plane is formed by the image plane DB);
4. Printer output;
5. Reservation and reading of entry data (access to the machine type data base 211 is made); and
6. Edition of entry data In this system, a plurality of the remote facsimile machines 2 are disposed each having peculiar data input format and data form. Therefore, the remote entry system must be supported with respect to the type of the facsimile machine which is expected to be developed in the future by managing the input form and the data form of the facsimile machine of the system by the data base. In accordance with information obtainable from the data base, the entry operation and entry data are checked to form a remote entry system enabling the machine type of the facsimile machine to be discharged.

The data base is categorized by an image plane data base 212 for managing the image plane structure that does not depend upon the machine type and a machine type data base 211 that manages the peculiar data for each machine type. The structure of the machine type data base is shown in FIGS. 77 to 79 and that of the image plane data base is shown in FIG. 80.

Figure 77:
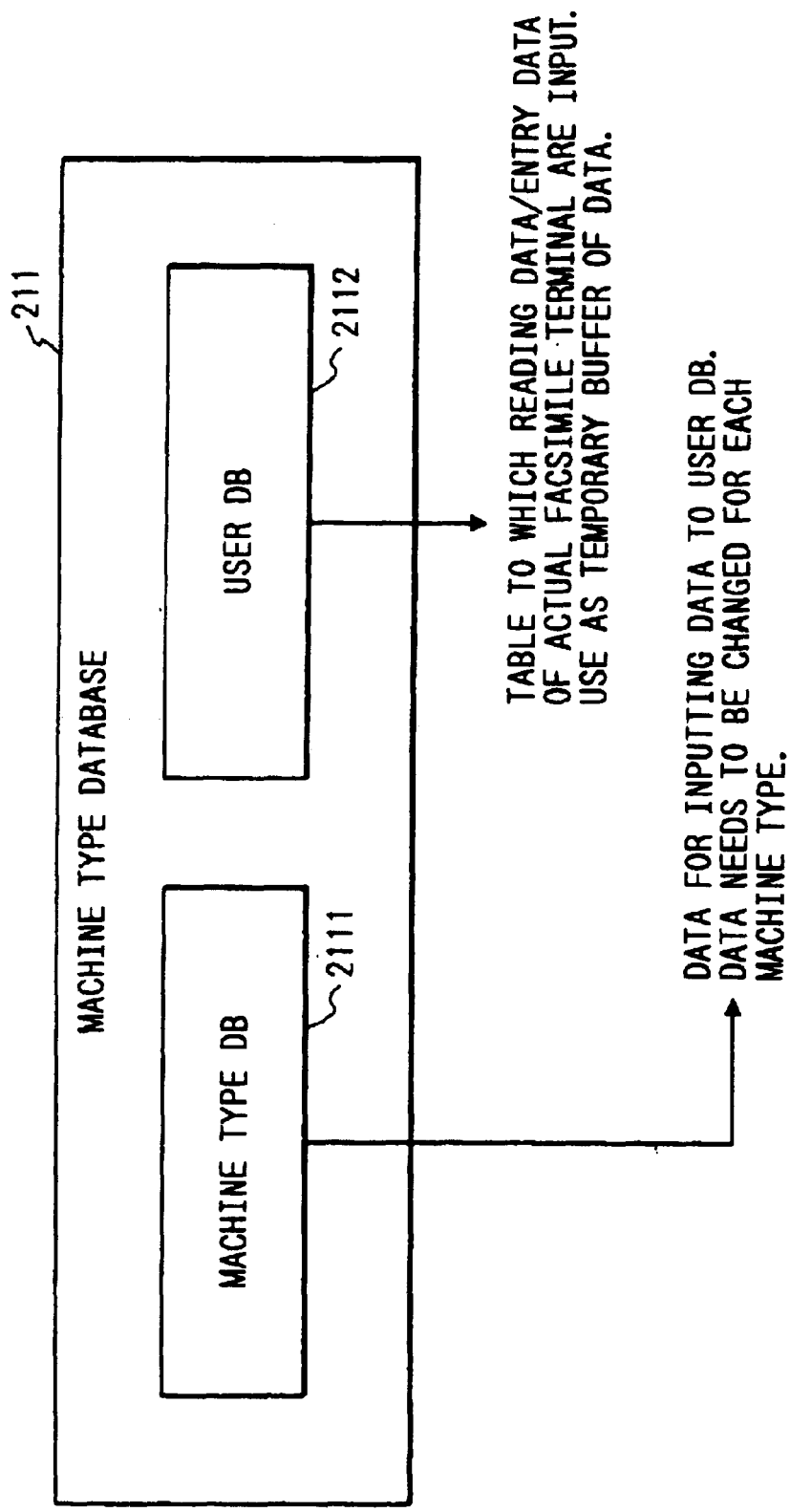
FIG. 77 is a structural view which illustrates a machine type data base (a machine type DB and a user DB)

The machine type data base (hereinafter called a "DB") 211 is categorized to a machine type DB 2111 and a user DB 2112 as shown in FIG. 77. The machine type DB 2111 has data for causing the user DB 2112 to input data. The user DB 2112 is composed of a plurality of tables each of which stores entry/reading data of the actual facsimile machines, the user DB 2112 being used as a temporary buffer.

This system has a function for setting the "input level" at the time of the data entry and adjusting the entry items in accordance with the input level. Therefore, data is set into the machine type DB to correspond to each "input level" at the time of entering/changing data. The contents of the machine type DB are as shown in FIG. 78 such that the menu image plane making data, input parameters and messages are set. The user DB is, as shown in FIG. 79, composed of tables for storing data about each entry item.

The image plane DB, as shown in FIGS. 8A to 8C manages the structure of the image plane menu regardless of the machine type, the input parameters, and the message outputs.

<Remote Data Entry (Remote Data Registry)>

Figure 81:
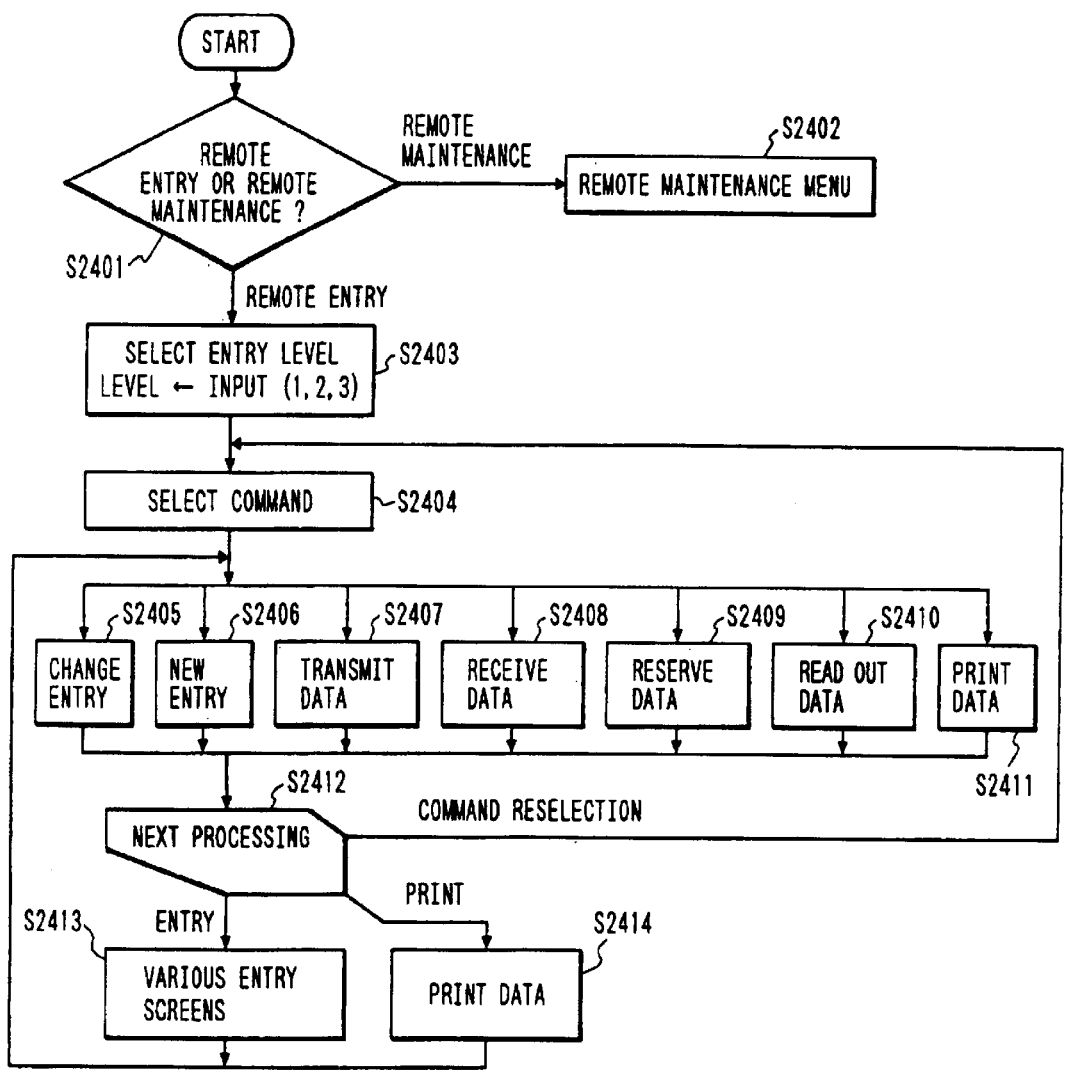
FIG. 81 is a flow chart which illustrates the procedure of the PC at the time of the remote entry.

In order to execute the remote entry, the PC 3 commences the host program (RDMHOST.EXE). As a result, the menu image plane is displayed in accordance with the procedure shown in FIG. 81.

When the host program is commenced, a remote entry or remote maintenance mode selection (see FIG. 82) image plane is first displayed in step S2401. Referring to FIG. 82, a title line 181 is displayed at the leading portion of the menu image plane without exception. When the remote entry is selected from the foregoing image plane by the operator, the flow proceeds to step S2403 in which the entry level selection menu for limiting the entry is displayed. The menu image plane is formed as shown in FIG. 83 such that the operator selects any one of levels 1, 2 and 3.

The entry level is categorized into the following three levels:

Level 1: General entry user data (polling ID excluded), name of calling side, one touch/shortened dial Level 2: General entry+additional entry user data (polling ID excluded), name of calling side, one touch/shortened dial, group dial, F-network dial, mail post, confidence box, relay group and user software SW Level 3: General entry+additional entry+service data entry user data, name of calling side, one touch/shortened dial, group dial, F-network dial, mail post, confidence box, relay group and user software SW Although the entry level is limited in item units in this embodiment, the polling ID of the user data can be caused to enter from the level 3. Further, entry of the detailed parameter, such as the transmission rate of the one touch/shortened dial and the overseas communication mode can be caused to enter from the level 2.

When the entry level is selected, the flow proceeds to step S2404 in which the command menu image plane (see FIGS. 84 and 85) for the remote entry is displayed. Since the machine type and name of the remote facsimile machine cannot be known immediate after the host program has been commenced, only three items, that is, the novel entry, the data receipt and the data reading can be selected from the command menu to be displayed at the foregoing moment as shown in FIG. 84. By selecting the machine type and the name of the facsimile machine at the time of the novel entry or the like, an image plane shown in FIG. 85 is displayed.

When the change entry is selected from the command menu during the display of the menu in step S2404, the flow proceeds to step S2405 in which the entry menu image planes shown in FIGS. 86, 87 and 88 displayed to correspond to the entry levels. Information for realizing the foregoing display is present in menu image plane making information (see FIG. 78) in the machine type DB 2111. Also information for shifting the entry menu to the entry process of each item or the command menu is also stored in the same portion. In step S2412, a process to be performed after any one of steps S2405 to S2411 branched in accordance with the result of the selection made in step S2404 has been performed. If the flow proceeds to step S2413, a process loop is formed in steps S2405 to step S2412. In this case, a process is selected from steps S2405 to S2411 in accordance with the command made in the immediately before step S2404.

When the entry of the one touch/shortened dial entry is selected from the entry menu by the operator, an entry menu image plane as shown in FIG. 89 or FIG. 90 is displayed in step 2413 and the input of entry data is waited for. The entry items are different among the levels 1, 2 and 3. FIG. 29 illustrates the menu image plane for the level 1, and FIG. 90 illustrates that for the level 2. Information for making the entry image plane is stored in the machine type DB (see FIG. 78). When the input has been completed, the menu image plane is again displayed to cause the input to be performed.

The process immediately after step S2404 to step S2413 are repeated until the operator completes the input of the needed entry data. When the entry operation has been completed by the operator, the flow returns to step S2404 in which the command selection menu image plane is displayed to wait for the input. The operator is able to select data printing if necessary during the repetition of the data input operations. In this case, data is printed out in step S2414.

If data transmission is selected from the command selection image plane shown in FIG. 85 in a state where the command menu is restored, entry data is sent to the facsimile machine 1 via the interface RS232C. The procedure of the communication to be performed between the facsimile machine 1 and the facsimile machine 2 is the same as that according to the first embodiment. Thus, the remote entry operation is completed. The entry data is transmitted while being formed into the command and data of each entry item. An example of the foregoing structure is shown in FIG. 91. Each command has an entry level set thereto which corresponds to the entry level caused to enter the data base. As shown in FIG. 91, command of the one touch/shortened dial number is "DI", and data "01" input to the command is continued to be formed into data "DT01" at the time of the transmission.

As described above, the remote entry system according to this embodiment enables the entry level to be selected to correspond to information which is intended for the operator who performs the data entry operation to enter. As a result, the data entry operation can be performed while limiting the same. As a result, an accident that data which must be maintained is erroneously rewritten can be prevented.

<Remote Data Reading>

Further, the apparatus according to this embodiment is able to limit the subject data at the time of reading data from the remote facsimile machine 2 depending upon the level. Also the foregoing process is realized by the PC 3 to execute the host program 213. The foregoing fact will be described with reference to FIG. 81. The process from step S2401 to S2404 is the same as that of the data entry operation. The description will be made from the moment at which the data receipt is selected from the command menu in step S2404.

When the data receipt is selected from the menu shown in FIG. 84 or FIG. 85, the flow proceeds to step S2410. When the machine type is instructed and the connection number is supplied, a reading command corresponding to the entry level is sent to the center facsimile machine 1. An example of the command is shown in FIG. 93. The command shown in FIG. 93 is sent in accordance with the entry level. If the level of each command is lower than the entry level, the reading command is sent.

When the command is sent from the PC 3, communication is made with the remote facsimile machine 2 by way of the center facsimile machine 1 and the entry data is read, the PC 3 receives the reading data accumulated in the center facsimile machine 1, the PC 3 accumulating the data in the machine type data base.

As described above, the reading data can be limited depending upon the level at the time of reading the remote data. As a result, excessive data reading from the facsimile machine 2 by the operator of the PC 3 can be prevented.

A modification of the thirteenth embodiment will now be described.

Figure 76:
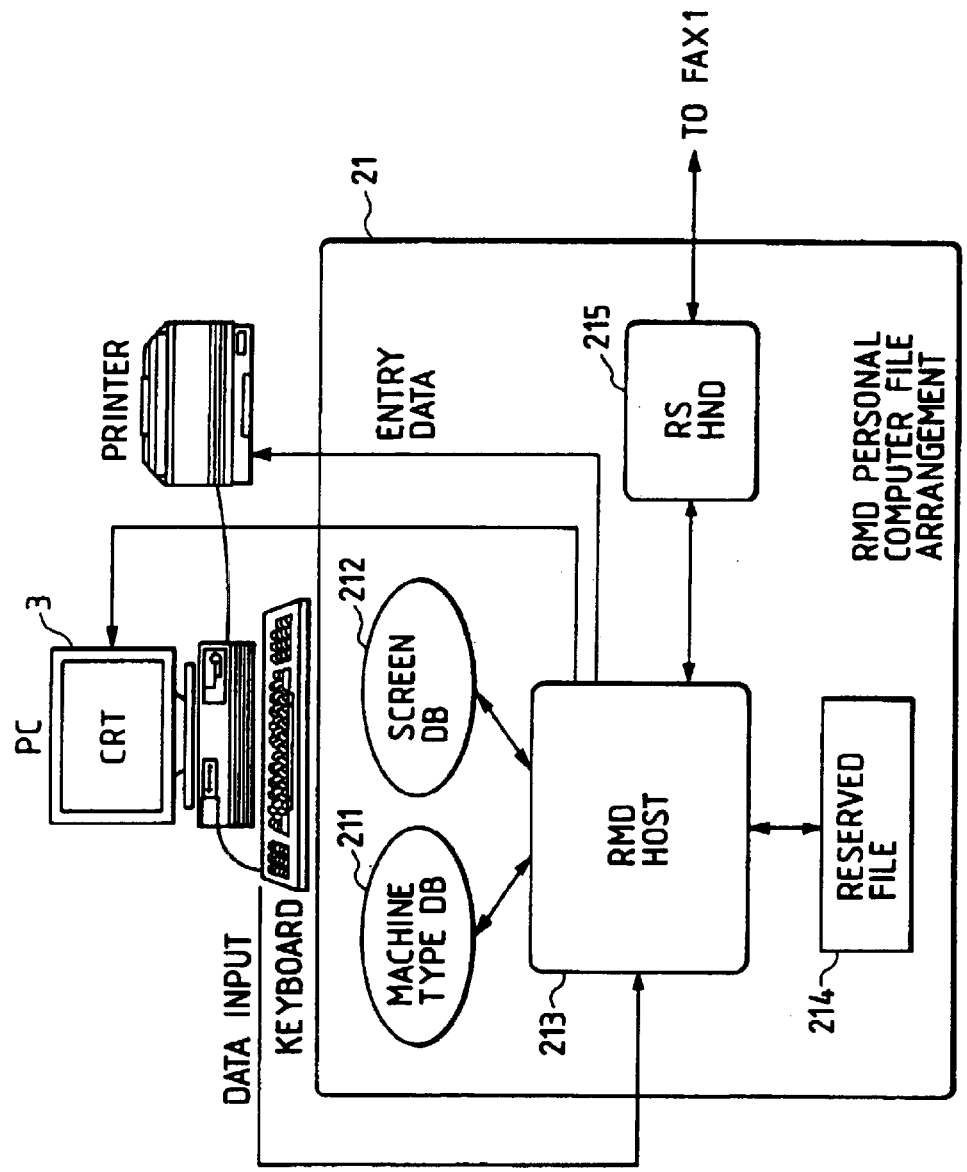
FIG. 76 is a view which illustrates the file structure and peripheral units of a personal computer according to a thirteenth embodiment.

1. The host program (RMDHOST.EXE) shown in FIG. 76 is commenced on the PC 3 and proceeds to an entry level selection.
2. Each entry level is inputted while displaying an image plane will which the input of a pass word is urged at the time of the level input.
3. If the supplied pass work is different from the previously set pass word, proceeding is inhibited.
4. If the pass word is correct, proceeding to the next process is permitted.
5. The process after the shift to the next process is the same as that according to the thirteenth embodiment.

Figure 95:
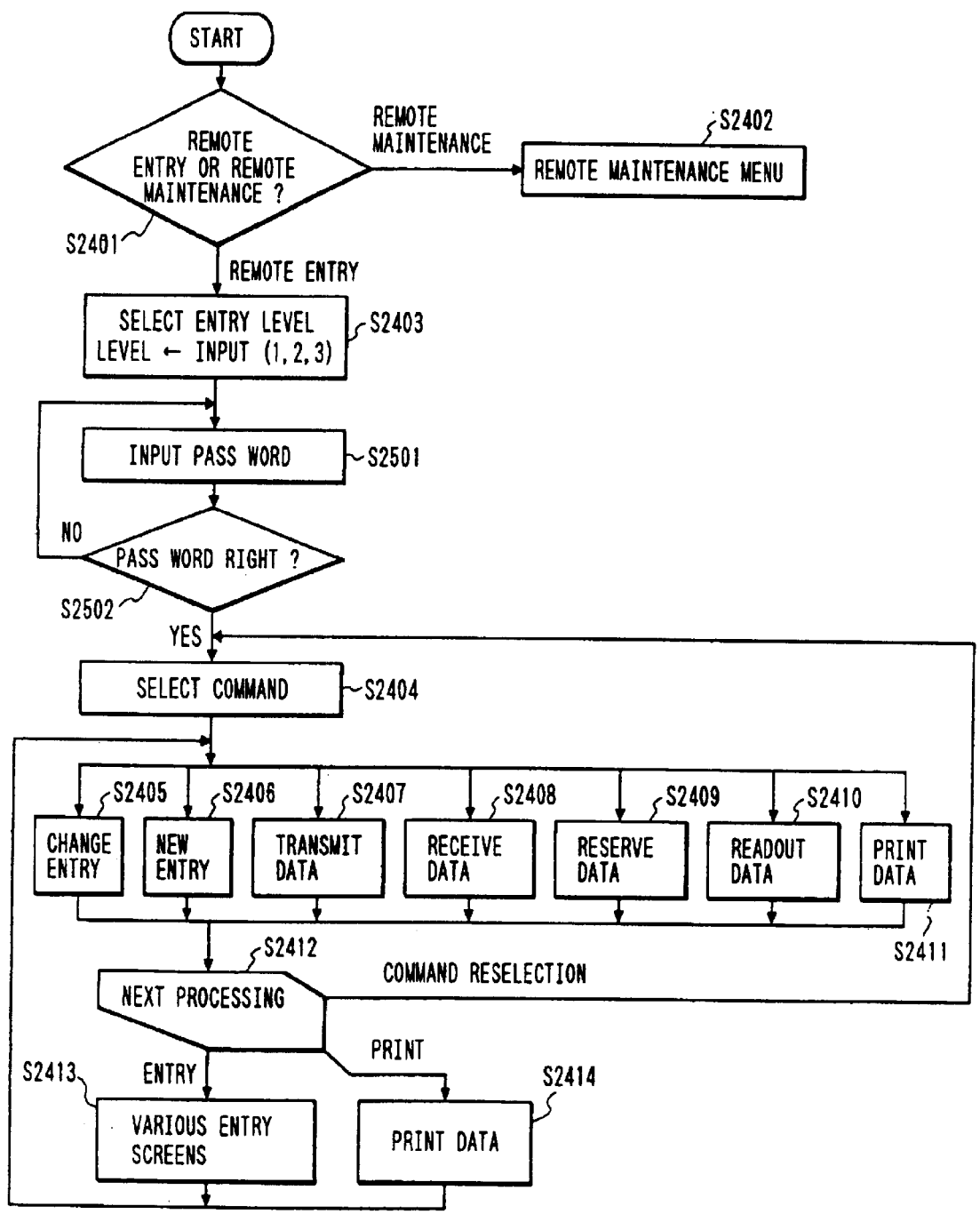
FIG. 95 is a flow chart of process of the PC to be performed at the time of the remote entry.
Figure 96:
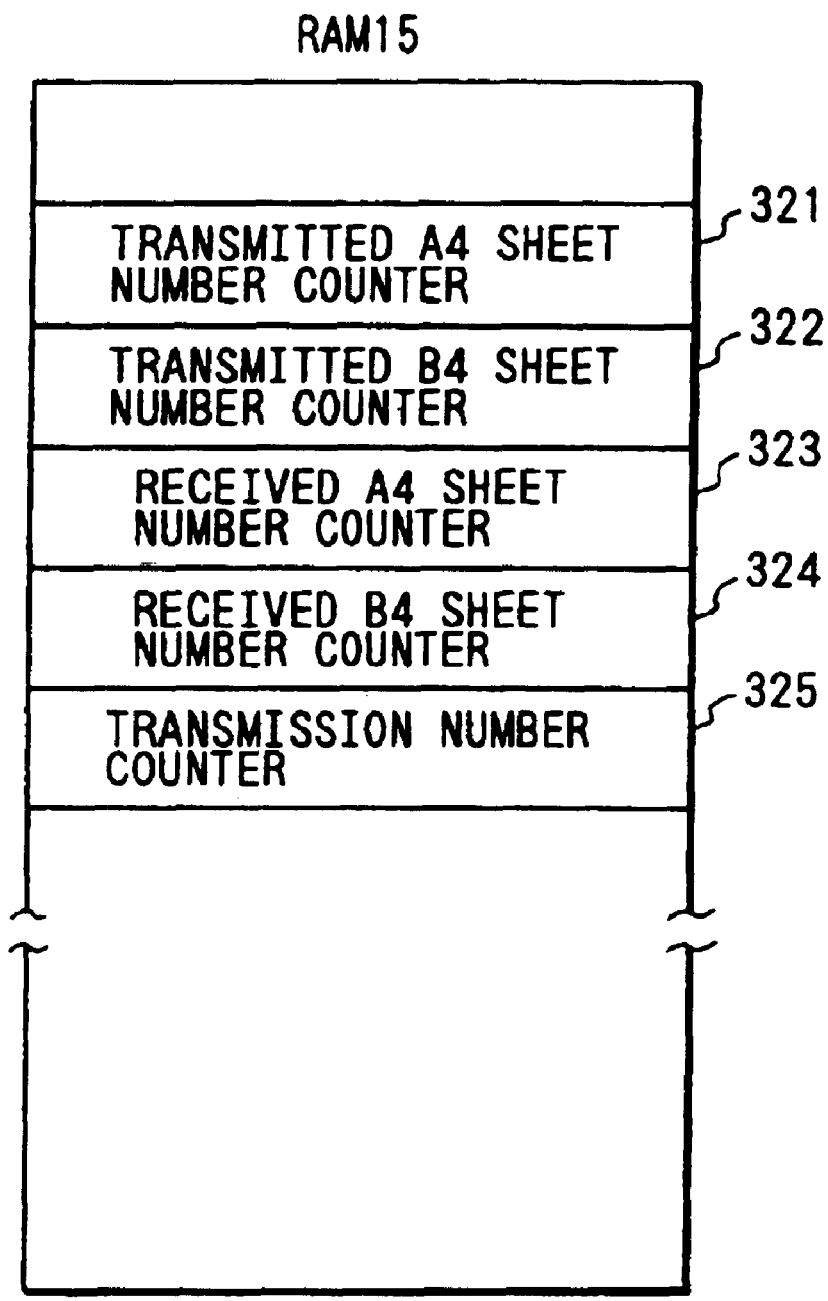
FIG. 96 is a view which illustrates a P.G.P. counter in a storage portion of the remote facsimile machine 2 according to a fourteenth embodiment.

The foregoing process is arranged as shown in FIG. 95. As shown in FIG. 95, the process from step S2401 to S2414 given the same step numbers are the same as those of the structure shown in FIG. 81. Steps S2501 and S2502 placed between step S2403 and step S2404 are peculiar processes in this modification and correspond to the foregoing operation 2 (step S2501) and the operations 4 (step S2502).

As a result, the selection of the entry level is performed with the pass word at the time of executing the remote entry by the operator. Therefore, an erroneous level input and an intended erroneous setting of items by an operator can be prevented.

Fourteenth Embodiment

An object of this embodiment is to reduce maintenance cost by grasping the state of use of the facsimile machine by obtaining information of the remote facsimile machine by making use of the remote data entry function.

The RAM 15 is allocated with counter regions 321 to 324 for storing the number of A4 size sheets and B4 size sheets transmitted and received and another counter region 325 for storing the number of the transmission operations. The foregoing counters are collectively called P.G.P counters.

The remote entry system according to this embodiment comprises the procedure of the remote entry between the center facsimile machine 1 and the remote facsimile machine 2 arranged as shown in FIGS. 5 to 7.

Figure 98:
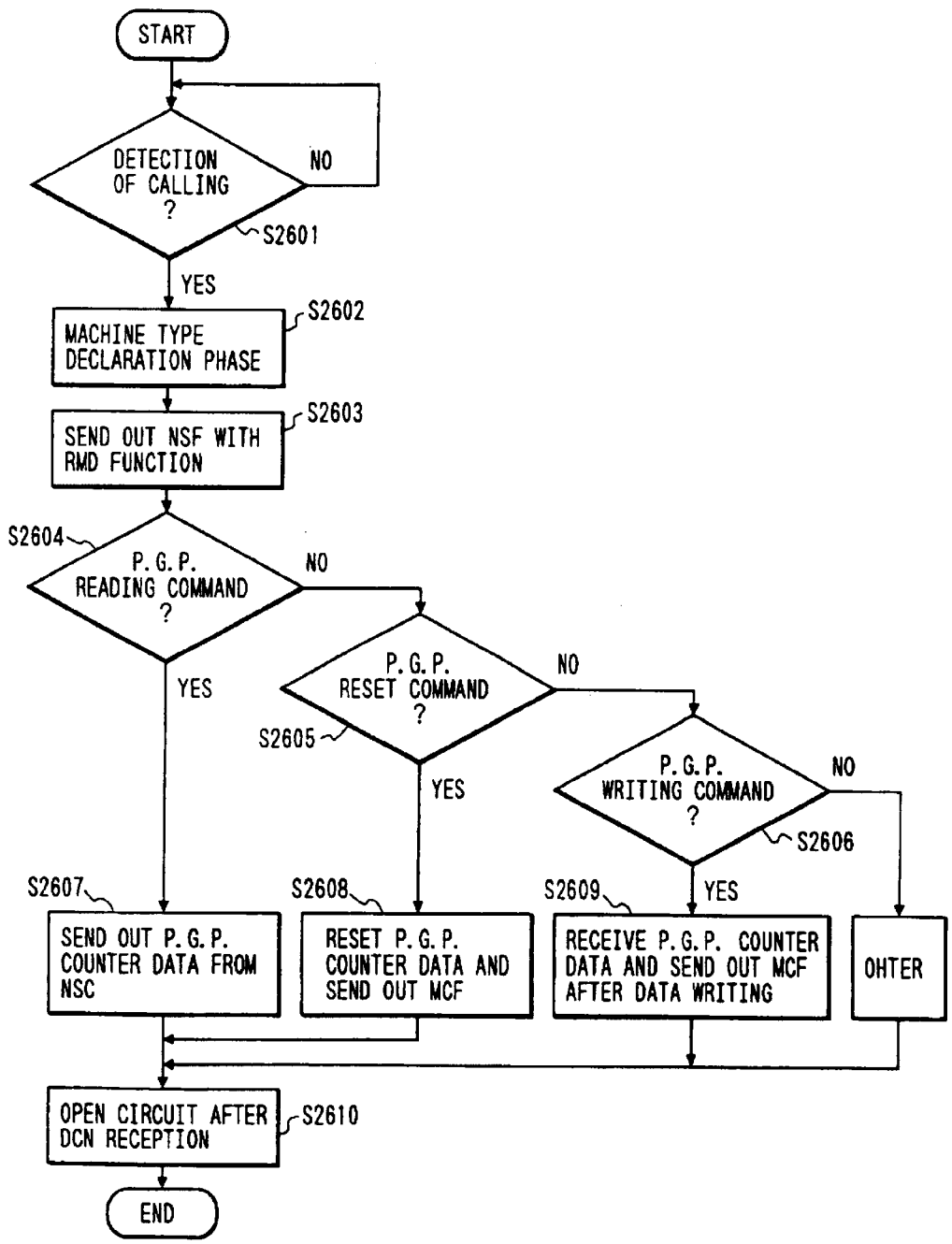
FIG. 98 is an operation flow chart of the remote facsimile machine 2.

The operation of the remote facsimile machine 2 according to this embodiment will now be described with reference to a flow chart shown in FIG. 98. The process shown in FIG. 98 is realized by causing the CPU 13 to execute the program stored in the ROM 14. The remote facsimile machine 2 is able to read/record both A4 size and B4 size.

<Counting of Number of Sheets>

When the usual image transmission/receiving operations are performed by the remote facsimile machine 2, the number of sheet are recorded in a transmission sheet counter/received sheet counter for storing the sum of the transmitted/received number of sheets stored in the memory 15.

In the transmitted sheet counter, the number of sheets depending upon the size is recorded which have been transmitted after a process of transmitting an image for one page has been completed. That is, the count of an A4 transmission counter 321 is increased when an A4 sheet is transmitted, while that of a B4 transmission counter 322 is increased when a B4 sheet is transmitted.

In the received sheet counter, the number of sheets depending upon the size is recorded after a recording process for one page has been completed. That is, the counter of an A4 received sheet counter 323 is increased at the time of receiving the A4 sheet, while that of a B4 received sheet counter is increased at the time of receiving the B4 sheet. Further, the count of a transmission number counter 325 is increased. The values of the foregoing counters are maintained even if the power source is turned off.

<Remote Reading of Counter>

The counter group having count data is read on to the PC 3 by means of communication by the following process.

In order to read the P.G.P counters (321 to 325) from a remote position, a program for reading the counters is commenced on the PC 3. FIG. 47 illustrates an image plane displayed on the PC 3 due to the operation of the program thus-commenced. The operator inputs needed items in accordance with the displayed menu image plane.

When the input has been completed, the PC 3 makes a message to be transmitted to the center facsimile machine 1 and transmits it.

When the operator has inputted the connection number, selected the execution of reading of the P.G.P counter and depressed the return key, the message notifying them is sent to the center facsimile machine 1.

The side (the center facsimile machine 1) for executing the remote reading receives the message to commence the communication with the remote facsimile machine 2 in accordance with the control procedure shown in FIGS. 5 to 7.

First, the facsimile machine 2 connected to the public circuit network is called. When the circuit is connected, the machine type declaration phase (see FIG. 5) of the remote entry process is commenced. FIG. 98 is a flow chart which illustrates the process to be performed from a moment at which the remote facsimile machine 2 is called.

The remote facsimile machine 2 examines the call from the center facsimile machine 1 in step S2601. If the call has been made, the flow proceeds to step S2602.

In step S2602, the communication of the machine type declaration is performed in accordance with the procedure shown in FIG. 5.

In next step S2603, the remote facsimile machine 2 declares that it has the remote entry function in the NSF (Standard Function Declaration) shown in FIG. 5 and transmits the machine type declaration initial identification to the center facsimile machine 1.

When the center facsimile machine 1 has received the NSF, it sends the P.G.P counter reading command (PD) by means of the NSS (Non-Standard Function Declaration) which is the RMD data request command.

The remote facsimile machine 2 tests the received NSS signal in step S2604. If the PD command has been received, the data reading phase is commenced in which the data of the P.G.P counter is transmitted by mean of the NSC (Non-Standard Function Declaration) in step S2607.

When reading of the counter has been completed as described above, the center facsimile machine 1 receives the P.G.P counter data and then sends the DCN (disconnection command) in accordance with the data reading phase shown in FIG. 7 to open the circuit (step S2610). As a result, the data about the P.G.P. counter is displayed on the PC.

<Resetting of Remote Counter>

The P.G.P counter (321 to 325) of the facsimile machine can be reset from a remote position. By starting the program on the PC 3, hte operator inputs the connection number by the foregoing program to select and instruct the initialization of the P.G.P. data. The foregoing process is performed in accordance with the menu shown in FIG. 97 similarly to the reading operation. When the return key is depressed on the PC 3, the remote facsimile machine 2 connected to the public circuit network is called from the center facsimile machine 1. The process of the remote facsimile machine which has been called as described above is shown in FIG. 98.

The process from step S2601 to S2603 is the same as that of the reading operation, and then the flow proceeds to the data entry phase.

The center facsimile machine 1 receives the NSF in step S2603, and then transmits the P.G.P counter reset command (MP) by the NSS (Non-Standard Function Declaration) which is the RMD data entry command.

The remote facsimile machine 2 examines the received NSS in steps S2604 to S2605. If the NSS is the P.G.P. reset command, the flow proceeds to step S2608 in which the MCF is sent and all data items of the P.G.P. counter (321 to 325) are reset.

The center facsimile machine 1 receives the MCF, and then sends the DCN (disconnection command) in accordance with the procedure shown in FIG. 6 to open the circuit.

<Remote Setting of Counter>

The P.G.P. counter (321 to 325) of the facsimile machine can be set to a desired value from a remote position. When the program is started on the PC 3, and the operator inputs the connection number in accordance with the program to execute, select and instruct the initialization of the P.G.P. data. The foregoing operation is performed in accordance with the menu shown in FIG. 97 similarly to the reading operation. When the return key is depressed on the PC 3, the remote facsimile machine connected to the public circuit network is called from the center facsimile machine 1. The process of the remote facsimile machine which has been called is shown in FIG. 98.

The process from step S2601 to S2603 is the same as that of the reading and resetting operations, and then the data entry phase is commenced.

The center facsimile machine 1 receives the NSF in step S2603, and then sends the P.G.P. counter data set command (MP) by the NSS (Non-Standard Function Declaration) which is the RMD data entry command. At this time, the value to be set is, of course, transmitted.

The remote facsimile machine 2 examines the received NSS in steps S2604 to S2606. If the NSS is the P.G.P. counter data set command, the flow proceeds to step S2609 in which the MCF is sent and the data received together with the NSS is set to the P.G.P. counter (321 to 325).

The center facsimile machine 1 receives the MCF, and then sends the DCN (disconnection command) in accordance with the procedure shown in FIG. 6 to open the circuit.

As described above, the remote data entry procedure can be used to read and write the maintenance data such as the state of use of the facsimile machine by means of the communication. Therefore, the labor of inspecting the apparatus can be saved, resulting in cost reduction. Although this embodiment use the received and transmitted sheet counter as the subject data, the subject data is not limited to this.

The present invention may be applied to a system composed of a plurality of units or a sole apparatus. The present invention can also be applied to a case where a program is supplied to a system or an apparatus.

As described above, undesirable data entry in a remote facsimile machine from the center can be prevented.

Further, the entry data and data reading can be limited for the side which remote-enters data. Therefore, undesirable deterioration of the data reliability can be prevented.

Fifteenth Embodiment

Figure 99:
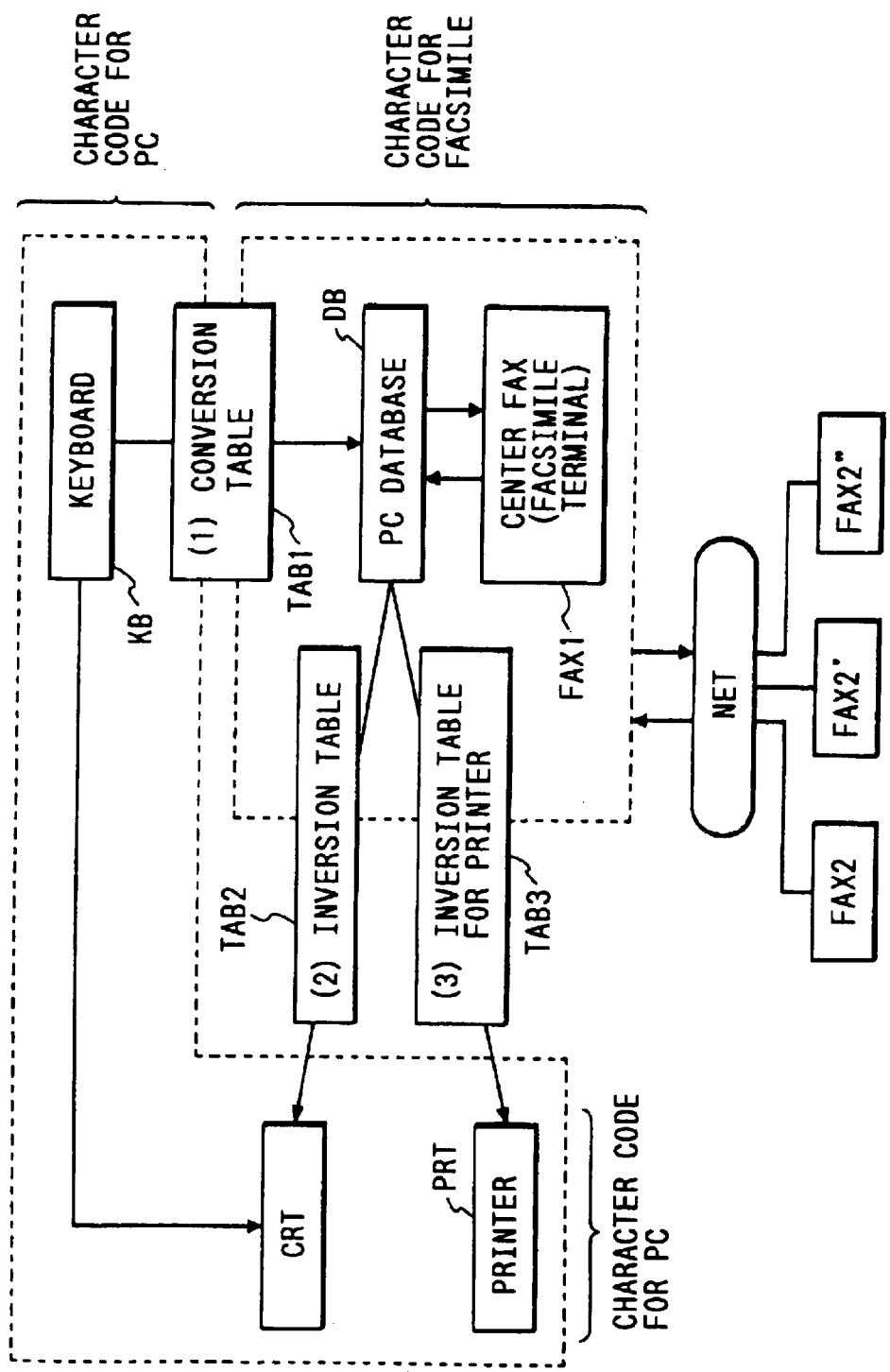
FIG. 99 is a block diagram which illustrates the data processing structure of a personal computer 3 and facsimile machines 1 and 2.

FIG. 99 is a block diagram which illustrates the data processing structure of the PC 3 and the facsimile machine 1.

Referring to FIG. 99, symbols KB represents a keyboard which is used in such a manner that, if a data processing mode for the facsimile machine 1 is set, a conversion code obtained by converting the supplied key code into a key code for the facsimile machine 1 in accordance with a code conversion table TAB 1 is caused to enter the data base DB (formed by, for example, a hard disk). When the transmission to the facsimile machine 1 is enabled, the conversion code data is read from the data base DB to transmit it to the facsimile machine 1. When data reading from the facsimile machine 1 is instructed, a facsimile key code array inputted by the keys of the operation panel on the facsimile machine 1 is received from an entry data management portion (formed by, for example, a RAM, which is made backup) (omitted from illustration) to enter the data base DB. Symbols CRT represents a display apparatus formed to display characters or images in accordance with the key code data of the facsimile machine entered the data base DB or the key code input from the keyboard KB. Symbols PRT represents a printer apparatus formed by, for example, a laser beam printer.

Symbols TAB 2 represents a reverse conversion table for converting the facsimile key code array output, the reverse conversion table TAB 2 acting to convert the foregoing facsimile key code array into the PC key code array on the PC 3 to output the reversely converted key code array to the display CRT. As a result, the key code array is displayed while preventing character deformation.

A reverse conversion table TAB 3 for converting the facsimile key code array output converts the foregoing facsimile key code array into the PC key code array on the personal computer PC to transmit the reversely-converted key code array to the printer PRT. As a result, characters and the like can be printed while preventing character deformation. The respective tables TAB 1 to TAB 3 are stored in the data base DB as to be read on to a working memory (omitted from illustration) so that the data input/output process of the facsimile machine 1 is controlled by a CPU (omitted from illustration) in accordance with the procedure of a flow chart to be described later. The respective tables TAB 1 to TAB 3 are arranged to meet the specifications of the facsimile machine 1. If a different facsimile machine that can be connected is present, it is necessary to use an adaptable table. If a command key code for facsimile machines having different specifications is present, a common table may be provided and only tables for the different key codes may be provided.

As described above, the facsimile machine structured in such a manner that the PC 3 is connected to the facsimile machine 1 and terminal (remote) facsimile machines 2 to 2" are connected by way of the public circuit network NET has an arrangement that entry character code data from an external apparatus (the personal computer PC) to the facsimile machine 1 or the facsimile machines 2 to 2" is sequentially converted into an exclusive character code in the facsimile machine while referring to a first conversion table (the table TAB 1) in accordance with a data entry command sent from the PC 3. The converted exclusive character code array is temporarily stored in an external apparatus (the data base DB), and the stored exclusive character code array is transferred and entered the facsimile machine 1 or the facsimile machines 2 to 2". Therefore, the character code exclusively used for the connected facsimile machine 1 or the facsimile machines 2 to 2" can be transferred from outside to be caused to enter.

In accordance with a data reading command issued from the PC 3, the entry character code data is received from the facsimile machine 1 or a plurality of remote facsimile machines 2 to 2". The received entrance character code data of the facsimile machine 1 or a plurality of remote facsimile machines 2 to 2" is sequentially converted into the exclusive character code in the facsimile machine 1 or a plurality of remote facsimile machines 2 to 2" while referring to the first conversion table (table TAB 1). The converted exclusive character code array is temporarily stored in the external apparatus (the data base DB), and it is reversely converted into the entry character code data array in accordance with the display or the print instruction of the stored exclusive character code array while referring to the second conversion table (the tables TAB 2 and TAB 3). The converted entry character code data array is read to be displayed or printed. Therefore, the character code exclusively used for the facsimile machine entered the facsimile machine 1 or the character code including the character code exclusively used for the facsimile machine remote entered from an external apparatus to the facsimile machines 2 to 2" can be read from the external apparatus as to be displayed or printed as the entry characters.

FIG. 100 illustrates an example of the conversion data file of each of the tables TAB 1 to TAB 3 shown in FIG. 99.

As shown in FIG. 10, the character code conversion table is a binary file. The first 256 bytes of the character code conversion table file correspond to the conversion table TAB 1. The next 256 bytes correspond to the conversion table TAB 2 serving as the reverse conversion table for display, and the ensuing 256 bytes correspond to the conversion table TAB 3 serving as a printing reverse conversion table. Thus, input character codes from "00H" to "99H" (256 characters) are converted. The first byte of each table indicates data after the input code "00H" has been converted, followed by "01H", "02H", "03H". Thus, a table of 256 bytes is formed.

With reference to a flow chart shown in FIG. 101, the character data input/output operation of the facsimile machine according to the present invention will now be described.

Figure 101:
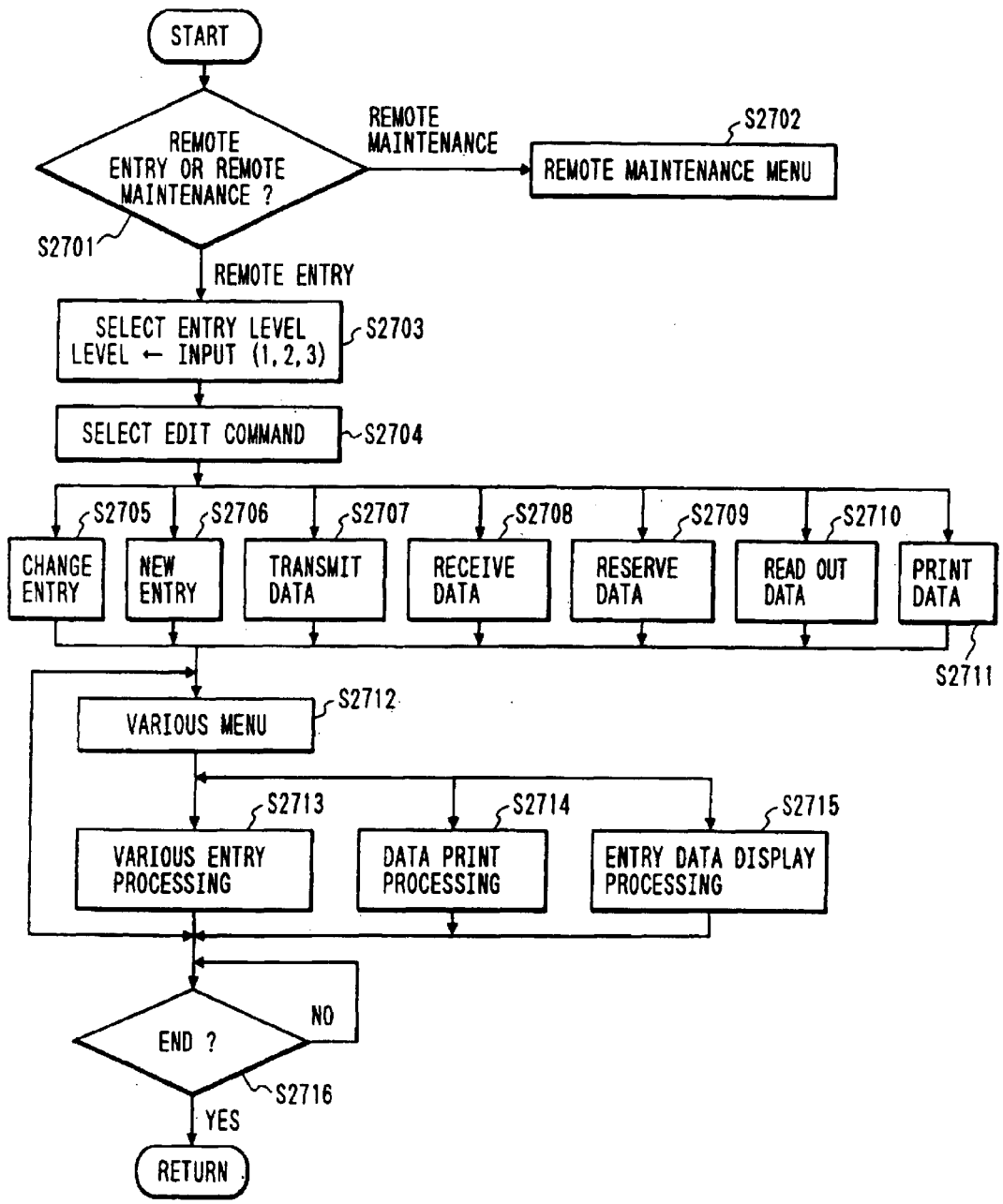
FIG. 101 is a flow chart which illustrates an example of a character data input/output processing procedure of the facsimile machine.

FIG. 101 is a flow chart which illustrates an example of the input/output operation of the facsimile machine.

First, a discrimination is made whether the input/output processing mode supplied through the keyboard KB is the remote entry or the remote maintenance (S2701). If it is the remote maintenance mode, the flow proceeds to step S2702 in which a remote maintenance menu (omitted from illustration) is displayed on the display CRT.

If a discrimination is made in step S2701 that the remote entry (in this embodiment, the remote entry mode is performed by option setting so that CRSHOST (name of the starting program)/T=DUCH. TBL (name of the conversion table file) are supplied) is performed, any one of the entry levels 1, 2 and 3 is selected by inputting any one of 1 to 3 from the keyboard KB (S2703). Then, an edition command menu is displayed on the display CRT to select a desired command (change entry, novel entry, data transmission, data receipt, data reservation, data reading and data printing) from the edition commands (S2704). Then, the selected edition command is analyzed to execute any one of the change entry, novel entry, data transmission, data receipt, data reservation, data reading and data printing (S2705 to S2711).

Then, a menu corresponding to the selected command is displayed on the display CRT (S2712).

Figure 102:
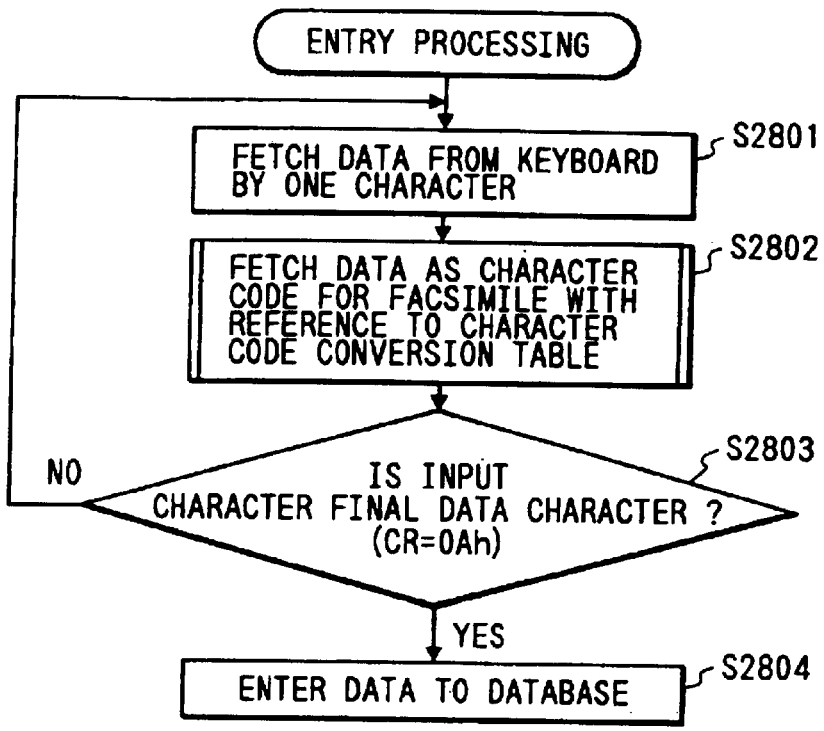
FIG. 102 is a flow chart which illustrates a data entry operation shown in FIG. 101.
Figure 103:
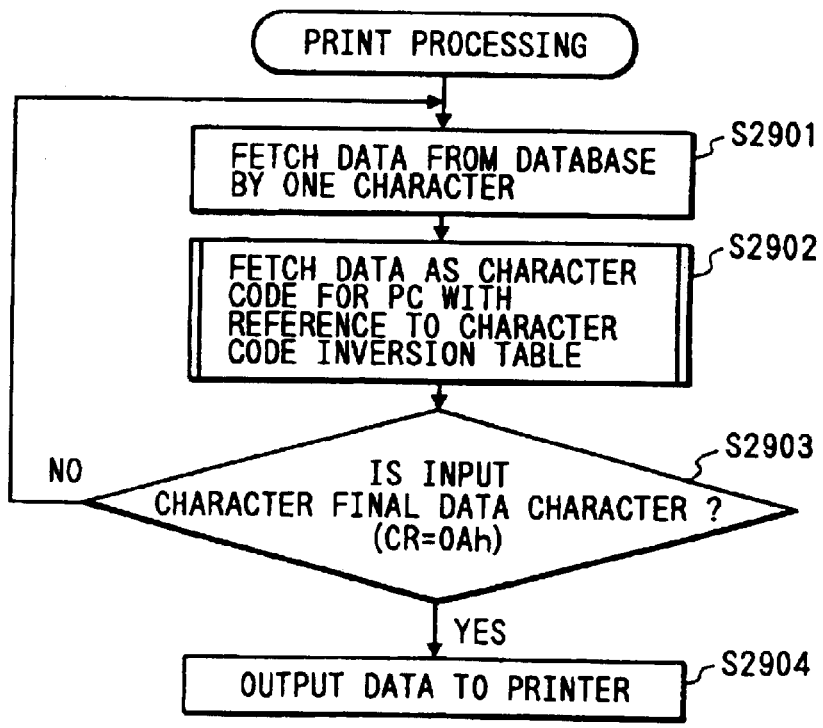
FIG. 103 is a flow chart which illustrates an entry data printing operation shown in FIG. 101.
Figure 104:
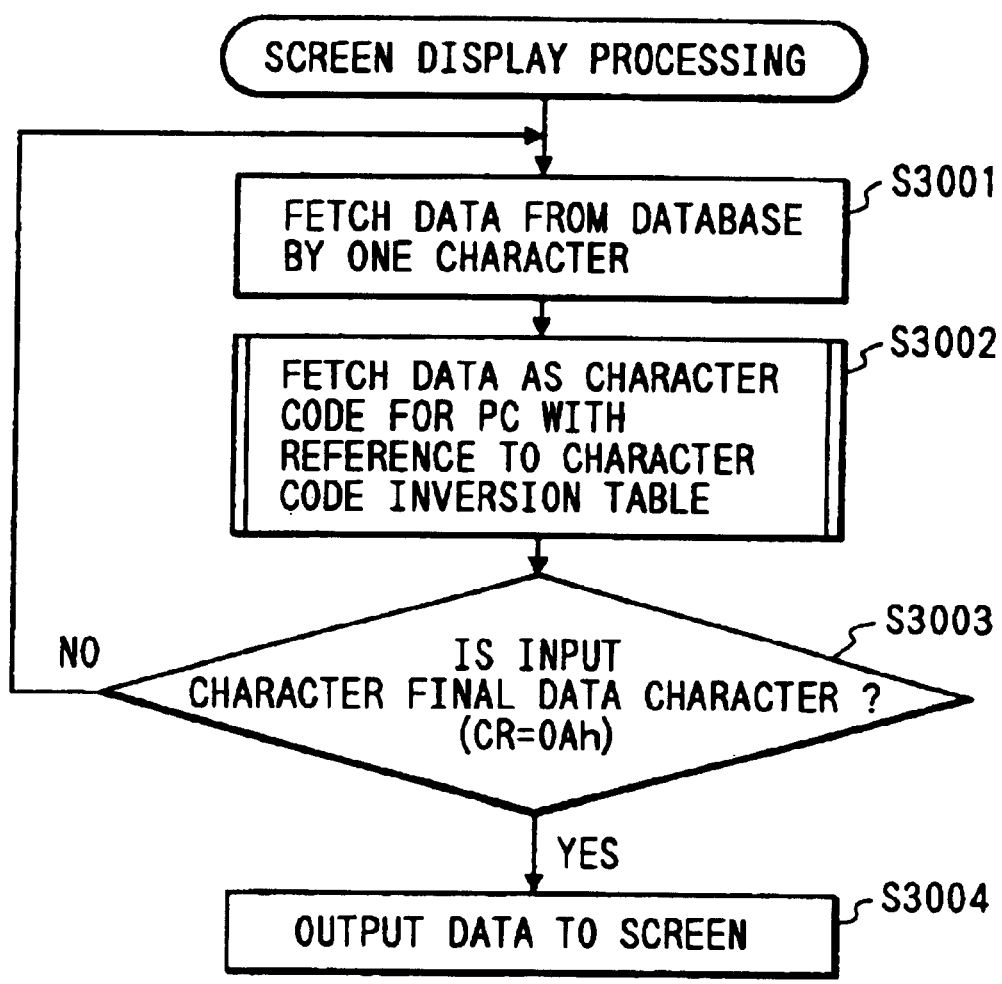
FIG. 104 is a flow chart which illustrates an entry data display operation shown in FIG. 101.

If the novel entry or the change entry is selected in steps S2705 and 2706, the flow proceeds to step S2713 in which a data entry process shown in FIG. 102 is executed as described later (S2714). If the data printer is selected in step S2711, the data printing process shown in FIG. 103 is executed as described later (S2714). If reading of entry data is selected in step S2710, the entry data display process shown in FIG. 104 is executed as described later (S2715). If the command completion is selected (S2716), the process is completed.

FIG. 102 is a flow chart which illustrates the data entry process. S2801 to S2804 are respective steps.

First, key code data for one character is received from the keyboard KB (S2801). Then, the received key code data is converted into a character code for the facsimile machine 1 while referring to the conversion table TAB 1 so that the character code is received (S2802). Then, a discrimination is made whether or not the supplied character is the code (for example, CR key "0Ah") denoting the final data character (S2803). If a negative discrimination is made, the flow returns to step S2801. If an affirmative discrimination is made, the conversion key code array data for the facsimile machine FAX 1 which has been supplied and converted is caused to enter the data base DB (S2804). Thus, the process is completed.

FIG. 103 is a flow chart which illustrates the entry data printing operation shown in FIG. 101. S2901 to S2904 are respective steps.

First, conversion key code array data for the facsimile machine 1 entered the data base DB for one character is received (S2901). While referring to the reverse conversion table TAB 3, the received data is converted into a key code array corresponding to the character code for the PC 3 as to be received (S2902). Then, a discrimination is made whether or not the supplied character is the code (for example, CR key "0Ah") denoting the final data character (S2903). If a negative discrimination is made, the flow returns to step S2901. If an affirmative discrimination is made, the reversely-converted key code array is transferred to the printer PRT (S2904) so that the entry data is printed and thus the process is completed.

FIG. 104 is a flow chart which illustrates the entry data display process. S3001 to S3004 are respective steps.

First, the conversion key code array data for the facsimile machine 1 entered on data base DB for one character is received (S3001). While referring to the reverse conversion table TAB 2, the received data is converted into a key code array corresponding to the character code for the PC 3 as to receive it (S3002). Then, a discrimination is made whether or not the supplied character is the code (for example, CR key "0Ah") denoting the final data character (S3003). If a negative discrimination is made, the flow returns to step S3001. If an affirmative discrimination is made, the reversely-converted key code array is transferred to the display CRT (S3004) so that the entry data is displayed and thus the process is completed.

The foregoing embodiment has been described about the case where the key code array which can be converted by the conversion table is a usual key code (alphabets and digits). However, if a facsimile machine is able to handle Greek characters and the PC 3 has not the character code to handle the Greek characters, a character type conversion table is provided for converting the Greek characters and the alphabets. Thus, the present invention can be adapted to the foregoing case.

If a character type conversion table adaptable to the destined place is provided in the case of exporting the facsimile machine, a similar adaptation can be realized.

Although the foregoing embodiment has been described about the character code conversion process (the entry process of character data with respect to the FAX 1 and a process of reading entry data from the same) between the PC 3 and the facsimile machine 1, the present invention may be adapted to an inter-remote character code conversion process about the facsimile machines 2 to 2" serving as the remote terminal apparatuses. Then, the operation of a sixteenth embodiment will now be described with reference to FIGS. 5 to 7 and FIGS. 105 to 108.

Sixteenth Embodiment

Figure 105:
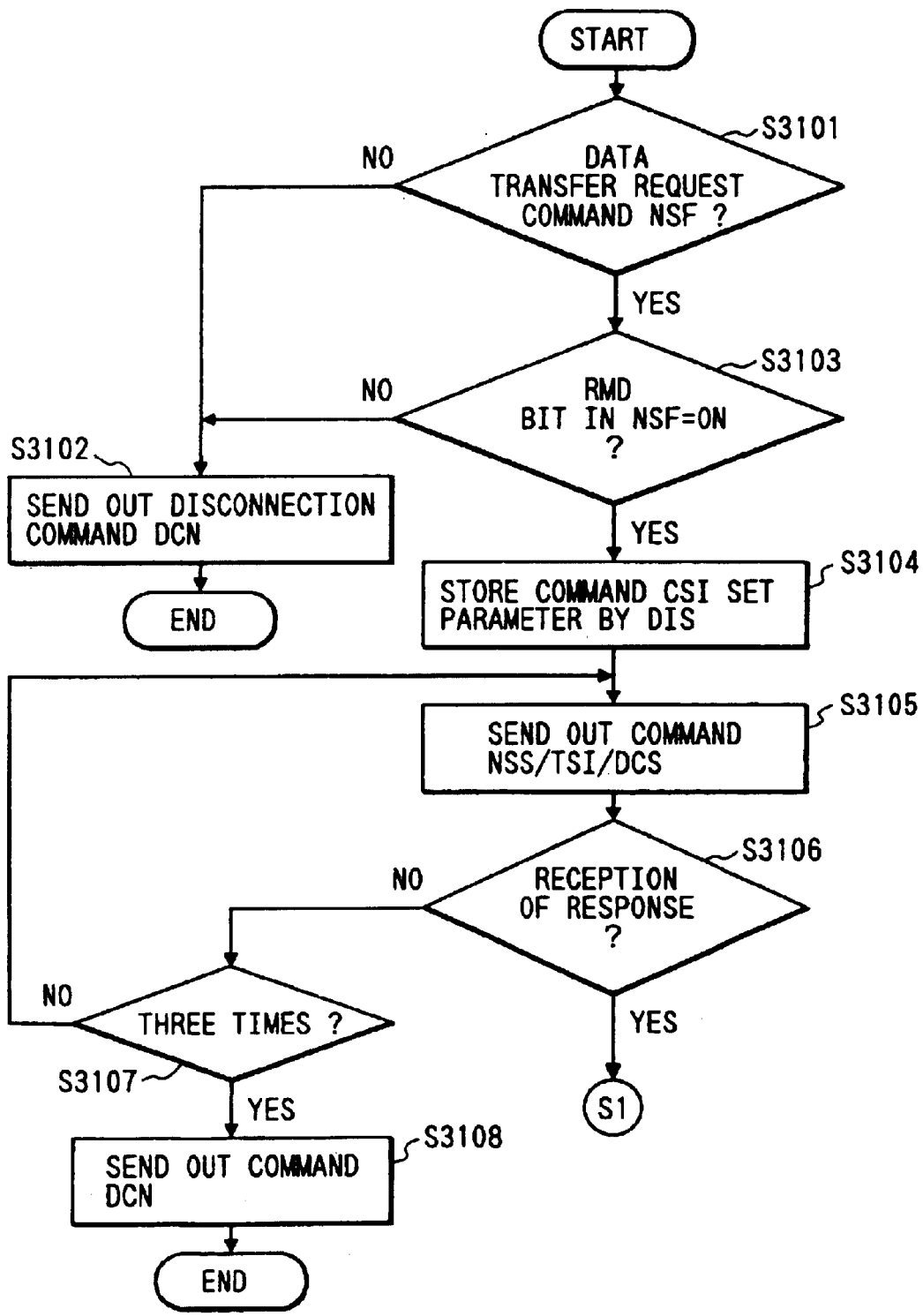
FIG. 105 is a flow chart which illustrates an example of the procedure of a machine type declaration phase of a character data processing method.
Figure 106:
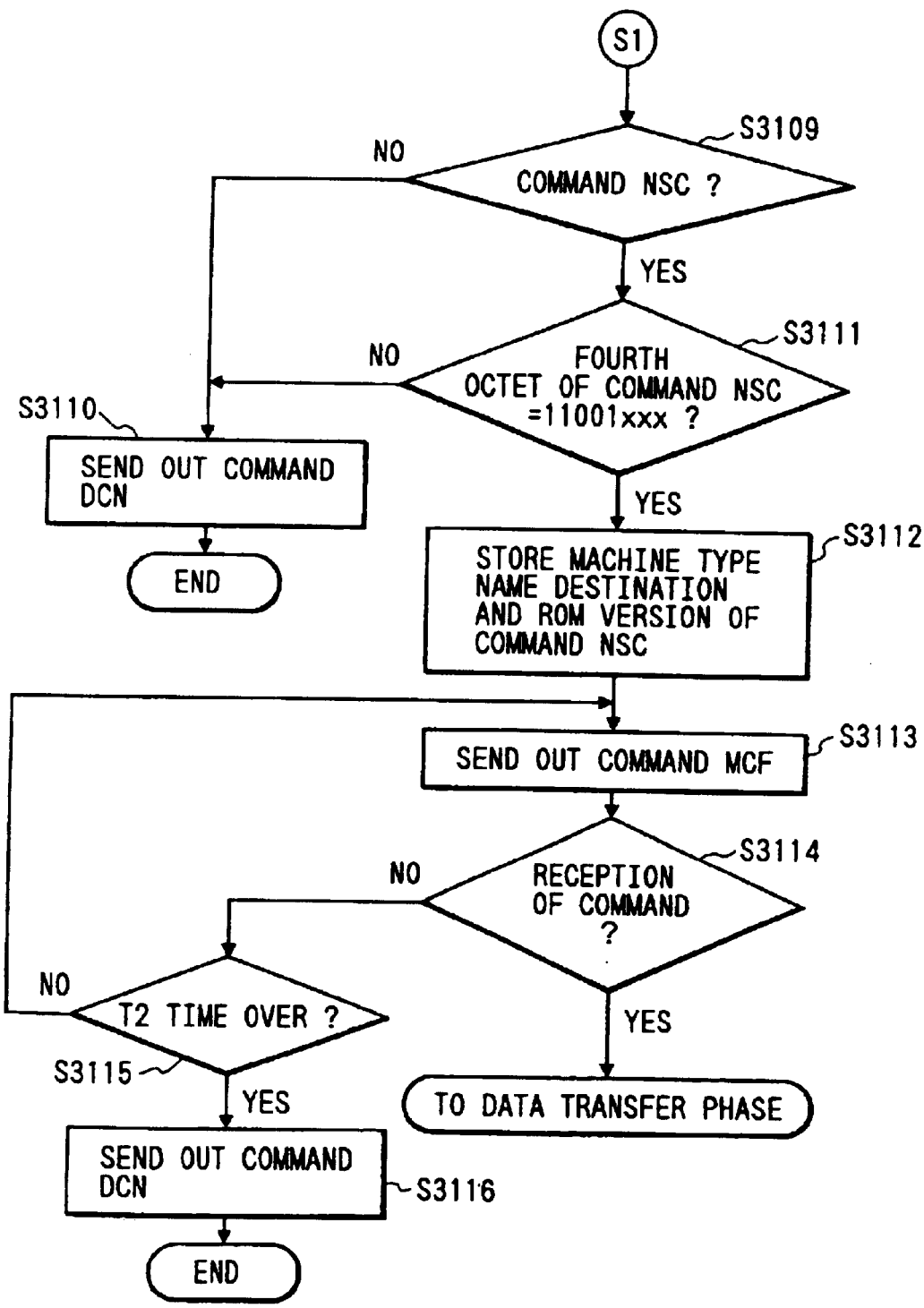
FIG. 106 is a flow chart which illustrates an example of the procedure of the machine type declaration phase of the character data processing method.

FIGS. 105 and 106 are flow charts which illustrate an example of a machine type declaration phase procedure adapted to the character data processing method. S3101 to S3116 are respective steps. The machine type declaration phase corresponds to that shown in FIG. 5.

First, the machine type of the remote facsimile machine and whether or not the remote entry function is possessed are examined by making a discrimination whether or not a command issued from the facsimile machine after the circuit has been connected is the data transfer request command NSF (S3101). If a negative discrimination is made, the flow proceeds to step S3102 in which the disconnection command DCN for disconnecting the circuit is issued and the process is completed.

If an affirmative discrimination is made in step S3101, a discrimination is made whether or not the RMD bit (the bit denoting whether or not adapted to the non-standard function) in the data transfer request command NSF is turned on (S3103). If a negative discrimination is made, the flow returns to step S3102 and the process is completed.

If an affirmative discrimination is made in step S3103, the command SCI issued from the facsimile machine 2 is stored. Then, a variety of parameters are set in accordance with the command DIS (S3104). Then, the command NSS/TSI/DCS is sent from the PC 3 to the connected facsimile machine 2. A discrimination is made whether or not the response to the foregoing command has been received (S3106). If a negative discrimination is made, a discrimination is made whether or not the command issue is the third issue (S3107). If an affirmative discrimination is made, the flow returns to step S3105 in which the command NSS/TSI/DCS is again sent from the PC 3 to the connected facsimile machine 2. If a negative discrimination is made, the disconnection command DCN is sent (S3108) and the process is completed.

If an affirmative discrimination is made in step S3106, a discrimination is made whether or not the command NSC (the response command to the non-standard function setting command NSS) has been received (S3109). If a negative discrimination is made, the flow proceeds to step S3110 in which the disconnection command DCN is sent and the process is completed.

If an affirmative discrimination is made in step S3109, a discrimination is made whether or not the fourth octet of the command NSC is "11001xxx" (S3111). If a negative discrimination is made, the flow proceeds to step S3110 in which the disconnection command DCN is sent and the process is completed. If an affirmative discrimination is made, data about the machine name, the destination and the ROM version and the like included in the data field of the command NSC is stored in the facsimile machine 1 (S3112). Then, the command MCF denoting the affirmative response is sent from the PC 3 to the facsimile machine 2 (S3113). Further, a discrimination is made whether or not the command NSF has been sent from the facsimile machine 2 (S3114). If an affirmative discrimination is made, the flow is shifted to the data transfer phase process shown in FIGS. 107A and 107B. If a negative discrimination is made, a discrimination is made whether or not a pre-determined time T2 has passed (S3115). If a negative discrimination is made, the flow returns to step S3114. If an affirmative discrimination is made, the disconnection command DCN is sent (S3116) and the process is completed.

Figure 107B:
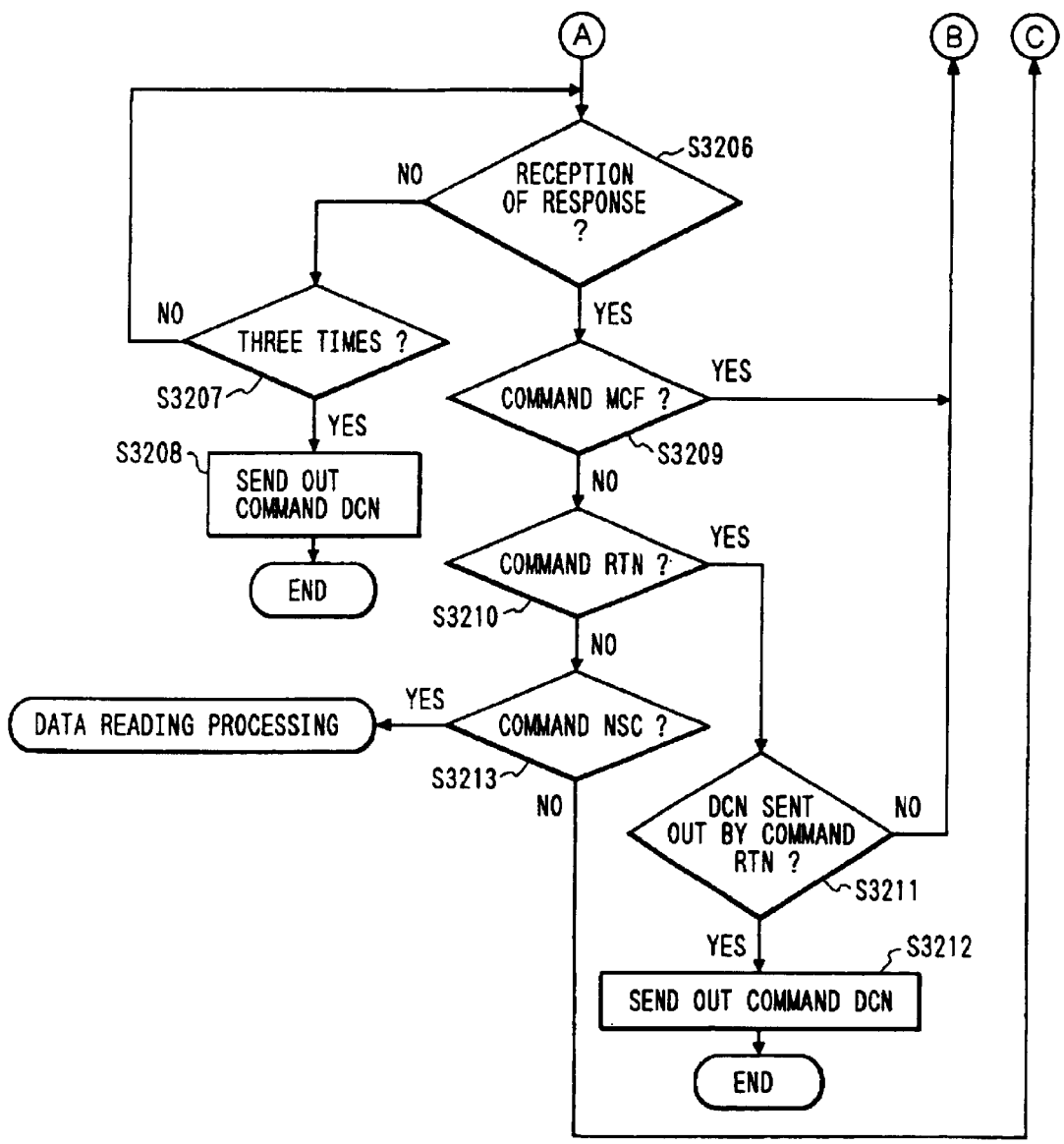
FIG. 107 is comprised of FIG. 107A and FIG. 107B showing flow charts which illustrate an example of the procedure of a data transfer phase of the character data processing method.

FIGS. 107A and 107B are flow charts which illustrate an example of the procedure of the data transfer phase in the character data processing method. S3201 to S3213 are respective steps. The data transfer phase corresponds to that shown in FIG. 6.

First, the machine type and whether or not the remote entry function is possessed are examined by making a discrimination whether or not the command sent from the facsimile machine 2 after the circuit has been connected is the data transfer request command NSF (S3201). If a negative discrimination is made, the flow proceeds to step S3204 in which the disconnection command DCN for disconnecting the circuit is sent and the process is completed.

If an affirmative discrimination is made in step S3201, a discrimination is made whether or not the RMD bit (the bit denoting whether or not adaptation to the non-standard function is realized) in the data transfer request command NSF is turned on (S3202). If a negative discrimination is made, the flow proceeds to step S3204 in which the disconnection command DCN for disconnecting the circuit is sent and the process is completed.

If an affirmative discrimination is made in step S3202, a discrimination is made whether or not the transmission data to the next command NSS is present. If a negative discrimination is made, the flow proceeds to step S3204 in which the disconnection command DCN for disconnecting the circuit is sent and the process is completed. If an affirmative discrimination is made, data received from the command file in units of, for example, 100 bytes, by the command NSS is sent from the PC 3 to the facsimile machine 1 (S3205). Then, a discrimination is made whether or not a response to the foregoing command has been received (S3206). If a negative discrimination is made, a discrimination is made whether or not the number of issues of the command is, for example, the third time (S3207). If a negative discrimination is made, the flow returns to step S3205. If an affirmative discrimination is made, the disconnection command DCN for disconnecting the circuit is sent (S3208) and the process is completed.

It should be noted that the foregoing "data" is data (entry data to the facsimile machine (entry data to the facsimile machine 1 and the remote facsimile machines 2 to 2")) converted by the conversion table TAB 1 as to be adaptable to the facsimile machine at the time of the input from the PC 3.

If an affirmative discrimination is made in step S3206, a discrimination is made whether or not the PC 3 has received the command MCF denoting the affirmative response from the remote apparatus (S3209). If an affirmative discrimination is made, the flow returns to step S3203. If a negative discrimination is made, a discrimination is made whether or not the PC 3 has received the command RTN denoting the negative response from the facsimile machine 2 (S3210). If an affirmative discrimination is made, a discrimination is made whether or not the disconnection command DCN is sent (S3211). If a negative discrimination is made, the flow returns to step S3203. If an affirmative discrimination is made, the disconnection command DCN for disconnecting the circuit is sent (S3212) and the process is completed.

If a negative discrimination is made in step S3210, a discrimination is made whether or not the response command NSC to the command NSS has been received from the remote apparatus (S3213). If a negative discrimination is made, the flow returns to step S3201. If an affirmative discrimination is made, the flow is shifted to a data reading process to be described later.

Figure 108:
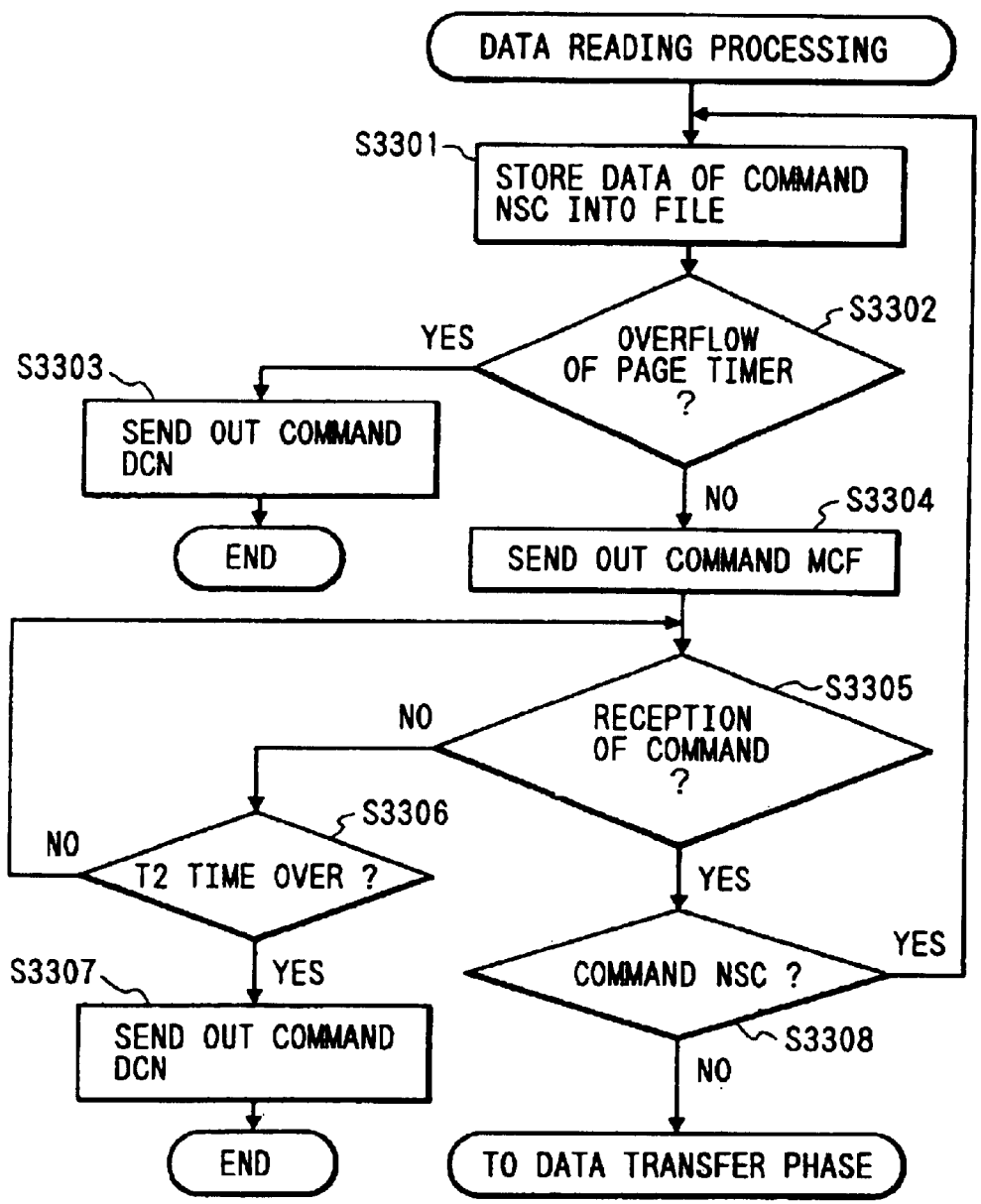
FIG. 108 is a flow chart which illustrates an example of the procedure of a data reading phase of the character data processing method.

FIG. 108 is a flow chart which illustrates an example of a data reading phase in the character data processing method. S3301 to S3308 are respective steps. The data reading phase corresponds to that shown in FIG. 7.

When the personal computer PC receives the command NSC in step S3213 in the data transfer phase process, it stores the sent data from the remote apparatus in accordance with the command NSC into the internal file of the facsimile machine FAX 1 (S3301). Then, a discrimination is made whether or not the page timer for the internal file has flowed over (S3302). If an affirmative discrimination is made, the flow proceeds to step S3303 in which the disconnection command DCN for disconnecting the circuit is sent and the process is completed.

If an affirmative discrimination is made in step S3302, the personal computer PC sends the command MCF to the remote apparatus (S3304). Then, a discrimination is made whether or not the next command has been received from the remote apparatus (S3305). If a negative discrimination is made, a discrimination is made whether or not a predetermined time T2 has passed (S3306). If a negative discrimination is made, the flow returns to step S3305. If an affirmative discrimination is made, the disconnection command DCN for disconnecting the circuit is sent (S3307) and the process is completed.

If an affirmative discrimination is made in step S3305, a discrimination is made whether or not the command is the response command NSC to the command NSS (S3308). If an affirmative discrimination is made, the flow returns to step S3301 in which data in accordance with the command NSC is sequentially stored in the internal file of the facsimile machine 1. If a negative discrimination is made, the flow returns to the data transfer phase.

The remote entry control operation is performed as described above. In this case, the facsimile machine simply sends data to the remote apparatus but it does not relate to the remote entry process while permitting data to pass through. The data transmission state is checked by the PC 3 by way of the interface RS232C during the communication. When a command to delete the command file is sent from the PC 3 to the interface RS232C, the facsimile machine 1 deletes the command file (the foregoing internal file) and thus the data entry process is completed.

When data is read, a command to transfer the file stored in the facsimile machine 1 to the PC 3 is sent from the PC 3 to the interface RS232C. As a result, the facsimile machine 1 transfers the read data to the PC 3. The PC 3 causes data to enter the internal data base DB, and then deletes read data from the facsimile machine 1. Thus, the process is completed.

As described above, the present invention comprises steps of: sequentially converting entry character code data to be caused to enter the facsimile apparatus or the plurality of remote facsimile apparatuses into exclusive character code in the facsimile apparatus while referring to a first conversion table in accordance with a data entry command issued by the external unit; causing the exclusive code array thus-converted to be temporarily stored in the external unit; and transferring the stored exclusive character code to the facsimile apparatus or the plurality of remote facsimile apparatuses to be caused to enter the same. Therefore, the character code for exclusively use in the connected facsimile apparatus or the plurality of remote facsimile apparatus can be transferred from outside to be caused to enter them.

Further, the present invention comprises steps of: receiving entry character code data from the facsimile apparatus or the plurality of remote facsimile apparatuses in accordance with a data reading command issued by the external unit; sequentially converting the entry character code data into exclusive character code in the facsimile apparatus while referring to a first conversion table; causing the exclusive code array thus-converted to be temporarily stored in the external unit; inversely converting the stored exclusive character code array into the entry character code data array while referring to a second conversion table in accordance with an instruction to display or print the stored exclusive character code array; and reading the converted entry character code array to display or print the same. Therefore, the entry data about the facsimile apparatuses on a network can collectively be managed.

Therefore, the character code corresponding to special characters for use in only the facsimile machine can be transferred from an external apparatus. Therefore, the special characters for use in only a desired facsimile machine can easily be caused to enter from the connected external apparatus. Further, the same contents as the entry data can be displayed or output by the external apparatus. Therefore, the data entry operation and the display and printing of the entry data can be performed from outside.

In addition to the foregoing embodiments, an arrangement may be employed in which copying machines, printers, image storage units and image processing units and the like are connected to the facsimile machine 2 and internal data in the foregoing apparatuses is read out, caused to enter and rewritten.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A character data processing method in a system which comprises a personal computer and a facsimile machine connected through a public network to a remote facsimile machine connected through an interface to the personal computer, comprising:
   an input step for inputting key code data by a keyboard of the personal computer;
   a registration step for converting the key code data input in said input step into character code data for the facsimile machine by referring to a conversion table, and registering the obtained character code data in a database; and
   a transfer step for transferring the character code data for the facsimile machine registered in the database in said registration step to the remote facsimile machine through the facsimile machine.

2. A character data processing method in a system which comprises a personal computer and a facsimile machine connected through a public network to a remote facsimile machine connected through an interface to the personal computer, said method comprising:
   an inverse-conversion step for, when it is selected to read registration data, inverse-converting character code data for the facsimile machine registered in the remote facsimile machine into character code data for the personal computer by referring to an inverse-conversion table for inverse-converting the character code data for the facsimile machine into the character code data for the personal computer; and
   a display step for performing display based on the character code data for the personal computer inverse-converted in said inverse-conversion step.

3. A character code processing method according to claim 2, wherein said inverse-conversion step includes accumulating the character code data for the facsimile machine accumulated in the facsimile machine into the character code data for the personal computer.

4. A character data processing method in a system which comprises a personal computer and a facsimile machine connected through a public network to a remote facsimile machine connected through an interface to the personal computer, said method comprising:

an inverse-conversion step for, when it is selected to read registration data, inverse-converting character code data for the facsimile machine registered in the remote facsimile machine into character code data for the personal computer by referring to an inverse-conversion table for inverse-converting the character code data for the facsimile machine into the character code data for the personal computer; and a print step for performing printing head on the character code data for the personal computer inverse-converted in said inverse-conversion step.

5. A character data processing method according to claim 4, wherein said inverse-conversion step includes accumulating the character code data registered in the remote facsimile machine in the facsimile machine through the public network, and inverse-converts the character code data for the facsimile machine accumulated in the facsimile machine into the character code data for the personal computer.

6. A system which comprises a personal computer and a facsimile machine connected through a public network to a remote facsimile machine connected through an interface to the personal computer, comprising:

an input unit adapted to input key code data of the personal computer;

a registration unit adapted to convert the key code data input by said input unit into character code data for the facsimile machine by referring to a conversion table, and to register the obtained character code data in a database; and a transfer unit adapted to transfer the character code data for the facsimile machine registered in the database by said registration unit to the remote facsimile machine through the facsimile machine.

7. A system which comprises a personal computer and a facsimile machine connected through a public network to a remote facsimile machine connected through an interface to the personal computer, said system further comprising:

an inverse-conversion unit adapted to, when it is selected to read registration data, inverse-convert character code data for the facsimile machine registered in the remote facsimile machine into character code data for the personal facsimile machine into character code data for the personal computer by referring to an inverse-conversion table for inverse-converting the character code data for the facsimile machine into the character code data for the personal computer; and a display unit adapted to perform display based on the character code data for the personal computer inverse-converted by said inverse-conversion unit.

8. A system according to claim 7, wherein said inverse-conversion unit accumulates the character code data registered in the remote facsimile machine in the facsimile machine through the public network, and inverse-converts the character code data for the facsimile machine accumulated in the facsimile machine into the character code data for the personal computer.

9. A system which comprises a personal computer and a facsimile machine connected through a public network to a remote facsimile machine connected through an interface to the personal computer, said system further comprising:

an inverse-conversion unit adapted to, when it is selected to read registration data, inverse-convert character code data for the facsimile machine registered in the remote facsimile machine into character code data for the personal computer by referring to an inverse-conversion table for inverse-converting the character code data for the facsimile machine into the character code data for the personal computer; and a print unit adapted to perform printing based on the character code data for the personal computer inverse-converted by said inverse-conversion unit.

10. A system according to claim 9, wherein said inverse-conversion unit accumulates the character code data registered in the remote facsimile machine in the facsimile machine through the public network, and inverse-converts the character code dat for the facsimile machine accumulated in the facsimile machine into the character code data for the personal computer.

* * * * *